(12) United States Patent
Matsunaga et al.

(10) Patent No.: US 7,371,439 B2
(45) Date of Patent: May 13, 2008

(54) ANTIREFLECTION FILM, POLARIZING PLATE AND IMAGE DISPLAY DEVICE

(75) Inventors: Naohiro Matsunaga, Minami-Ashigara (JP); Shuntaro Ibuki, Minami-Ashigara (JP)

(73) Assignee: Fujifilm Corporation, Minato-Ku, Tokyo (JP)

(*) Notice: Subject to any disclaimer, the term of this patent is extended or adjusted under 35 U.S.C. 154(b) by 0 days.

(21) Appl. No.: 10/524,590

(22) PCT Filed: Aug. 14, 2003

(86) PCT No.: PCT/JP03/10359

§ 371 (c)(1),
(2), (4) Date: Feb. 15, 2005

(87) PCT Pub. No.: WO2004/017105

PCT Pub. Date: Feb. 26, 2004

(65) Prior Publication Data

US 2006/0057307 A1  Mar. 16, 2006

(30) Foreign Application Priority Data

Aug. 15, 2002 (JP) ............................. 2002-237043
Apr. 25, 2003 (JP) ............................. 2003-122686

(51) Int. Cl.
*G02B 1/11* (2006.01)

(52) U.S. Cl. .................. 428/1.3; 428/1.1; 428/323; 428/331; 349/64; 349/112; 349/137

(58) Field of Classification Search ............... 428/1.1, 428/1.3, 1.55, 323–325, 328–329, 330–332; 349/64, 112, 137; 359/245, 252, 255; 526/247
See application file for complete search history.

(56) References Cited

U.S. PATENT DOCUMENTS 5,055,342 A * 10/1991 Markovich et al. ......... 428/137

(Continued)

FOREIGN PATENT DOCUMENTS

EP    1 089 093    4/2001

(Continued)

*Primary Examiner*—Rena Dye
*Assistant Examiner*—Sow-Fun Hon
(74) *Attorney, Agent, or Firm*—Buchanan Ingersoll & Rooney PC

(57) ABSTRACT

The present invention can provide an antireflection film improved in the scratch resistance while having a sufficiently high antireflection property, and a polarizing plate and a display device using the antireflection film, the antireflection film antireflection film comprising: a transparent support; and as an outermost layer, a low refractive index layer containing a fluorine-containing polymer, wherein the low refractive index layer comprises at least one inorganic fine particle having an average particle size of 30 to 100% of the thickness of the low refractive index layer; the polarizing plate using the antireflection film for one of two protective films of a polarizer in the polarizing plate; and the image display device using the antireflection film or polarizing plate for the outermost surface of the display.

16 Claims, 1 Drawing Sheet (a)

(b)

U.S. PATENT DOCUMENTS

| | | | |
|---|---|---|---|
| 5,909,314 A * | 6/1999 | Oka et al. | 359/582 |
| 6,181,400 B1 * | 1/2001 | Yang et al. | 349/117 |
| 6,210,858 B1 * | 4/2001 | Yasuda et al. | 430/270.1 |
| 6,254,973 B1 * | 7/2001 | Yoshida et al. | 428/212 |
| 6,271,326 B1 * | 8/2001 | Nishikawa et al. | 526/242 |
| 6,383,559 B1 * | 5/2002 | Nakamura et al. | 427/180 |
| 6,398,371 B1 * | 6/2002 | Matsunaga et al. | 359/614 |
| 6,502,943 B2 * | 1/2003 | Nakamura et al. | 359/603 |
| 6,633,352 B2 * | 10/2003 | Yamaguchi et al. | 349/102 |
| 6,794,469 B2 * | 9/2004 | Obayashi et al. | 526/247 |
| 6,873,387 B2 * | 3/2005 | Hokazono et al. | 349/137 |
| 6,908,647 B2 * | 6/2005 | Obayashi et al. | 428/1.32 |
| 2001/0050741 A1 * | 12/2001 | Hokazono et al. | 349/137 |
| 2002/0085284 A1 | 7/2002 | Nakamura et al. | |

FOREIGN PATENT DOCUMENTS

| | | |
|---|---|---|
| JP | 09-222503 | 8/1997 |
| JP | 10-221506 | 8/1998 |
| JP | 2001-100003 | 4/2001 |
| JP | 2001-281407 | 10/2001 |
| WO | 00/22461 | 4/2000 |

* cited by examiner (a)

(b)

ANTIREFLECTION FILM, POLARIZING PLATE AND IMAGE DISPLAY DEVICE

This application is a 371 of PCT/JP03/10359, filed Aug. 14, 2003.

TECHNICAL FIELD

The present invention relates to an antireflection film, and a polarizing plate and an image display device using the antireflection film.

BACKGROUND ART

On a display device such as cathode ray tube display device (CRT), plasma display panel (PDP), electro-luminescence display (ELD) and liquid crystal display device (LCD), the antireflection film is generally disposed on the outermost surface of the display so as to prevent the reduction in contrast due to reflection of external light or prevent entering of an image by reflection.

In general, such an antireflection film is produced by forming a low refractive index layer to an appropriate thickness on a support, in which the refractive index of the low refractive index layer is lower than that of the support. In order to realize a low reflectance, a material having a refractive index as low as possible is preferably used for the low refractive index layer. Furthermore, the antireflection film is used on the outermost surface of a display and therefore, this film is required to have high scratch resistance. In order to realize high scratch resistance of a thin film with a thickness of about 100 nm, strength of the film itself and tight adhesion to the lower layer are necessary.

For lowering the refractive index of a material, techniques of (1) introducing a fluorine atom and (2) decreasing the density (introducing voids) may be used, however, in both of these techniques, the film strength or the adhesive property at the interface is liable to decrease and low scratch resistance results. Thus, it has been difficult to realize a low refractive index and a high scratch resistance at the same time.

As described in JP-A-2002-265866 (the term "JP-A" as used herein means an "unexamined published Japanese patent application") and JP-A-2002-317152, the film strength may be increased to a certain extent by a method of using a fluorine-containing sol-gel film, however, this method causes large restrictions, for example, (1) curing requires heating over a long time and the load of production is large or (2) the film has no resistance against a saponification solution (alkali treatment solution) and in the case of saponifying the TAC surface, this treatment cannot be performed after the antireflection film is formed.

On the other hand, JP-A-11-189621, JP-A-11-228631 and JP-A-2000-313709 describe a technique of introducing a polysiloxane structure into a fluorine-containing polymer to reduce the friction coefficient on the film surface and thereby improve the scratch resistance. This technique is effective to a certain extent for the improvement of scratch resistance, however, in the case of a film lacking in the substantial film strength and interface adhesion, a sufficiently high scratch resistance cannot be obtained only by this technique.

DISCLOSURE OF THE INVENTION

An object of the present invention is to provide an antireflection film improved in the scratch resistance while keeping sufficiently high antireflection property. The object of the present invention includes providing a polarizing plate and a display device using this antireflection film.

As a result of extensive investigations, the present inventors have found that when at least one inorganic particle having a particle size responding to the thickness of a low refractive index layer comprising a fluorine-containing polymer is used in the low refractive index layer, the film strength can be remarkably improved while suppressing the increase in the refractive index of the layer itself and moreover, this is not bound to restrictions of long-term heat curing or saponification treatment.

According to the present invention, an antireflection film, a polarizing plate and a display device having the following constitutions are provided and thereby, the above-described object can be attained.

1. An antireflection film comprising: a transparent support; and as an outermost layer, a low refractive index layer containing a fluorine-containing polymer,
wherein the low refractive index layer comprises at least one inorganic fine particle having an average particle size of 30 to 100% of the thickness of the low refractive index layer.

2. The antireflection film as described in the item 1, which has at least one hard coat layer between the transparent support and the low refractive index layer.

3. The antireflection film as described in the item 1 or 2, wherein the inorganic particle is a silica fine particle.

4. The antireflection film as described in any one of the items 1 to 3, wherein the low refractive index layer further comprises at least one silica fine particle having a particle size of less than 25% of the thickness of the low refractive index layer.

5. The antireflection film as described in the item 3 or 4, wherein at least one of the silica fine particles in the low refractive index layer is a hollow silica fine particle having a refractive index of from 1.17 to 1.40.

6. The antireflection film as described in any one of the items 1 to 5, wherein the fluorine-containing polymer is a copolymer (P) having a main chain consisting of only a carbon atom, and the copolymer comprises: a fluorine-containing vinyl monomer polymerization unit; and a polymerization unit having a (meth)acryloyl group on the side chain.

7. The antireflection film as claimed in the item 6, wherein the copolymer (P) is represented by the following formula 1:

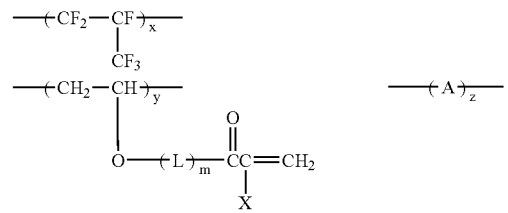

wherein L represents a linking group having a carbon number of 1 to 10, m represents 0 or 1, X represents a hydrogen atom or a methyl group, A represents an arbitrary vinyl monomer polymerization unit and may comprise a single component or a plurality of components, and x, y and z represent mol % of respective constituent components and represent values satisfying $30 \leq x \leq 60$, $5 \leq y \leq 70$ and $0 \leq z \leq 65$.

8. The antireflection film as described in any one of the items 2 to 7, wherein the at least one hard coat layer is a light-diffusing layer, and the light-diffusing layer has a scattered light intensity at 30° of 0.01 to 0.2% based on the light intensity at an exit angle of 0° in a scattered light profile by a goniophotometer.

9. The antireflection film as described in any one of the items 1 to 8, which comprises at least one high refractive index layer between the transparent support and the low refractive index layer, wherein the high refractive index layer is a layer having a refractive index of 1.55 to 2.40 and mainly comprising: titanium dioxide; and an inorganic fine particle containing at least one element selected from cobalt, aluminum and zirconium.

10. The antireflection film as described in any one of the items 1 to 9, wherein the low refractive index layer has a refractive index of 1.20 to 1.49.

11. A polarizing plate comprising a polarizer and two protective films of the polarizer, wherein one of the two protective films of a polarizer is the antireflection film described in any one of the items 1 to 10.

12. The polarizing plate as described in the item 11, wherein the film other than the antireflection film of the two protective films of a polarizer is an optical compensation film having an optical compensation layer comprising an optically anisotropic layer, wherein the optically anisotropic layer is a layer having a negative birefringence and comprising a compound having a discotic structural unit, the disc plane of the discotic structural unit is inclined with respect to the surface protective film plane, and the angle made by the disc plane of the discotic structural unit and the surface protective film plane is changed in the depth direction of the optically anisotropic layer.

13. An image display device comprising the anti-reflection film described in any one of the items 1 to 10 or the polarizing plate described in the item 11 or 12, as the outermost surface of the display.

14. A liquid-crystal display device of a TN-, STN-, VA-, IPS- or OCB-mode transmissive, reflective or transflective type, which comprises at least one polarizing plate described in the item 11 or 12.

Figure 1:
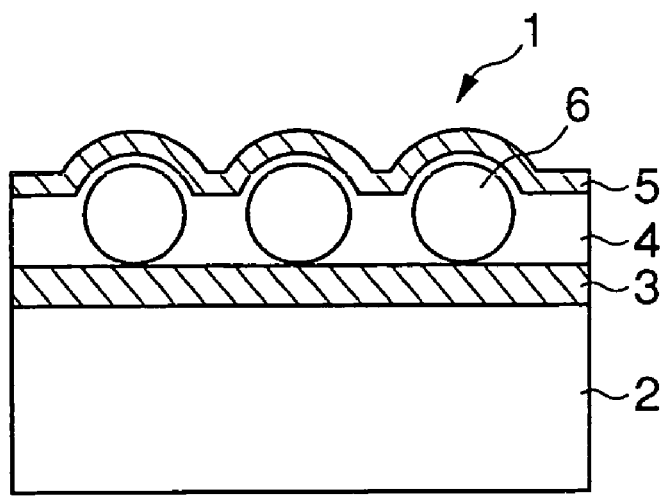
FIGS. 1 (a) and (b) is a schematic cross-sectional view showing the layer structure of an antiglare and antireflection film.
Figure 1:
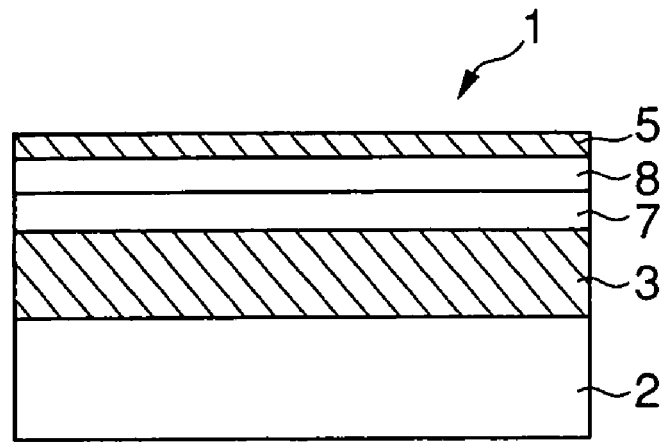

DESCRIPTION OF NUMERICAL REFERENCES 1 antireflection film
2 transparent support
3 hard coat layer
4 antiglare hard coat layer
5 low refractive index layer
6 mat particle
7 medium refractive index layer
8 high refractive index layer

BEST MODES OF CARRYING OUT THE INVENTION

The basic constitution of the antireflection film according to one preferred embodiment of the present invention is described below by referring to the drawings.

FIG. 1(a) is a cross-sectional view schematically showing one example of the antireflection film of the present invention. The antireflection film 1 has a layer structure of a transparent support 2, a hard coat layer 3, an antiglare hard coat layer 4 and a low refractive index layer 5 in this order. Mat particles 6 are dispersed in the antiglare hard coat layer 4 and the material constituting the portion other than the mat particle 6 of the antiglare hard coat layer 4 preferably has a refractive index of 1.50 to 2.00. The refractive index of the low refractive index layer 5 is preferably from 1.35 to 1.49. In the present invention, the hard coat layer may have or may not have such antiglare property and may be constituted by one layer or a plurality of layers, for example, two, three or four layers. Also, the hard coat layer may not be coated. Accordingly, the hard coat layer 3 and the antiglare hard coat 4 shown in FIG. 1 are not essential but in order to impart the film strength, either one of these hard coat layers is preferably provided. The low refractive index layer is provided as an outermost layer FIG. 1(b) is a cross-sectional view schematically showing one example of the antireflection film of the present invention, where the antireflection film 1 has a layer structure of a transparent support 2, a hard coat layer 3, a medium refractive index layer 7, a high refractive index layer 8 and a low refractive index layer (outermost layer) 5 in this order. The transparent support 2, the medium refractive index layer 7, the high refractive index layer 8 and the low refractive index layer 5 have refractive indexes satisfying the following relationship:

(Refractive index of high refractive index layer)>(Refractive index of medium refractive index layer)>(Refractive index of transparent support)>(Refractive index of low refractive index layer)

As described in JP-A-59-50401, in the layer structure shown in FIG. 1(b), the medium refractive index layer, the high refractive index layer and the low refractive index layer preferably satisfy the following formulae (I), (II) and (III), respectively:

$$(h\lambda/4) \times 0.7 < n_1 d_1 < (h\lambda/4) \times 1.3 \quad \text{Formula (I)}$$

wherein h represents a positive integer (generally 1, 2 or 3), $n_1$ represents a refractive index of the medium refractive index layer, $d_1$ represents a layer thickness (nm) of the medium refractive index layer, and λ represents a wavelength (nm) of visible light and is a value in the range from 380 to 680 nm;

$$(i\lambda/4) \times 0.7 < n_2 d_2 < (i\lambda/4) \times 1.3 \quad \text{Formula (II)}$$

wherein i represents a positive integer (generally 1, 2 or 3), $n_2$ represents a refractive index of the high refractive index layer, $d_2$ represents a layer thickness (nm) of the high refractive index layer, and λ represents a wavelength (nm) of visible light and is a value in the range from 380 to 680 nm;

$$(j\lambda/4) \times 0.7 < n_3 d_3 < (j\lambda/4) \times 1.3 \quad \text{Formula (III)}$$

wherein j represents a positive odd number (generally 1), $n_3$ represents a refractive index of the low refractive index layer, $d_3$ represents a layer thickness (nm) of the low refractive index layer, and λ represents a wavelength (nm) of visible light and is a value in the range from 380 to 680 nm.

In the layer structure shown in FIG. 1(b), the medium refractive index layer, the high refractive index layer and the low refractive index layer preferably satisfy the following formulae (IV), (V) and (VI), respectively:

$$(h\lambda/4) \times 0.80 < n_1 d_1 < (h\lambda/4) \times 1.00 \quad \text{Formula (IV)}$$

$$(i\lambda/4) \times 0.75 < n_2 d_2 < (i\lambda/4) \times 0.95 \quad \text{Formula (V)}$$

$$(j\lambda/4) \times 0.95 < n_3 d_3 < (j\lambda/4) \times 1.05 \quad \text{Formula (VI)}$$

wherein λ is 500 nm, h is 1, i is 2 and j is 1.

The high refractive index, medium refractive index and low refractive index as used herein mean a relative height of the refractive index among layers. In FIG. 1(b), the high refractive index layer is used as a light interference layer and therefore, an antireflection film having a remarkably excellent antireflection performance can be produced.

[Low Refractive Index Layer]

The low refractive index layer for use in the present invention is described below.

The low refractive index layer of the antireflection film of the present invention has a refractive index of 1.20 to 1.49, preferably from 1.30 to 1.44.

Furthermore, from the standpoint of obtaining a low reflectance, the low refractive index layer preferably satisfies the following formula (VII):

$$(m/4) \times 0.7 < n_1 d_1 < (m/4) \times 1.3 \qquad \text{Formula (VII):}$$

wherein m represents a positive odd number, $n_1$ represents a refractive index of the low refractive index layer, $d_1$ represents a layer thickness (nm) of the low refractive index layer, and λ represents a wavelength and is a value in the range from 500 to 550 nm.

When formula (VII) is satisfied, this means that m (positive odd number, usually 1) satisfying formula (VII) is present in the above-described wavelength range.

The construction materials for forming the low refractive index layer of the present invention are described below.

The low refractive index layer of the present invention contains a fluorine-containing polymer as a low refractive index binder. The fluorine polymer is preferably a fluorine-containing polymer having a kinetic friction coefficient of 0.03 to 0.15 and a contact angle to water of 90 to 120° and capable of crosslinking by heat or ionizing radiation. In the low refractive index layer of the present invention, an inorganic filler may also be used so as to improve the film strength.

Examples of the fluorine-containing polymer for use in the low refractive index layer include a hydrolysate and a dehydration-condensate of perfluoroalkyl group-containing silane compound (e.g., (heptadecafluoro-1,1,2,2-tetrahydrodecyl)triethoxysilane), and a fluorine-containing copolymer using, as constituent components, a fluorine-containing monomer unit and a constituent unit for imparting crosslinking reactivity.

Specific examples of the fluorine-containing monomer unit include fluoroolefins (e.g., fluoroethylene, vinylidene fluoride, tetrafluoroethylene, perfluorooctylethylene, hexafluoropropylene, perfluoro-2,2-dimethyl-1,3-dioxol), partially or completely fluorinated alkyl ester derivatives of (meth)acrylic acid (e.g., BISCOTE 6FM (produced by Osaka Yuki Kagaku), M-2020 (produced by Daikin)), and completely or partially fluorinated vinyl ethers. Among these, perfluoroolefins are preferred and in view of refractive index, solubility, transparency and easy availability, hexafluoropropylene is more preferred.

Examples of the constituent unit for imparting crosslinking reactivity include a constituent unit obtained by the polymerization of a monomer previously having a self-crosslinkable functional group within the molecule, such as glycidyl (meth)acrylate and glycidyl vinyl ether; a constituent unit obtained by the polymerization of a monomer having a carboxyl group, a hydroxy group, an amino group or a sulfo group, such as (meth)acrylic acid, methylol (meth)acrylate, hydroxyalkyl (meth)acrylate, allyl acrylate, hydroxyethyl vinyl ether, hydroxybutyl vinyl ether, maleic acid and crotonic acid; and a constituent unit after a crosslinking reactive group such as (meth)acryloyl group is introduced into the above-described constituent units by a polymer reaction (the crosslinking reactive group can be introduced, for example, by allowing an acrylic acid chloride to act on a hydroxy group).

In view of solubility in a solvent, transparency of film or the like, a monomer not containing a fluorine atom may also be appropriately copolymerized other than the fluorine-containing monomer unit and the constituent unit for imparting the crosslinking reactivity. The monomer unit which can be used in combination is not particularly limited and examples thereof include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinylbenzene, vinyltoluene, α-methylstyrene), vinyl ethers (e.g., methyl vinyl ether, ethyl vinyl ether, cyclohexyl vinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile derivatives.

With this polymer, a curing agent may be appropriately used in combination as described in JP-A-10-25388 and JP-A-10-147739.

The fluorine-containing polymer particularly useful in the present invention is a random copolymer of a perfluoroolefin and a vinyl ether or ester. In particular, the fluorine-containing polymer preferably has a group capable of crosslinking reaction by itself (for example, a radical reactive group such as (meth)acryloyl group, or a ring-opening polymerizable group such as epoxy group and oxetanyl group). The crosslinking reactive group-containing polymerization unit preferably occupies from 5 to 70 mol %, more preferably from 30 to 60 mol %, in all polymerization units of the polymer.

A preferred embodiment of the copolymer for use in the present invention is a copolymer represented by formula 1.

In formula 1, L represents a linking group having a carbon number of 1 to 10, preferably from 1 to 6, more preferably from 2 to 4, which may have a linear, branched or cyclic structure and may have a heteroatom selected from O, N and S.

Preferred examples thereof include *—C(CH$_2$)$_2$—O—**, *—(CH$_2$)$_2$—NH—**, *—(CH$_2$)$_4$—O—**, *—(CH$_2$)$_6$—O—**, *—(CH$_2$)$_2$—O—(CH$_2$)$_2$—O—**, *—CONH—(CH$_2$)$_3$—O—**, *—CH$_2$CH(OH)CH$_2$—O—** and *—CH$_2$CH$_2$OCONH(CH$_2$)$_3$—O—** (wherein * represents a linking site in the polymer main chain side and ** represents a linking site in the (meth) acryloyl group side). m represents 0 or 1.

In formula 1, X represents a hydrogen atom or a methyl group and in view of curing reactivity, preferably a hydrogen atom.

In formula 1, A represents a repeating unit derived from an optional vinyl monomer and this is not particularly limited as long as it is a monomer constituent component copolymerizable with hexafluoropropylene. The repeating unit may be appropriately selected by taking account of various viewpoints such as adhesion to substrate, Tg (this contributes to the film hardness) of polymer, solubility in solvent, transparency, slipperiness, and dust/soil protective property, and may be composed of a single vinyl monomer or a plurality of vinyl monomers according to the purpose.

Preferred examples thereof include vinyl ethers such as methyl vinyl ether, ethyl vinyl ether, tert-butyl vinyl ether, cyclohexyl vinyl ether, isopropyl vinyl ether, hydroxyethyl vinyl ether, hydroxybutyl vinyl ether, glycidyl vinyl ether and allyl vinyl ether; vinyl esters such as vinyl acetate, vinyl propionate and vinyl butyrate; (meth)acrylates such as ethyl (meth)acrylate, ethyl (meth)acrylate, hydroxyethyl (meth)acrylate, glycidyl methacrylate, allyl (meth)acrylate, (meth)acryloyloxypropyltrimethoxysilane; styrene derivatives such as styrene and p-hydroxymethylstyrene; unsaturated carboxylic acids such as crotonic acid, maleic acid and itaconic acid; and derivatives thereof. Among these, more preferred are vinyl ether derivatives and vinyl ester derivatives, still more preferred are vinyl ether derivatives.

x, y and z represent mol % of respective constituent components and represent values satisfying $30 \leq x \leq 60$, $5 \leq y \leq 70$ and $0 \leq z \leq 65$, preferably $35 \leq x \leq 55$, $30 \leq y \leq 60$ and $0 \leq z \leq 20$, more preferably $40 \leq x \leq 55$, $40 \leq y \leq 55$ and $0 \leq z \leq 10$.

A more preferred embodiment of the copolymer for use in the present invention is a copolymer represented by formula 2:

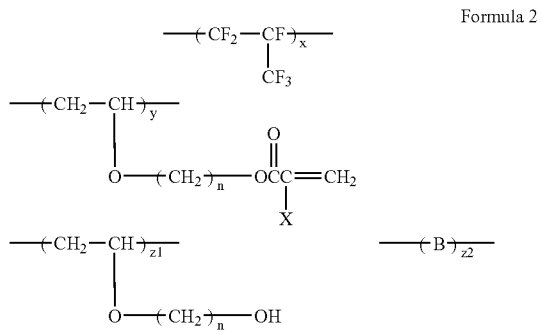

Formula 2

In formula 2, X, x and y have the same meanings as in formula 1 and their preferred ranges are also the same.

n represents an integer of $2 \leq n \leq 10$, preferably $2 \leq n \leq 6$, more preferably $2 \leq n \leq 4$.

B represents a repeating unit derived from an optional vinyl monomer and may be composed of a single composition or a plurality of compositions. Examples thereof include those described above as examples of A in formula 1.

z1 and z2 represent mol % of respective repeating units and represent values satisfying $0 \leq z1 \leq 65$ and $0 \leq z2 \leq 65$, preferably $0 \leq z1 \leq 30$ and $0 \leq z2 \leq 10$, more preferably $0 \leq z1 \leq 10$ and $0 \leq z2 \leq 5$.

The copolymer represented by formula 1 or 2 can be synthesized, for example, by introducing a (meth)acryloyl group into a copolymer comprising a hexafluoropropylene component and a hydroxyalkyl vinyl ether component according to any one of the above-described methods.

Preferred examples of the copolymer useful in the present invention are shown below, however, the present invention is not limited thereto.

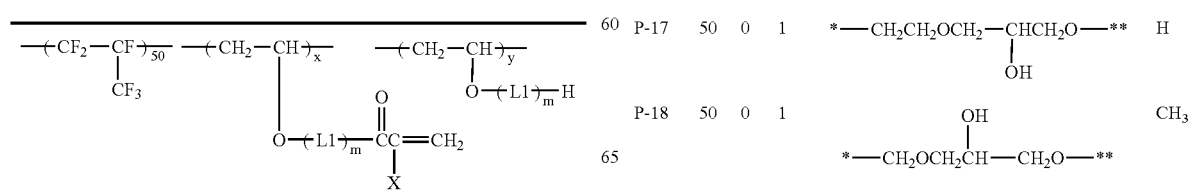

| | x | y | z | L1 | X |
|---|---|---|---|---|---|
| P-1 | 50 | 0 | 1 | *—CH$_2$CH$_2$O—** | H |
| P-2 | 50 | 0 | 1 | *—CH$_2$CH$_2$O—** | CH$_3$ |
| P-3 | 45 | 5 | 1 | *—CH$_2$CH$_2$O—** | H |
| P-4 | 40 | 10 | 1 | *—CH$_2$CH$_2$O—** | H |
| P-5 | 30 | 20 | 1 | *—CH$_2$CH$_2$O—** | H |
| P-6 | 20 | 30 | 1 | *—CH$_2$CH$_2$O—** | H |
| P-7 | 50 | 0 | 0 | — | H |
| P-8 | 50 | 0 | 1 | *—C$_4$H$_8$O—** | H |
| P-9 | 50 | 0 | 1 | *—(CH$_2$)$_2$—O—(CH$_2$)$_2$—O—** | H |
| P-10 | 50 | 0 | 1 | *—⌬—O—** | H |

\* indicates the polymer main chain side, and ** indicates the (meth)acryloyl group side.

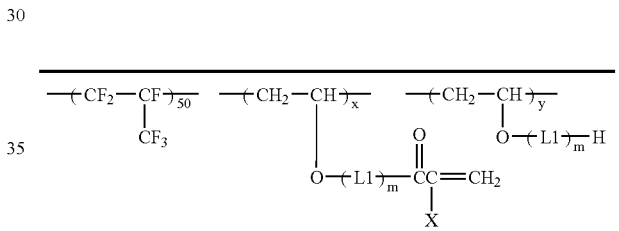

| | x | y | z | L1 | X |
|---|---|---|---|---|---|
| P-11 | 50 | 0 | 1 | *—CH$_2$CH$_2$NH—** | H |
| P-12 | 50 | 0 | 1 | *—CH$_2$CH$_2$OC(O)NHCH$_2$CH$_2$CH$_2$O—** | H |
| P-13 | 50 | 0 | 1 | *—CH$_2$CH$_2$OC(O)NHCH$_2$CH$_2$CH$_2$O—** | CH$_3$ |
| P-14 | 50 | 0 | 1 | *—CH$_2$CH$_2$CH$_2$CH$_2$OC(O)NHCH$_2$CH$_2$CH$_2$O—** | CH$_3$ |
| P-15 | 50 | 0 | 1 | *—CH$_2$CH(OH)CH$_2$O—** | H |
| P-16 | 50 | 0 | 1 | *—CH$_2$CHO—** (CH$_2$OH) | H |
| P-17 | 50 | 0 | 1 | *—CH$_2$CH$_2$OCH$_2$—CHCH$_2$O—** (OH) | H |
| P-18 | 50 | 0 | 1 | *—CH$_2$OCH$_2$CH(OH)—CH$_2$O—** | CH$_3$ |

-continued

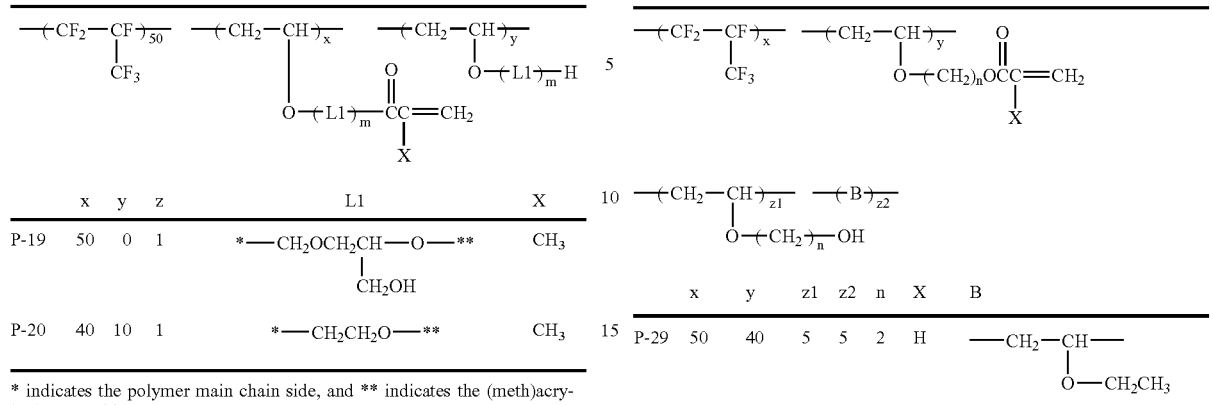

| | x | y | z | L1 | X |
|---|---|---|---|---|---|
| P-19 | 50 | 0 | 1 | *—CH$_2$OCH$_2$CH(CH$_2$OH)—O—** | CH$_3$ |
| P-20 | 40 | 10 | 1 | *—CH$_2$CH$_2$O—** | CH$_3$ |

| | x | y | z1 | z2 | n | X | B |
|---|---|---|---|---|---|---|---|
| P-29 | 50 | 40 | 5 | 5 | 2 | H | —CH$_2$—CH(O—CH$_2$CH$_3$)— |

* indicates the polymer main chain side, and ** indicates the (meth)acryloyl group side.

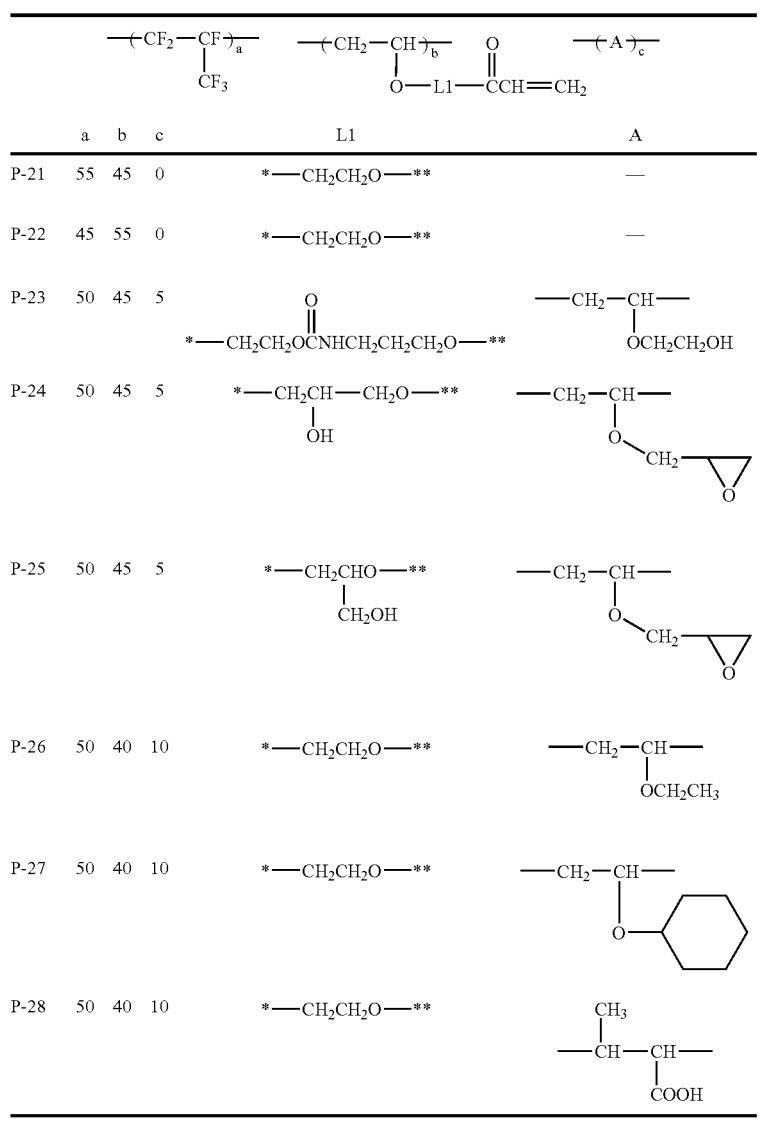

| | a | b | c | L1 | A |
|---|---|---|---|---|---|
| P-21 | 55 | 45 | 0 | *—CH$_2$CH$_2$O—** | — |
| P-22 | 45 | 55 | 0 | *—CH$_2$CH$_2$O—** | — |
| P-23 | 50 | 45 | 5 | *—CH$_2$CH$_2$OCNHCH$_2$CH$_2$CH$_2$O—** | —CH$_2$—CH(OCH$_2$CH$_2$OH)— |
| P-24 | 50 | 45 | 5 | *—CH$_2$CH(OH)—CH$_2$O—** | —CH$_2$—CH(O—CH$_2$—epoxide)— |
| P-25 | 50 | 45 | 5 | *—CH$_2$CH(CH$_2$OH)O—** | —CH$_2$—CH(O—CH$_2$—epoxide)— |
| P-26 | 50 | 40 | 10 | *—CH$_2$CH$_2$O—** | —CH$_2$—CH(OCH$_2$CH$_3$)— |
| P-27 | 50 | 40 | 10 | *—CH$_2$CH$_2$O—** | —CH$_2$—CH(O-cyclohexyl)— |
| P-28 | 50 | 40 | 10 | *—CH$_2$CH$_2$O—** | —CH(CH$_3$)—CH(COOH)— |

* indicates the polymer main chain side, and ** indicates the (meth)acryloyl group side.

-continued

| | | | | | | | |
|---|---|---|---|---|---|---|---|
| P-30 | 50 | 35 | 5 | 10 | 2 | H | —CH$_2$—CH(O—C(CH$_3$)$_3$)— |
| P-31 | 40 | 40 | 10 | 10 | 4 | CH$_3$ | —CH$_2$—CH(O-cyclohexyl-H)— |

$$-(CF_2-CF)_{50}- -(Y)_a- -(Z)_b-$$
$$\phantom{-(CF_2-}|\phantom{CF)_{50}}$$
$$\phantom{-(CF_2-}CF_3$$

| | a | b | Y | Z |
|---|---|---|---|---|
| P-32 | 45 | 5 | —CH(CH$_3$)—CH(CO$_2$CH$_2$CHCH$_2$OCC(CH$_3$)=CH$_2$)— with OH | —CH(CH$_3$)—CH(COOH)— |
| P-33 | 40 | 10 | —CH$_2$—CH(CO$_2$H)(CONHCH$_2$CH$_2$OCCH=CH$_2$)— | —CH—CH— with maleic anhydride O=C–O–C=O |

—(CH$_2$—CH)$_x$— —(CH$_2$—CH)$_y$— —(CH$_2$—CH)$_z$—
    |                    |                    |
    O=C                  O=C                  O=C
    |                    |                    |
    O                    O                    O
    |                    |                    |
    Rf                   L—CCH=CH$_2$         L—H

| | x | y | z | Rf | L |
|---|---|---|---|---|---|
| P-34 | 60 | 40 | 0 | —CH$_2$CH$_2$C$_8$F$_{17}$-n | —CH$_2$CH$_2$O— |
| P-35 | 60 | 30 | 10 | —CH$_2$CH$_2$C$_4$F$_8$H-n | —CH$_2$CH$_2$O— |
| P-36 | 40 | 60 | 0 | —CH$_2$CH$_2$C$_8$F$_{12}$H | —CH$_2$CH$_2$CH$_2$CH$_2$O— |

—(CH$_2$—CH)$_x$— —(CH$_2$—CH)$_y$—                    O
    |                    |                              ||
    O                    O—(CH$_2$)$_n$—OCCH=CH$_2$
    |
    Rf

—(CH$_2$—CH)$_z$—          O
    |                       ||
    O—(CH$_2$)$_n$—OCCH=CH$_2$

| | x | y | z | n | Rf |
|---|---|---|---|---|---|
| P-37 | 50 | 50 | 0 | 2 | —CH$_2$C$_4$F$_8$H-n |
| P-38 | 40 | 55 | 5 | 2 | —CH$_2$C$_4$F$_8$H-n |
| P-39 | 30 | 70 | 0 | 4 | —CH$_2$C$_8$F$_{17}$-n |
| P-40 | 60 | 40 | 0 | 2 | —CH$_2$CH$_2$C$_8$F$_{16}$H-n |

The copolymer for use in the present invention can be obtained by synthesizing a precursor such as a hydroxyl group-containing polymer according to a polymerization method of various types such as solution polymerization, precipitation polymerization, suspension polymerization, bulk polymerization and emulsion polymerization, and then introducing a (meth)acryloyl group through the above-described polymer reaction. The polymerization can be performed by a known operation such as batch system, semi-continuous system and continuous system.

For the initiation of polymerization, for example, a method of using a radical initiator and a method of irradiating light or radiation can be used. These polymerization methods and polymerization initiation methods are described, for example, in Teiji Tsuruta, *Kobunshi Gosei Hoho (Polymer Synthesis Method)*, revised edition, Nikkan Kogyo Shinbun Sha (1971), and Takayuki Ohtsu and Masaetsu Kinoshita, *Kobunshi Goseino Jikken Ho (Experimentation Methods of Polymer Synthesis)*, pp. 124-154, Kagaku Dojin (1972)

Among those polymerization methods, a solution polymerization using a radical initiator is preferred. Examples of the solvent for use in the solution polymerization include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol. These solvents may be used individually or as a mixture of two or more thereof or may be used as a mixed solvent with water.

The polymerization temperature need be set according to the molecular weight of polymer produced, the kind of initiator, and the like, and can be selected from 0° C. or less to 100° C. or more but the polymerization is preferably performed at a temperature of 50 to 100° C.

The reaction pressure may be appropriately selected but is usually from 1 to 100 kg/cm$^2$, preferably on the order from 1 to 30 kg/cm$^2$. The reaction time is approximately from 5 to 30 hours.

The reprecipitation solvent for the obtained polymer is preferably isopropanol, hexane, methane or the like.

In the present invention, the low refractive index layer contains at least one inorganic fine particle. This inorganic fine particle is described below.

The amount of the inorganic fine particle coated is preferably 1 to 100 mg/m$^2$, more preferably from 5 to 80 mg/m$^2$, still more preferably from 10 to 60 mg/m$^2$. If the amount coated is too small, the effect of improving the scratch resistance decreases, whereas if it is excessively large, fine asperities are formed on the surface of the low refractive index layer and this deteriorates the appearance such as non-loosening of black or the integrated reflectance.

The inorganic fine particle is contained in the low refractive index layer and therefore, this particle preferably has a low reflective index. Examples of such a particle include a fine particle of magnesium fluoride or silica. Particularly, in view of refractive index, dispersion stability and cost, a silica fine particle is preferred. The average particle size of the silica fine particle is preferably 30 to 100%, more preferably from 35 to 80%, still more preferably from 40 to 60%, of the thickness of the low refractive index. In other words, when the thickness of the low refractive index layer is 100 nm, the particle size of the silica fine particle is preferably from 30 to 100 nm, more preferably from 35 to 80 nm, still more preferably from 40 to 60 nm.

If the particle size of the silica fine particle is too small, the effect of improving the scratch resistance decreases, whereas if it excessively large, fine asperities are formed on the surface of the low refractive index layer and this deteriorates the appearance such as non-loosening of black or the integrated reflectance. The silica fine particle may be crystalline or amorphous, may be a monodisperse particle or as long as the predetermined particle size is satisfied, may be even an aggregated particle. The shape is most preferably spherical but even if amorphous, there arises no problem. These matters described with respect to the silica fine particle also apply to other inorganic particles.

The average particle size of the inorganic fine particle is measured by a Coulter counter.

In order to more reduce the increase in refractive index of the low refractive index layer, a hollow silica fine particle is preferably used. The refractive index of the hollow silica fine particle is from 1.17 to 1.40, preferably from 1.17 to 1.35, more preferably 1.17 to 1.30. The refractive index used here indicates a refractive index of the particle as a whole but does not indicate a refractive index of only silica as an outer shell forming the hollow silica particle. At this time, assuming that the radius of the vacancy inside the particle is a and the radius of the outer shell of the particle is b, the porosity x represented by the following formula (VIII):

$$x = (4\pi a^3/3)/(4\pi b^3/3) \times 100 \qquad \text{Formula (VIII)}$$

is preferably from 10 to 60%, more preferably from 20 to 60%, most preferably from 30 to 60%.

If the hollow silica particle is rendered to have more reduced refractive index and more increased porosity, the thickness of the outer shell becomes small and the strength as a particle decreases. Therefore, in view of scratch resistance, a particle having a refractive index as low as less than 1.17 is improper.

The refractive index of the hollow silica particle is measured by an Abbe's refractometer (manufactured by ATAGO K.K.)

Also, at least one silica fine particle having an average particle size of less than 25% of the thickness of the low refractive index layer (this fine particle is referred to as a "small particle-size silica fine particle") is preferably used in combination with the silica fine particle having the above-described particle size (this fine particle is referred to as a "large particle-size silica fine particle").

The small particle-size silica fine particle can be present in a space between large particle-size silica fine particles and therefore, can contribute as a holding agent of the large particle-size silica fine particle.

With a low refractive index layer thickness of 100 nm, the average particle size of the small particle-size silica fine particle is preferably from 1 to 20 nm, more preferably from 5 to 15 nm, still more preferably from 10 to 15 nm. Use of such a silica fine particle is preferred in view of the raw material cost and the holding agent effect.

The silica fine particle may be subjected to a physical surface treatment such as plasma discharge treatment and corona discharge treatment, or a chemical surface treatment with a surfactant, a coupling agent or the like, so as to stabilize the dispersion in a dispersion solution or a coating solution or to enhance the affinity for or binding property with a binder component. Use of a coupling agent is particularly preferred. As the coupling agent, an alkoxy metal compound (e.g., titanium coupling agent, silane coupling agent) is preferably used. In particular, a treatment with a silane coupling agent is effective.

This coupling agent is used as a surface treating agent for previously applying a surface treatment to an inorganic filler of the low refractive index layer before a coating solution for the low refractive index layer is prepared, but the coupling agent is preferably further added as an additive at the preparation of a coating solution for the low refractive index layer and incorporated into the layer.

The silica fine particle is preferably dispersed in a medium in advance of the surface treatment so as to reduce the load of the surface treatment.

In view of the scratch resistance, at least one layer out of these hard coat layer and low refractive index layer constituting the antireflection film of the present invention preferably contains an organosilane compound and/or a hydrolysate thereof and/or a partial condensate thereof, so-called sol component (hereinafter referred to as such), in a coating solution for forming the layer. In particular, for attaining both the antireflection performance and the scratch resistance, the low refractive index layer preferably contains an organosilane compound, a hydrolysate and/or a partial condensate thereof, and the hard coat layer preferably contains any one of an organosilane compound, a hydrolysate thereof and/or a partial condensate thereof, or a mixture thereof. This sol component is condensed to form a cured product during the drying and heating of the coating solution after the coating and works out to a binder of the layer. When the cured product has a polymerizable unsaturated bond, a binder having a three-dimensional structure is formed upon irradiation of actinic rays.

The organosilane compound is preferably represented by the following formula 3:

$$(R^{10})_m\text{—Si}(X)_{4-m} \qquad \text{Formula 3:}$$

In formula 3, $R^{10}$ represents a substituted or unsubstituted alkyl group or a substituted or unsubstituted aryl group. Examples of the alkyl group include methyl, ethyl, propyl, isopropyl, hexyl, decyl and hexadecyl. The alkyl group is preferably an alkyl group having a carbon number of 1 to 30, more preferably from 1 to 16, still more preferably from 1 to 6. Examples of the aryl group include a phenyl group and a naphthyl group, with the phenyl group being preferred.

X represents a hydrolyzable group. Examples of the group include an alkoxy group (preferably an alkoxy group having a carbon number of 1 to 5, such as methoxy group and ethoxy group), a halogen (such as Cl, Br and I) and a group represented by $R^2\text{COO}$ (wherein $R^2$ is preferably a hydrogen atom or an alkyl group having a carbon number of 1 to 5, such as $CH_3COO$ and $C_2H_5COO$). Among these, an alkoxy group is preferred, and a methoxy group and an ethoxy group are more preferred.

m represents an integer of 1 to 3, preferably 1 or 2, more preferably 1.

When a plurality of $R^{10}$s or Xs are present, the plurality of $R^{10}$s or Xs may be the same or different.

The substituent contained in $R^{10}$ is not particularly limited but examples thereof include a halogen (e.g., fluorine, chlorine, bromine), a hydroxyl group, a mercapto group, a carboxyl group, an epoxy group, an alkyl group aryl group (e.g., phenyl naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted.

When a plurality of $R^{10}$ are present, at least one is preferably a substituted alkyl group or a substituted aryl group. In particular, an organosilane compound having a vinyl polymerizable substituent, represented by the following formula (4), is preferred.

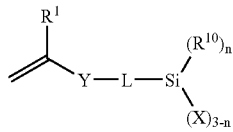

Formula (4)

In formula (4), $R^1$ represents a hydrogen, a methyl group, a methoxy group, an alkoxycarbonyl group, a cyano group, a fluorine or a chlorine. Examples of the alkoxycarbonyl group include a methoxycarbonyl group and an ethoxycarbonyl group. $R^1$ preferably represents a hydrogen, a methyl group, a methoxy group, a methoxycarbonyl group, a cyano group, a fluorine or a chlorine, more preferably a hydrogen, a methyl group, a methoxycarbonyl group, a fluorine or a chlorine, still more preferably a hydrogen or a methyl group.

Y represents a single bond, *—COO—**, *—CONH—** or *—O—**, preferably a single bond, *—COO—** or *—CONH—**, more preferably a single bond or *—COO—**, and most preferably *—COO—**. * indicates the position bonded to =C($R^1$)— and ** indicates the position bonded to L.

L represents a divalent linking chain. Specific examples thereof include a substituted or unsubstituted alkylene group, a substituted or unsubstituted arylene group, a substituted or unsubstituted alkylene group having inside a linking group (e.g., ether, ester, amido), and a substituted or unsubstituted arylene group having inside a linking group. L preferably represents a substituted or unsubstituted alkylene group, a substituted or unsubstituted arylene group or an alkylene group having inside a linking group, more preferably an unsubstituted alkylene group, an unsubstituted arylene group or an alkylene group having inside an ether or ester linking group, still more preferably an unsubstituted alkylene group or an alkylene group having inside an ether or ester linking group. Examples of the substituent include a halogen, a hydroxyl group, a mercapto group, a carboxyl group, an epoxy group, an alkyl group and an aryl group. These substituents each may be further substituted.

n represents 0 or 1. When a plurality of Xs are present, the plurality of Xs may be the same or different. n is preferably 0.

$R^{10}$ has the same meaning as in formula (3) and preferably represents a substituted or unsubstituted alkyl group or an unsubstituted aryl group, more preferably an unsubstituted alkyl group or an unsubstituted aryl group.

X has the same meaning as in formula (3) and preferably represents a halogen, a hydroxyl group or an unsubstituted alkoxy group, more preferably a chlorine, a hydroxyl group or an unsubstituted alkoxy group having a carbon number of 1 to 6, still more preferably a hydroxyl group or an alkoxy having a carbon number of 1 to 3, and particularly preferably a methoxy group.

The compounds represented by formulae (3) and (4) may be used in combination of two or more thereof. Specific examples of the compounds represented by formulae (3) and (4) are set forth below, however, the present invention is not limited thereto.

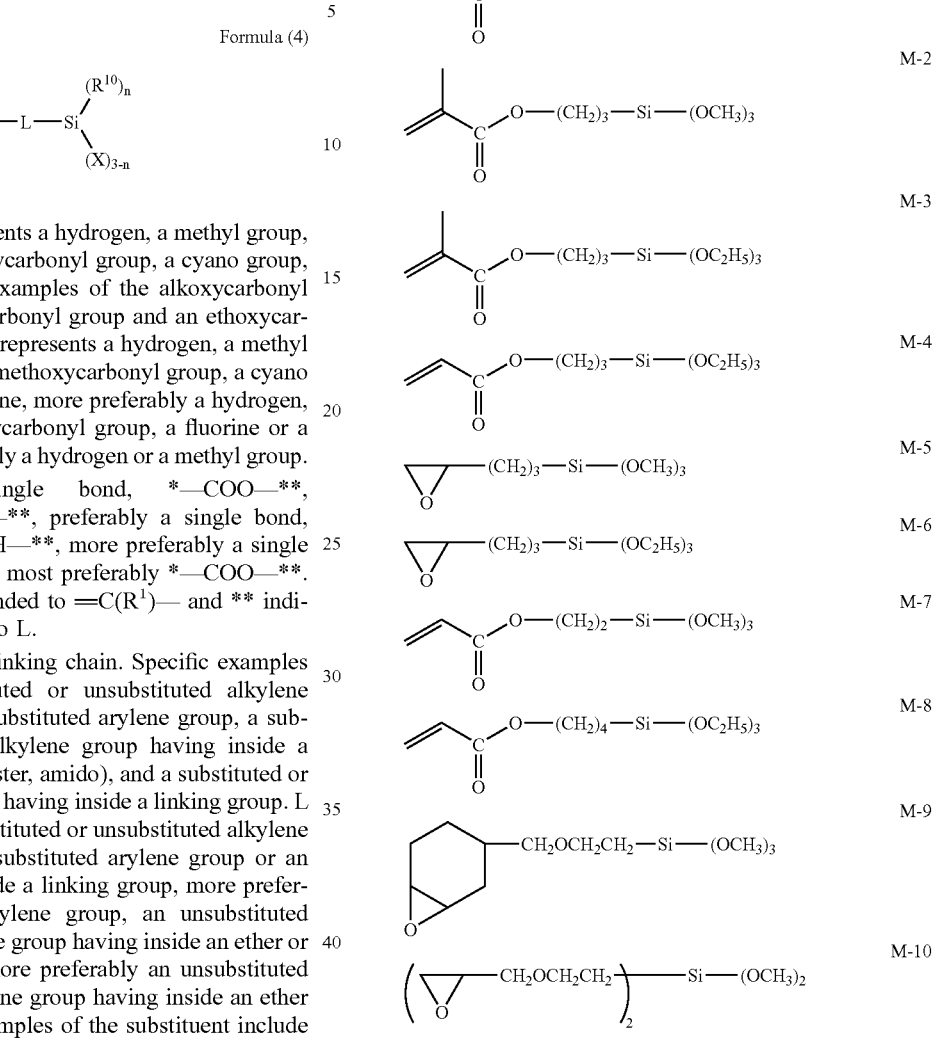

Among these, (M-1), (M-2) and (M-5) are preferred.

The hydrolysate and/or partial condensate of the organosilane compound for use in the present invention are described in detail below.

The hydrolysis and/or condensation reaction of organosilane is generally performed in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; metal alkoxides such as triisopropoxyaluminum and tetrabutoxyzirconium; and metal chelate compounds with the center metal being a metal such as Zr, Ti or Al. Among the inorganic acids, a hydrochloric acid and a sulfuric acid are preferred, and among the organic acids, those having an acid dissociation constant (pKa value (25° C.)) of 4.5 or less in water are preferred. A hydrochloric acid, a sulfuric acid and organic acids having an acid dissociation constant of 3.0 or less in water are more preferred, a hydrochloric acid, a sulfuric acid and organic acids having an acid dissociation constant of 2.5 or less in water are still more preferred, organic acids having an acid dissociation constant of 2.5 or less in water are more preferred, a methanesulfonic acid, an oxalic acid, a phthalic acid and a malonic acid are still more preferred, and an oxalic acid is particularly preferred.

The hydrolysis/condensation reaction of organosilane may be performed in a solventless system or in a solvent but in order to uniformly mix the components, an organic solvent is preferably used. Suitable examples thereof include alcohols, aromatic hydrocarbons, ethers, ketones and esters.

A solvent capable of dissolving organosilane and a catalyst is preferred. Use of the organic solvent as a coating solution or as a part of a coating solution is preferred in view of process and those which are not impaired in the solubility or dispersibility when mixed with other constitution materials such as fluorine-containing polymer are preferred.

Examples of the alcohols include monohydric alcohols and dihydric alcohols. The monohydric alcohol is preferably a saturated aliphatic alcohol having a carbon number of 1 to 8. Specific examples of these alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene acetate glycol monoethyl ether.

Specific examples of the aromatic hydrocarbons include benzene, toluene and xylene. Specific examples of the ethers include tetrahydrofuran and dioxane. Specific examples of the ketones include acetone, methyl ethyl ketone, methyl isobutyl ketone and diisobutyl ketone. Specific examples of the esters include ethyl acetate, propyl acetate, butyl acetate and propylene carbonate.

One of these organic solvents can be used alone or two or more thereof can be used as a mixture. The solid content concentration in the reaction is not particularly limited but this is usually from 1 to 90%, preferably from 20 to 70%.

The reaction is performed by adding water in an amount of 0.3 to 2 mol, preferably 0.5 to 1 mol, per mol of the hydrolyzable group of organosilane and stirring the resulting solution at 25 to 100° C. in the presence or absence of the above-described solvent and in the presence of a catalyst.

In the present invention, the hydrolysis is preferably performed by stirring the solution at 25 to 100° C. in the presence of at least one metal chelate compound where an alcohol represented by formula $R^3$ OH (wherein $R^3$ represents an alkyl group having a carbon number of 1 to 10) and a compound represented by formula $R^4COCH_2COR^5$ (wherein $R^4$ represents an alkyl group having a carbon number of 1 to 10, and $R^5$ represents an alkyl group having a carbon number of 1 to 10 or an alkoxy group having a carbon number of 1 to 10) are present as ligands and the center metal is a metal selected from Zr, Ti and Al.

The metal chelate compound is not particularly limited and any compound can be suitably used as long as it is a metal chelate compound where an alcohol represented by formula $R^3OH$ (wherein $R^3$ represents an alkyl group having a carbon number of 1 to 10) and a compound represented by formula $R^4 COCH_2COR^5$ (wherein $R^4$ represents an alkyl group having a carbon number of 1 to 10, and $R^5$ represents an alkyl group having a carbon number of 1 to 10 or an alkoxy group having a carbon number of 1 to 10) are present as ligands and the center metal is a metal selected from Zr, Ti and Al. The metal chelate compound for use in the present invention is preferably selected from the compounds represented by formulae $Zr(OR^3)_{p1}(R^4COCHCOR^5)_{p2}$, $Ti(OR^3)_{q1}(R^4COCHCOR^5)_{q2}$ and $Al(OR^3)_{r1}(R^4COCHCOR^5)_{r2}$, and this compound has an activity of accelerating the condensation reaction of a hydrolysate and/or a partial condensate of the organosilane compound.

In the metal chelate compound, $R^3$ and $R^4$ may be the same or different and each represents an alkyl group having a carbon number of 1 to 10, specifically, an ethyl group, an n-propyl group, an i-propyl group, a n-butyl group, a sec-butyl group, a tert-butyl group, an n-pentyl group, a phenyl group or the like. $R^5$ represents the same alkyl group having a carbon number of 1 to 10 as above or an alkoxy group having a carbon number of 1 to 10, such as methoxy group, ethoxy group, n-propoxy group, i-propoxy group, n-butoxy group, sec-butoxy group and tert-butoxy group. Also, in the metal chelate compound, p1, p2, q1, q2, r1 and r2 each represents an integer determined to satisfy the relationships of p1+p2=4, q1+q2=4 and r1+r2=3.

Specific examples of the metal chelate compound include zirconium chelate compounds such as zirconium tri-n-butoxyethylacetoacetate, zirconium di-n-butoxy-bis(ethylacetoacetate), zirconium n-butoxy-tris(ethylacetoacetate), zirconium tetrakis(n-propylacetoacetate), zirconium tetrakis (acetylacetoacetate) and zirconium tetrakis (ethylacetoacetate); titanium chelate compounds such as titanium diisopropoxy-bis(ethylacetoacetate), titanium diisopropoxy-bis(acetylacetate) and titanium diisopropoxy-bis(acetylacetone); and aluminum chelate compounds such as aluminum diisopropoxyethylacetoacetate, aluminum diisopropoxyacetylacetonate, aluminum isopropoxy-bis (ethylacetoacetate), aluminum isopropoxy-bis(acetylacetonate), aluminum tris(ethylacetoacetate), aluminum tris(ethylacetonate), aluminum tris(acetylacetonate) and aluminum monoacetylacetonato-bis(ethylacetoacetate).

Among these metal chelate compounds, preferred are zirconium tri-n-butoxyethylacetoacetate, titanium diisopropoxy-bis(acetylacetonate), aluminum diisopropoxyethylacetoacetate and aluminum tris (ethylacetoacetate). These meal chelate compounds can be used individually or as a mixture of two or more thereof. A partial hydrolysate of these metal chelate compounds may also be used.

The metal chelate compound is preferably used in an amount of 0.01 to 50 mass %, more preferably from 0.1 to 50 mass %, still more preferably from 0.5 to 10 mass %, based on the organosilane compound. If the amount added is less than 0.01 mass %, the condensation reaction of the organosilane compounds proceeds slowly and the coating film may be worsened in the durability, whereas if it exceeds 50 mass %, the composition comprising a hydrolysate and/or a partial condensate of the organosilane compound may be deteriorated in the storage stability and therefore, this is not preferred.

In the coating solution for forming the hard coat layer or low refractive index layer used in the present invention, a β-diketone compound and/or β-ketoester compound is preferably added in addition to the composition containing the metal chelate compound and a hydrolysate and/or a partial condensate of the organosilane compound. This is further described below.

The compound for use in the present invention is a β-diketone compound and/or a β-ketoester compound represented by the formula $R^4COCH_2COR^5$ and this compound has an activity as a stability enhancer for the composition used in the present invention. That is, this compound is considered to coordinate to a metal atom in the metal chelate compound (zirconium, titanium and/or aluminum compound) and suppress the metal chelate compound from exerting the activity of accelerating the condensation reaction of a hydrolysate and/or a partial condensate of the organosilane compound, thereby improving the storage stability of the composition obtained. $R^4$ and $R^5$ constituting the β-diketone compound and/or β-ketoester compound have the same meanings as $R^4$ and $R^5$ constituting the metal chelate compound.

Specific examples of the β-diketone compound and/or β-ketoester compound include acetylacetone, methyl acetoacetate, ethyl acetoacetate, n-propyl acetoacetate, i-propyl acetoacetate, n-butyl acetoacetate, sec-butyl acetoacetate, tert-butyl acetoacetate, 2,4-hexane-dione, 2,4-heptane-dione, 3,5-heptane-dione, 2,4-octane-dione, 2,4-nonane-dione and 5-methyl-hexane-dione. Among these, ethyl acetoacetate and acetylacetone are preferred, and acetylacetone is more preferred. These β-diketone compounds and/or β-ketoester compounds can be used individually or as a mixture of two or more thereof. In the present invention, the β-diketone compound and/or β-ketoester compound is preferably used in an amount of 2 mol or more, more preferably from 3 to 20 mol, per mol of the metal chelate compound. If the amount added is less than 2 mol, the composition may be poor in the storage stability and this is not preferred.

The content of the hydrolysate and/or partial condensate of the organosilane compound is preferably small in a surface layer which is a relatively thin film, and large in a lower layer which is a thick film. In the case of a surface layer such as low refractive index layer, the content is preferably from 0.1 to 50 mass %, more preferably from 0.5 to 20 mass %, still more preferably from 1 to 10 mass %, based on the entire solid content of the containing layer (layer to which added).

The amount added to a layer other than the low refractive index layer is preferably from 0.001 to 50 mass %, more preferably from 0.01 to 20 mass %, still more preferably from 0.05 to 10 mass %, particularly preferably from 0.1 to 5 mass %, based on the entire solid content of the containing layer (layer to which added).

In the present invention, it is preferred to first prepare a composition containing the metal chelate compound and a hydrolysate and/or a partial condensate of the organosilane compound, add the β-diketone compound and/or β-ketoester compound thereto, incorporate the resulting solution into a coating solution for at least one layer of the hard coat layer and the low refractive index layer, and apply the coating solution.

In the low refractive index layer, the amount of the organosilane sol component used is preferably from 5 to 100 mass %, more preferably from 5 to 40 mass %, still more preferably from 8 to 35 mass %, particularly preferably from 10 to 30 mass %, based on the fluorine-containing polymer. If the amount used is small, the effect of the present invention can be hardly obtained, whereas if it is too large, the refractive index may increase or the shape and surface state of film may deteriorate and this is not preferred.

In the antireflection film of the present invention, an inorganic filler is preferably added to each layer on the transparent support. The inorganic fillers added to respective layers may be the same or different and it is preferred to appropriately select the kind and the amount added according to the required performance of each layer, such as refractive index, film strength, film thickness and coatability.

As already described above, the inorganic filler used in the low refractive index layer preferably contains a silica fine particle.

The shape of the inorganic filler for use in the present invention is not particularly limited and, for example, a spherical form, a plate form, a fiber form, a bar form, an amorphous form and a hollow form all can be preferably used but a spherical form is more preferred because good dispersibility can be obtained. The kind of the inorganic filler is also not particularly limited but an amorphous filler is preferably used. Those comprising an oxide, nitride, sulfide or halide of metal are preferred and metal oxides are more preferred. Examples of the metal atom include Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni. For obtaining a transparent cured film, the average particle size of the inorganic filler is preferably from 0.001 to 0.2 µm, more preferably from 0.001 to 0.1 µm, still more preferably from 0.001 to 0.06 µm. Here, the average particle size of the particle is measured by a Coulter counter.

In the present invention, the use method of the inorganic filler is not particularly limited but, for example, the inorganic filler may be used in a dry state or in a state of being dispersed in water or an organic solvent.

In the present invention, a dispersion stabilizer is preferably used in combination in the coating solution for forming each layer so as to prevent aggregation and precipitation of the inorganic filler. Examples of the dispersion stabilizer which can be used include polyvinyl alcohol, polyvinylpyrrolidone, cellulose derivatives, polyamide, phosphoric acid ester, polyether, surfactants, silane coupling agent and titanium coupling agent. Among these, silane coupling agent is preferred because the film after curing is strong. The amount of the silane coupling agent added as the dispersion stabilizer is not particularly limited but this is preferably 1 part by mass or more per 100 parts by mass of the inorganic filler. The method for adding the dispersion stabilizer is also not particularly limited but a method of previously hydrolyzing and then adding the dispersion stabilizer or a method of mixing a silane coupling agent as the dispersion stabilizer with an inorganic filler and hydrolyzing and condensing the mixture may be used. The latter method is preferred.

The inorganic fillers suitable for respective layers are described later.

The low refractive index layer-forming composition for use in the present invention, which is usually in the liquid form, is produced by dissolving the copolymer as an essential constituent component and if desired, various additives and a radical polymerization initiator in an appropriate solvent. At this time, the concentration of solid contents is appropriately selected according to use but is generally on the order of 0.01 to 60 mass %, preferably from 0.5 to 50 mass %, more preferably from 1 to 20 mass %.

As described above, the addition of additives such as curing agent is not necessarily advantageous in view of the film hardness of the low refractive index layer, however, in view of the interface adhesion to a high refractive index layer or the like, a curing agent such as polyfunctional (meth)acrylate compound, polyfunctional epoxy compound, polyisocyanate compound, aminoplast, polybasic acid and their anhydrate, or an inorganic fine particle such as silica, may be added in a small amount. In the case of adding such an additive, the amount added is preferably from 0 to 30 mass %, more preferably from 0 to 20 mass %, still more preferably from 0 to 10 mass %, based on the entire solid content of the low refractive index layer film.

For the purpose of imparting properties such as slipperiness and resistance against soil, water and chemicals, known silicon-base or fluorine-base stain-proofing agent, slipping agent and the like can be appropriately added. In the case of adding such an additive, the additive is preferably added in the range from 0.01 to 20 mass %, more preferably from 0.05 to 10 mass %, still more preferably from 0.1 to 5 mass %, based on the entire solid content of lower n layers.

Preferred examples of the silicone-base compound include compounds having a plurality of dimethylsilyloxy units as the repeating unit and having a substituent at the chain terminal and/or on the side chain. In the chain of the compound containing dimethylsilyloxy as the repeating unit, a structural unit other than dimethylsilyloxy may be contained. A plurality of substituents are preferably present and the substituents may be the same or different. Preferred examples of the substituent include groups containing an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group, an amino group or the like. The molecular weight is not particularly limited but is preferably 100,000 or less, more preferably 50,000 or less, and most preferably from 3,000 to 30,000. The silicone atom content of the silicone-base compound is not particularly limited but is preferably 18.0 mass % or more, more preferably from 25.0 to 37.8 mass %, and most preferably from 30.0 to 37.0 mass %. Specific preferred examples of the silicone-base compound include X-22-174DX, X-22-2426, X-22-164B, X22-164C, X-22-170DX, X-22-176D and X-22-1821 (all are trade names) produced by Shin-Etsu Chemical Co., Ltd., and FM-0725, FM-7725, DMS-U22, RMS-033, RMS-083 and UMS-182 (all are trade names) produced by Chisso Corporation, however, the present invention is not limited thereto.

The fluorine-base compound is preferably a compound having a fluoroalkyl group. The fluoroalkyl group is preferably a fluoroalkyl group having a carbon number of 1 to 20, more preferably from 1 to 10, and may be linear (for example, $-CF_2CF_3$, $-CH_2(CF_2)_4H$, $-CH_2(CF_2)_8CF_3$ and $-CH_2CH_2(CF_2)_4H$), branched (for example, $CH(CF_3)_2$, $CH_2CF(CF_3)_2$, $CH(CH_3)CF_2CF_3$ and $CH(CH_3)(CF_2)_5CF_2H$) or alicyclic (preferably a 5- or 6-membered ring, for example, a perfluorocyclohexyl group, a perfluorocyclopentyl group and an alkyl group substituted by such a group) or may have an ether bond (for example, $CH_2OCH_2CF_2CF_3$, $CH_2CH_2OCH_2C_4FBH$, $CH_2CH_2OCH_2CH_2C_8F_{17}$ and $CH_2CH_2OCF_2CF_2OCF_2CF_2H$). A plurality of the fluoroalkyl groups may be contained within one molecule.

The fluorine-base compound preferably further has a substituent which contributes to the bond formation or compatibility with the low refractive index layer film. A plurality of substituents are preferably present and the substituents may be the same or different. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group and an amino group. The fluorine-base compound may be a polymer or an oligomer with a compound not containing a fluorine atom. The molecular weight is not particularly limited. The fluorine atom content of the fluorine-base compound is not particularly limited but is preferably 20 mass % or more, more preferably from 30 to 70 mass %, and most preferably from 40 to 70 mass %. Specific preferred examples of the fluorine-base compound include R-2020, M-2020, R-3833 and M-3833 (all are trade names) produced by Daikin Kogyo Co., Ltd., and Megafac F-171, F-172, F-179A and DAYFENSA MCF-300 (all are trade names) produced by Dai-Nippon Ink & Chemicals, Inc.), however, the present invention is not limited thereto.

For the purpose of imparting properties such as dust protective property and antistatic property, a dust inhibitor, an antistatic agent and the like such as known cationic surfactant or polyoxyalkylene-base compound may be appropriately added. Also, a structural unit of such a dust inhibitor or antistatic agent may be contained in the above-described silicone-base compound or fluorine-base compound as a part of functions. In the case of adding such an additive, the additive is preferably added in the range from 0.01 to 20 mass %, more preferably from 0.05 to 10 mass %, still more preferably from 0.1 to 5 mass %, based on the entire solid content of lower n layers Preferred examples of the compound include Megafac F-150™ produced by Dai-Nippon Ink & Chemicals, Inc.) and SH-3748™ produced by Toray Dow Corning, however, the present invention is not limited thereto.

The antiglare hard coat layer of the present invention is described below.

The antiglare hard coat layer is composed of a binder for imparting the hard coat property, a matting particle for imparting the antiglare property, and an inorganic filler for bringing a high refractive index and a high strength and preventing the crosslinking shrinkage.

The binder is preferably a polymer having a saturated hydrocarbon chain or a polyether chain as the main chain, more preferably a polymer having a saturated hydrocarbon chain as the main chain.

The binder polymer also preferably has a crosslinked structure.

The binder polymer having a saturated hydrocarbon chain as the main chain is preferably a polymer of an ethylenically unsaturated monomer. The binder polymer having a saturated hydrocarbon chain as the main chain and having a crosslinked structure is preferably a (co)polymer of a monomer having two or more ethylenically unsaturated groups.

In order to give a high refractive index, the monomer preferably contains in the structure thereof an aromatic ring or at least one atom selected from the group consisting of halogen atoms (excluding fluorine), a sulfur atom, a phosphorus atom and a nitrogen atom.

Examples of the monomer having two or more ethylenically unsaturated groups include esters of polyhydric alcohol and (meth)acrylic acid (e.g., ethylene glycol di(meth)acrylate 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta (meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate), vinylbenzenes and derivatives thereof (e.g., 1,4-divinylbenzene, 4-vinylbenzoic acid-2-acryloylethyl ester, 1,4-divinylcyclohexanone), vinylsulfones (e.g., divinylsulfone), acrylamides (e.g., methylenebisacrylamide) and methacrylamides. These monomers may be used in combination of two or more thereof.

Specific examples of the high refractive index monomer include bis(4-methacryloylthiophenyl)sulfide, vinylnaphthalene, vinylphenylsulfide and 4-methacryloxyphenyl-4'-methoxyphenylthioether. These monomers may also be used in combination of two or more thereof.

The polymerization of such a monomer having ethylenically unsaturated groups may be performed under irradiation of ionizing radiation or under heat in the presence of a photo-radical polymerization initiator or a heat-radical polymerization initiator.

Accordingly, the antireflection film can be formed by preparing a coating solution containing a monomer having ethylenically unsaturated groups, a photo- or heat-radical polymerization initiator, a matting particle and an inorganic filler, applying the coating solution to a transparent support, and curing the coating solution through a polymerization reaction under ionizing radiation or heat.

Examples of the photo-radical polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums. Examples of the acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)-butanone. Examples of the benzoins include benzoin benzenesulfonic acid ester, benzoin toluenesulfonic acid ester, benzoin methyl ether, benzoin ethyl ether and benzoin isopropyl ether. Examples of the benzophenones include benzophenone, 2,4-dichlorobenzophenone, 4,4-dichlorobenzophenone and p-chlorobenzophenone. Examples of the phosphine oxides include 2,4,6-trimethyl-benzoyldiphenylphosphine oxide Also, various examples are described in *Saishin UV Koka Gijutsu* (*Newest UV Curing Technology*), page 159, Kazuhiro Takausu (publisher), Gijutsu Joho Kyokai (publishing company) (1991) and these are useful in the present invention.

Preferred examples of the commercially available photo-cleavable photo-radical polymerization initiator include Irgacure (651, 184 and 907) produced by Nippon Ciba Geigy.

The photopolymerization initiator is preferably used in an amount of 0.1 to 15 parts by mass, more preferably from 1 to 10 parts by mass, per 100 parts by mass of the polyfunctional monomer.

In addition to the photopolymerization initiator, a photosensitizer may be used. Specific examples of the photosensitizer include n-butylamine, triethylamine, tri-n-butylphosphine, Michler's ketone and thioxanthone.

Examples of the heat-radical polymerization initiator which can be used include organic or inorganic peroxides and organic azo or diazo compounds.

Specific examples of the organic peroxide include benzoyl peroxide, halogen benzoyl peroxide, lauroyl peroxide, acetyl peroxide, dibutyl peroxide, cumene hydroperoxide and butyl hydroperoxide. Specific examples of the inorganic peroxide include hydrogen peroxide, ammonium persulfate and potassium persulfate. Specific examples of the azo compound include 2-azo-bis-isobutyronitrile, 2-azo-bis-propionitrile and 2-azo-bis-cyclohexanedinitrile. Specific examples of the diazo compound include diazoaminobenzene and p-nitrobenzenediazonium.

The polymer having a polyether as the main chain is preferably a ring-opening polymer of a polyfunctional epoxy compound. The ring-opening polymerization of a polyfunctional epoxy compound can be performed under irradiation of ionizing radiation or under heat in the presence of a photoacid generator or a heat-acid generator.

Accordingly, the antireflection film can be formed by preparing a coating solution containing a polyfunctional epoxy compound, a photoacid or heat-acid generator, a matting particle and an inorganic filler, applying the coating solution to a transparent support and curing the coating solution through a polymerization reaction under ionizing radiation or heat.

In place of or in addition to the monomer having two or more ethylenically unsaturated groups, a monomer having a crosslinkable functional group may be used to introduce a crosslinkable functional group into the polymer, so that by the reaction of this crosslinkable functional group, a crosslinked structure can be introduced into the binder polymer.

Examples of the crosslinkable functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivative, a melamine, an etherified methylol, an ester, a urethane or a metal alkoxide such as tetramethoxysilane can be used as a monomer for introducing a crosslinked structure. A functional group which exhibits crosslinking property as a result of the decomposition reaction, such as block isocyanate group, may also be used. In other words, the crosslinkable functional group for use in the present invention may be a group which does not directly cause a reaction but exhibits reactivity as a result of the decomposition.

The binder polymer having this crosslinkable functional group is coated and then heated, whereby a crosslinked structure can be formed.

For the purpose of imparting the antiglare property, the antiglare hard coat layer contains a matting agent larger than the filler particle and having an average particle size of 1 to 10 µm, preferably from 1.5 to 7.0 µm, for example, an inorganic compound particle or a resin particle.

Specific preferred examples of the matting particle include an inorganic compound particle such as silica particle and $TiO_2$ particle; and a resin particle such as acryl particle, crosslinked acryl particle, polystyrene particle, crosslinked styrene particle, melamine resin particle and benzoguanamine resin particle. Among these, crosslinked styrene particle, crosslinked acryl particle and silica particle are more preferred.

The shape of the matting particle may be either true spherical or amorphous.

Also, two or more kinds of matting particles differing in the particle size may be used in combination. The matting agent having a larger particle size can impart the antiglare property and the matting particle having a smaller particle size can impart a different optical property. For example, when an antireflection film is attached to a high-definition display of 133 ppi or more, this is required to cause no trouble called glare in the optical performance. The glare is attributable to a phenomenon that the picture element is enlarged or reduced due to asperities (contributing to the antiglare property) present on the film surface and the uniformity of brightness is lost. This glare can be greatly improved by using in combination a matting particle having a particle size smaller than that of the matting particle for imparting the antiglare property and having a refractive index different from that of the binder.

The particle size distribution of this matting particle is most preferably monodisperse. Individual particles preferably have the same particle size as much as possible. For example, when a particle having a particle size 20% or more larger than the average particle size is defined as a coarse particle, the percentage of the coarse particle occupying in the total number of particles is preferably 1% or less, more preferably 0.1% or less, still more preferably 0.01% or less. The matting particle having such a particle size distribution is obtained by performing the classification after the normal synthesis reaction. By increasing the number of classification operations or intensifying the classification degree, a matting agent having a more preferred distribution can be obtained.

This matting particle is contained in the antiglare hard coat layer such that the amount of the matting particle in the formed antiglare hard coat layer is preferably from 10 to 1,000 mg/m$^2$, more preferably from 100 to 700 mg/m$^2$.

The particle size distribution of the matting particle is measured by a Coulter counter method and the measured distribution is converted into the particle number distribution.

In addition to the above-described matting particle, the antiglare hard coat layer preferably contains an inorganic filler comprising an oxide of at least one metal selected from the group consisting of titanium, zirconium, aluminum, indium, zinc, tin and antimony and having an average particle size of 0.2 μm or less, preferably 0.1 μm or less, more preferably 0.06 μm or less, so as to increase the refractive index of the antiglare layer.

Conversely, for increasing the difference in the refractive index from the matting particle, it is also preferred to use an oxide of silicon in the antiglare hard coat layer using a high refractive index matting particle so as to keep lower the refractive index of the layer. The preferred particle size is same as that of the inorganic filler.

Specific examples of the inorganic filler for use in the antiglare hard coat layer include $TiO_2$, $ZrO_2$, $Al_2O_3$, $In_2O_3$, ZnO, $SnO_2$, $Sb_2O_3$, ITO and $SiO_2$. Among these inorganic fillers, $TiO_2$ and $ZrO_2$ are preferred from the standpoint of attaining a high refractive index. The surface of the inorganic filler is preferably subjected to a silane coupling treatment or a titanium coupling treatment. A surface treating agent having a functional group capable of reacting with the binder species on the filler surface is preferably used.

The amount of the inorganic filler added is preferably from 10 to 90%, more preferably from 20 to 80%, still more preferably from 30 to 75%, based on the entire mass of the antiglare hard coat layer.

This filler has a particle size sufficiently smaller than the wavelength of light and therefore, causes no scattering and the dispersion obtained by dispersing the filler in the binder polymer behaves as an optically uniform substance.

The bulk refractive index of the binder and inorganic filler mixture in the antiglare hard coat layer of the present invention is preferably 1.48 to 2.00, more preferably from 1.50 to 1.80. The refractive index in this range can be attained by appropriately selecting the kind and the amount ratio of binder and inorganic filler. How to select can be easily known in advance by an experiment.

In the present invention, for ensuring surface state uniformity of the antiglare hard coat layer by preventing particularly coating unevenness, drying unevenness, spot defect and the like, either one or both of a fluorine-containing surfactant and a silicon-containing surfactant is(are) incorporated into the coating composition for the formation of the antiglare layer. In particular, a fluorine-containing surfactant is preferred, because the effect of improving the surface failure of the anti-reflection film of the present invention, such as coating unevenness, drying unevenness and spot defect, can be obtained by the addition in a smaller amount.

These surfactants are added for the purpose of imparting high-speed coatability while enhancing the surface state uniformity and thereby increasing the productivity.

Preferred examples of the fluorine-base surfactant include a fluoro-aliphatic group-containing copolymer (sometimes simply referred to as a "fluorine-base polymer"). As the fluorine-base polymer, an acrylic resin and a methacrylic resin each containing a repeating unit corresponding to the following monomer (i) and a repeating unit corresponding to the following monomer (ii), and a copolymer with a vinyl-base monomer copolymerizable therewith are useful.

(i) Fluoro-Aliphatic Group-Containing Monomer Represented by the Following Formula 5

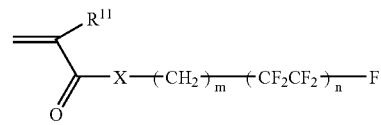

Formula 5

In formula 5, $R^{11}$ represents a methyl group, X represents an oxygen atom, a sulfur atom or $-N(R^{12})-$, m represents an integer of 1 to 6, n represents an integer of 2 or 3, and $R^{12}$ represents a hydrogen atom or an alkyl group having a carbon number of 1 to 4, such as methyl group, ethyl group, propyl group or butyl group, preferably a hydrogen atom or a methyl group. X is preferably an oxygen atom.

In formula 5, m is preferably an integer of 1 to 6, more preferably 2.

In formula 5, n is an integer of 1 to 3 and a mixture of n=1 to 3 may also be used.

(ii) Monomer Copolymerizable with Monomer (i), Represented by the Following Formula 6

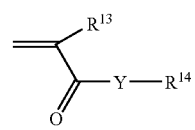

Formula 6

In formula 6, $R^{13}$ represents a hydrogen atom or a methyl group, Y represents an oxygen atom, a sulfur atom or $-N(R^{15})-$, and $R^{15}$ represents a hydrogen atom or an alkyl group having a carbon number of 1 to 4, such as methyl group, ethyl group, propyl group or butyl group, preferably a hydrogen atom or a methyl group. Y is preferably an oxygen atom, $-N(H)-$ or $-N(CH_3)-$.

$R^{14}$ represents a linear, branched or cyclic alkyl group having a carbon number of 4 to 20, which may have a substituent. Examples of the substituent of the alkyl group represented by $R^{14}$ include a hydroxyl group, an alkylcarbonyl group, an arylcarbonyl group, a carboxyl group, an alkylether group, an arylether group, a halogen atom such as fluorine atom, chlorine atom and bromine atom, a nitro group, a cyano group and an amino group, however, the present invention is not limited thereto. Suitable examples of the linear, branched or cyclic alkyl group having a carbon number of 4 to 20 include a linear or branched butyl group, a linear or branched pentyl group, a linear or branched hexyl group, a linear or branched heptyl group, a linear or branched octyl group, a linear or branched nonyl group, a linear or branched decyl group, a linear or branched undecyl group, a linear or branched dodecyl group, a linear or branched tridecyl group, a linear or branched tetradecyl group, a linear or branched pentadecyl group, a linear or branched octadecyl group, a linear or branched eicosanyl group, a monocyclic cycloalkyl group such as cyclohexyl group and cycloheptyl group, and a polycyclic cycloalkyl group such as bicycloheptyl group, bicyclodecyl group, tricycloundecyl group, tetracyclododecyl group, adamantyl group, norbornyl group and tetracyclodecyl group.

The amount of the fluoro-aliphatic group-containing monomer represented by formula 4, which is used in the fluorine-base polymer for use in the present invention, is 10 mol % or more, preferably from 15 to 70 mol %, more preferably from 20 to 60 mol %, based on each monomer of the fluorine-base polymer.

The mass average molecular weight of the fluorine-base polymer for use in the present invention is preferably from 3,000 to 100,000, more preferably from 5,000 to 80,000.

The amount added of the fluorine-base polymer for use in the present invention is preferably from 0.001 to 5 mass %, more preferably from 0.005 to 3 mass %, still more preferably from 0.01 to 1 mass %, based on the coating solution. If the amount of the fluorine-base polymer added is less than 0.001 mass %, the effect is insufficient, whereas if it exceeds 5 mass %, the coating film is not sufficiently dried or the performance (for example, reflectance and scratch resistance) as the coating film is adversely affected.

Specific structural examples of the fluorine-base polymer for use in the present invention are set forth below, however, the present invention is not limited thereto. In formulae, the numeral indicates the molar ratio of each monomer component and Mw indicates the mass average molecular weight.

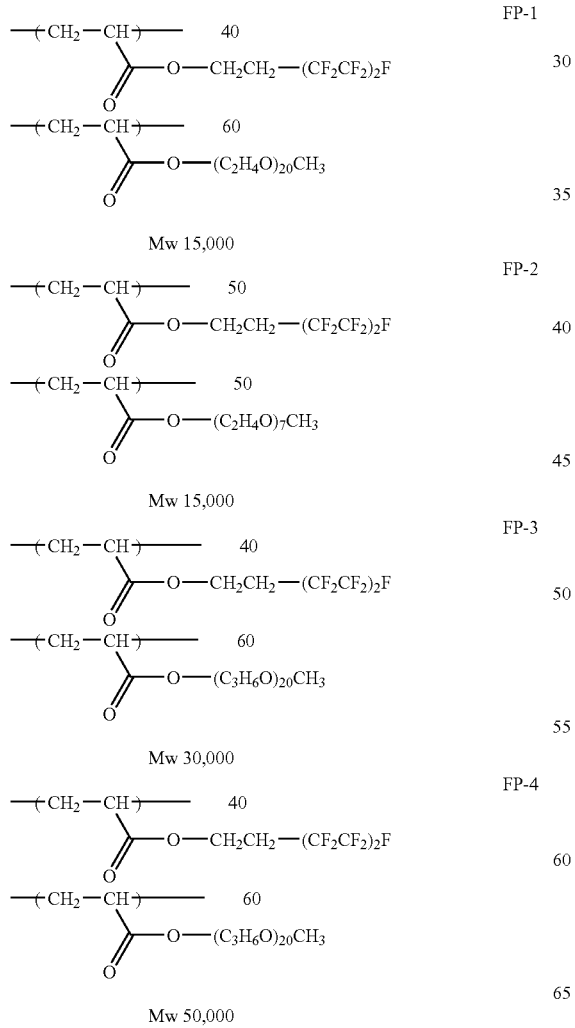

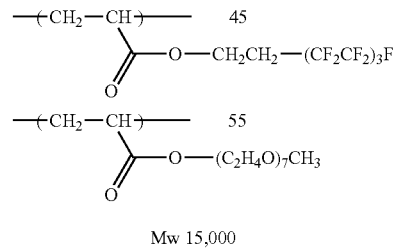

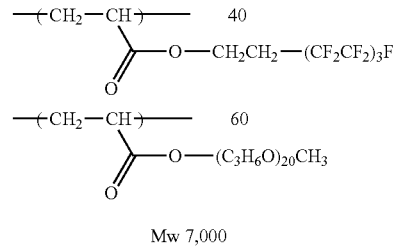

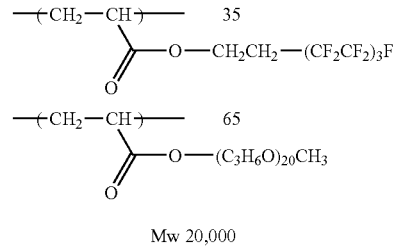

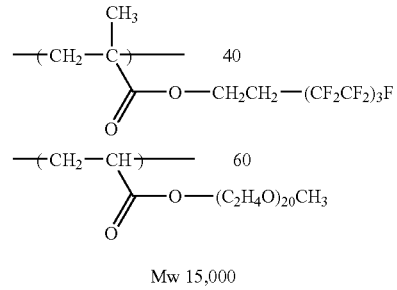

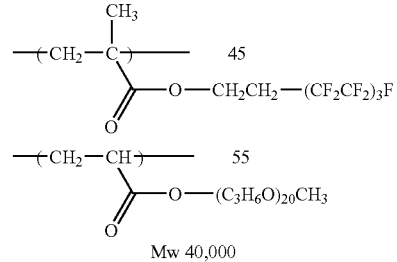

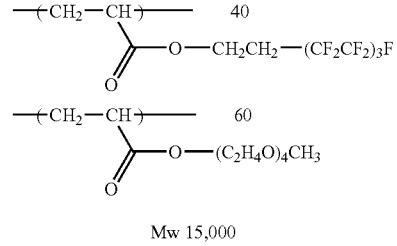

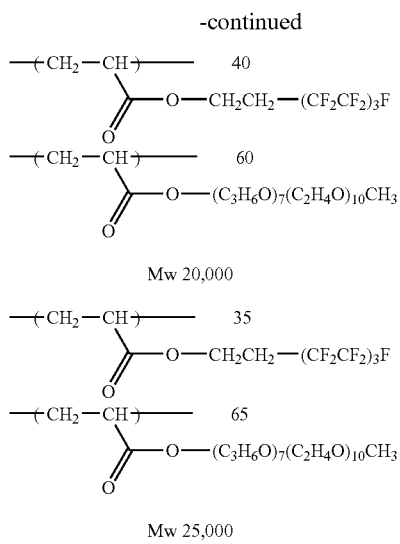

FP-11

FP-12

However, when the above-described fluorine-base polymer is used, the functional group containing F atom segregates on the hard coat layer surface, as a result, the surface energy of the hard coat layer decreases and this causes a problem that when a low refractive index layer is overcoated on the hard coat layer, the antireflection performance is worsened. This is presumed to occur because the coating composition for the formation of the low refractive index layer decreases in the wettability and the visually undetectable fine unevenness in the film thickness of the low refractive index layer is more intensified. For solving this problem, it has been found effective to control the surface energy of the hard coat layer to preferably 20 to 50 mN·m$^{-1}$, more preferably from 30 to 40 mN·m$^{-1}$, by adjusting the structure and amount added of the fluorine-base polymer. For realizing such a surface energy, the F/C which is a ratio of the peak attributable to a fluorine atom to the peak attributable to a carbon atom as measured by X-ray photoelectric spectrometry must be from 0.1 to 1.5.

Also, when the surface energy is not decreased at the time of overcoating the low refractive index layer on the hard coat layer, the deterioration of the antireflection performance can be prevented. At the coating of the hard coat layer, the surface tension of the coating solution is decreased by using a fluorine-base polymer to enhance the surface state uniformity and maintain the high productivity owing to high-speed coating and after the coating of the hard coat layer, the decrease of the surface free energy is prevented by using a surface treatment such as corona treatment, UV treatment, heat treatment, saponification treatment or solvent treatment, preferably corona treatment, whereby the surface energy of the hard coat layer before the coating of the low refractive index layer can be controlled to fall within the above-described range and thereby the purpose can be achieved.

The film thickness of the antiglare hard coat layer is preferably from 1 to 10 μm, more preferably from 1.2 to 6 μm.

The present inventors have also confirmed that the scattered light intensity distribution measured by a goniophotometer is correlated with the effect of improving the view angle. That is, as the light emitted from the backlight is more diffused by the light-diffusing film provided on the polarizing plate surface in the viewing side, the view angle properties are more improved. However, if the light is excessively diffused, the back scattering increases and the front brightness decreases or too large scattering is generated to cause problems such as deterioration of image sharpness. Therefore, the scattered light intensity distribution must be controlled to a certain range. As a result of extensive investigations, it has been found that for achieving the desired visibility properties, the scattered light intensity at 30° particularly correlated with the view angle-improving effect is preferably from 0.01 to 0.2%, more preferably from 0.02 to 0.15%, still more preferably from 0.03 to 0.1%, based on the light intensity at an exit angle of 0° in a scattered light profile.

The scattered light profile of the produced light-scattering film can be measured using an autogoniophotometer, Model GP-5, manufactured by Murakami Color Research Laboratory.

[High Refractive Index Layer]

In the antireflection film of the present invention, in order to impart higher antireflection performance, a high refractive index layer can also be preferably used.

(Inorganic Fine Particle Mainly Comprising titanium Dioxide)

The high refractive index layer for use in the present invention contains an inorganic fine particle comprising, as the main component, a titanium dioxide containing at least one element selected from cobalt, aluminum and zirconium. The main component means a component of which content (mass %) is highest among the components constituting the particle.

The refractive index of the high refractive index layer for use in the present invention is from 1.55 to 2.40 and this is a layer called a high refractive index layer or a medium refractive index layer, however, in the present invention, these layers are sometimes collectively called a high refractive index layer.

The inorganic fine particle mainly comprising titanium dioxide for use in the present invention preferably has a refractive index of 1.90 to 2.80, more preferably from 2.10 to 2.80, and most preferably from 2.20 to 2.80.

The mass average primary particle size of the inorganic fine particle mainly comprising titanium dioxide is preferably from 1 to 200 nm, more preferably from 1 to 150 nm, still more preferably from 1 to 100 nm, particularly preferably from 1 to 80 nm.

The particle size of the inorganic fine particle can be measured by a light scattering method or an electron microscopic photograph. The specific surface area of the inorganic fine particle is preferably from 10 to 400 m$^2$/g, more preferably from 20 to 200 m$^2$/g, and most preferably from 30 to 150 m$^2$/g.

As for the crystal structure of the inorganic fine particle mainly comprising titanium dioxide, the main component is preferably a rutile structure, a rutile/anatase mixed crystal, an anatase structure or an amorphous structure, more preferably a rutile structure. The main component means a component of which content (mass %) is highest among the components constituting the particle.

By containing at least one element selected from Co (cobalt), Al (aluminum) and Zr (zirconium) in the inorganic fine particle mainly comprising titanium dioxide, the photocatalytic activity of the titanium dioxide can be suppressed and the weather resistance of the high refractive index layer for use in the present invention can be improved.

The element is preferably Co (cobalt). A combination use of two or more elements is also preferred.

The contents of Co (cobalt), Al (aluminum) and Zr (zirconium) each is preferably from 0.05 to 30 mass %, more preferably from 0.1 to 10 mass %, still more preferably from 0.2 to 7 mass %, particularly preferably from 0.3 to 5 mass %, and most preferably from 0.5 to 3 mass %, based on Ti (titanium).

Co (cobalt), Al (aluminum) or Zr (zirconium) can be present at least in either the inside or the surface of the inorganic fine particle mainly comprising titanium dioxide, but the element is preferably present in the inside of the inorganic fine particle mainly comprising titanium dioxide, most preferably in both the inside and the surface.

Co (cobalt), Al (aluminum) or Zr (zirconium) can be made to exist (for example, doped) in the inside of the inorganic fine particle mainly comprising titanium dioxide by various methods. Examples of the method include an ion injection method (see, Yasushi Aoki, Vol. 18, No. 5, pp. 262-268 (1998)) and methods described in JP-A-11-263620, JP-T-11-512336 (the term "JP-T" as used herein means a published Japanese translation of a PCT patent application), EP-A-0335773 and JP-A-5-330825.

A method of introducing Co (cobalt), Al (aluminum) or Zr (zirconium) in the particle formation process of forming the inorganic fine particle mainly comprising titanium dioxide (see, for example, JP-T-11-512336, EP-A-0335773 and JP-A-5-330825) is particularly preferred.

Co (cobalt), Al (aluminum) or Zr (zirconium) is also preferably present in the form of an oxide.

The inorganic fine particle mainly comprising titanium dioxide may further contain other elements according to the purpose. Other elements may be contained as impurities. Examples of other elements include Sn, Sb, Cu, Fe, Mn, Pb, Cd, As, Cr, Hg, Zn, Mg, Si, P and S.

The inorganic fine particle mainly comprising titanium dioxide for use in the present invention may be surface-treated. The surface treatment is performed by using an inorganic compound or an organic compound. Examples of the inorganic compound for use in the surface treatment include cobalt-containing inorganic compounds (e.g., $CoO_2$, $Co_2O_3$, $Co_3O_4$), aluminum-containing inorganic compounds (e.g., $Al_2O_3$, $Al(OH)_3$), zirconium-containing inorganic compounds (e.g., $ZrO_2$, $Zr(OH)_4$), silicon-containing inorganic compounds (e.g., $SiO_2$) and iron-containing inorganic compounds (e.g., $Fe_2O_3$).

Among these, cobalt-containing inorganic compounds, aluminum-containing inorganic compounds and zirconium-containing inorganic compounds are preferred, and cobalt-containing inorganic compounds, $Al(OH)_3$ and $Zr(OH)_4$ are most preferred.

Examples of the organic compound for use in the surface treatment include a polyol, an alkanolamine, a stearic acid, a silane coupling agent and a titanate coupling agent. Among these, a silane coupling agent is most preferred. In particular, a surface treatment with an organosilane compound represented by formula 3 or a derivative thereof is preferred.

Examples of the titanate coupling agent include metal alkoxides such as tetramethoxy titanium, tetraethoxy titanium and tetraisorpopoxy titanium, and Preneact (e.g., KR-TTS, KR-46B, KR-55 and KR-41B, produced by Ajinomoto Co., Inc.).

Preferred examples of the organic compound for use in the present invention include a polyol, an alkanolamine and other organic compounds having an anionic group. Among these, more preferred are organic compounds having a carboxyl group, a sulfonic acid group or a phosphoric acid group.

A stearic acid, a lauric acid, an oleic acid, a linoleic acid and a linolenic acid are preferably used.

The organic compound for use in the surface treatment preferably further has a crosslinkable or polymerizable functional group. Examples of the crosslinkable or polymerizable functional group include ethylenically unsaturated groups (e.g., (meth)acryl, allyl, styryl, vinyloxy) capable of addition reaction/polymerization reaction by a radical, cationic polymerizable groups (e.g., epoxy, oxatanyl, vinyloxy), and polycondensation reactive groups (e.g., hydrolyzable silyl group, N-methylol).

These surface treatments may also be used in combination of two or more thereof. A combination use of an aluminum-containing organic compound and a zirconium-containing inorganic compound is particularly preferred.

As described in JP-A-2001-166104, the inorganic fine particle mainly comprising titanium dioxide for use in the present invention may be rendered to have a core/shell structure by the surface treatment.

The shape of the inorganic fine particle mainly comprising titanium dioxide, which is contained in the high refractive index layer, is preferably a pebble form, a spherical form, a cubic form, a spindle form or an amorphous form, more preferably an amorphous form or a spindle form.

(Dispersant)

For dispersing the inorganic fine particle mainly comprising titanium dioxide, which is used in the refractive index layer of the present invention, a dispersant can be used.

For the dispersion of the inorganic fine particle mainly comprising titanium dioxide used in the present invention, a dispersant having an anionic group is preferably used.

As the anionic group, a group having an acidic proton, such as carboxyl group, sulfonic acid group (and sulfo group), phosphoric acid group (and phosphono group) and sulfonamide group, and a salt thereof are effective. Among these, preferred are a carboxyl group, a sulfonic acid group, a phosphonic acid group, and a salt thereof, more preferred are a carboxyl group and a phosphoric acid group. The number of anionic groups contained per one molecule of the dispersant is 1 or more.

For the purpose of more improving the dispersibility of the inorganic fine particle, a plural number of anionic groups may be contained. The average number of anionic groups is preferably 2 or more, more preferably 5 or more, still more preferably 10 or more. Also, a plural kind of anionic groups may be contained in one molecule of the dispersant.

The dispersant preferably further contains a crosslinkable or polymerizable functional group. Examples of the crosslinkable or polymerizable functional group include ethylenically unsaturated groups (e.g., (meth)acryloyl, allyl, styryl, vinyloxy) capable of addition reaction/polymerization reaction by a radical, cationic polymerizable groups (e.g., epoxy, oxatanyl, vinyloxy), and polycondensation reactive groups (e.g., hydrolyzable silyl group, N-methylol). Among these, a functional group having an ethylenically unsaturated group is preferred.

The dispersant used for dispersing the inorganic fine particle mainly comprising titanium dioxide, which is used for the high refractive index layer of the present invention, is preferably a dispersant having an anionic group and a crosslinkable or polymerizable functional group and at the same time, having the crosslinkable or polymerizable functional group on the side chain.

The mass average molecular weight (Mw) of the dispersant having an anionic group and a crosslinkable or polymerizable functional group and at the same time, having the crosslinkable or polymerizable functional group on the side chain is not particularly limited but this is preferably 1,000 or more, more preferably from 2,000 to 1,000,000, still more preferably from 5,000 to 200,000, particularly preferably from 10,000 to 100,000.

As the anionic group, a group having an acidic proton, such as carboxyl group, sulfonic acid group (and sulfo group), phosphoric acid group (and phosphono group) and sulfonamide group, and a salt thereof are effective. Among these, preferred are a carboxyl group, a sulfonic acid group, a phosphonic acid group, and a salt thereof, more preferred are a carboxyl group and a phosphoric acid group. The number of anionic groups contained per one molecule of the dispersant is, on an average, preferably 2 or more, more preferably 5 or more, still more preferably 10 or more. Also, a plural kind of anionic groups may be contained in one molecule of the dispersant.

The dispersant having an anionic group and a crosslinkable or polymerizable functional group and at the same time, having the crosslinkable or polymerizable functional group on the side chain has the anionic group on the side chain or at the terminal.

A dispersant having the anionic group on the side chain is particularly preferred. In the dispersant having an anionic group on the side chain, the proportion of the anionic group-containing repeating unit is from $10^{-4}$ to 100 mol %, preferably from 1 to 50 mol %, still more preferably from 5 to 20 mol %, based on all repeating units.

Examples of the crosslinkable or polymerizable functional group include ethylenically unsaturated groups (e.g., (meth)acryl, allyl, styryl, vinyloxy) capable of addition reaction/polymerization reaction by a radical, cationic polymerizable groups (e.g., epoxy, oxatanyl, vinyloxy), and polycondensation reactive groups (e.g., hydrolyzable silyl group, N-methylol). Among these, a group having an ethylenically unsaturated group is preferred.

The number of crosslinkable or polymerizable functional groups contained per one molecule of the dispersant is, on an average, preferably 2 or more, more preferably 5 or more, still more preferably 10 or more. Also, a plural kind of crosslinkable or polymerizable functional groups may be contained in one molecule of the dispersant.

In a preferred dispersant for use in the present invention, examples of the repeating unit having an ethylenically unsaturated group on the side chain, which can be used, include a poly-1,2-butadiene structure, a poly-1,2-isoprene structure, and a (meth)acrylic acid ester or amide repeating unit which is bonded with a specific residue (the R group of —COOR or —CONHR). Examples of the specific residue (R group) include —$(CH_2)_n$— $CR^{21}$=$CR^{22}R^{23}$, —$(CH_2O)_n$—$CH_2CR^{21}$=$CR^{22}R^{23}$, —$(CH_2CH_2O)_n$—$OCH_2CR^{21}$=$CR^{22}R^{23}$, —$(CH_2)_n$—NH—CO—O—$CH_2CR^{21}$=$CR^{22}R^{23}$, —$(CH_2)_n$—O—CO—$CR^{21}$=$CR^{22}R^{23}$ and —$(CH_2CH_2O)_2$—X (wherein $R^{21}$ to $R^{23}$ each is a hydrogen atom, a halogen atom, an alkyl group having from 1 to 20 carbon atoms, an aryl group, an alkoxy group or an aryloxy group, $R^{21}$ may combine with $R^{22}$ or $R^{23}$ to form a ring, n is an integer of 1 to 10, and X is a dicyclopentadienyl residue). Specific examples of the ester residue include —$CH_2CH$=$CH_2$ (corresponding to a polymer of allyl (meth)acrylate described in JP-A-64-17047), —$CH_2CH_2O$—$CH_2CH$=$CH_2$, —$CH_2CH_2OCOCH$=$CH_2$, —$CH_2CH_2OCOC(CH_3)$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2$—NHCOO—$CH_2CH$=$CH_2$ and —$CH_2CH_2O$—X (wherein X is a dicyclopentadienyl residue). Specific examples of the amide residue include —$CH_2CH$=$CH_2$, —$CH_2CH_2$—Y (wherein Y is a 1-cyclohexenyl residue), —$CH_2CH_2$—OCO—CH=$CH_2$ and —$CH_2CH_2$—OCO—$C(CH_3)$=$CH_2$.

In the dispersant having an ethylenically unsaturated group, a free radical (a polymerization initiation radical or a growth radical in the polymerization process of a polymerizable compound) is added to the unsaturated bond group to cause an addition polymerization between molecules directly or through polymerization chaining of a polymerizable compound, as a result, a crosslink is formed between molecules, thereby completing the curing. Alternatively, an atom in the molecule (for example, a hydrogen atom on a carbon atom adjacent to the unsaturated bond group) is withdrawn by a free radical to produce a polymer radical and the polymer radicals are bonded with each other to form a crosslink between molecules, thereby completing the curing.

The crosslinkable or polymerizable functional group-containing unit may constitute all repeating units except for the anionic group-containing repeating unit, but preferably occupies from 5 to 50 mol %, more preferably from to 30 mol %, in all crosslinking or repeating units.

The preferred dispersant of the present invention may be a copolymer with an appropriate monomer other than the monomer having a crosslinkable or polymerizable functional group and an anionic group. The copolymerization component is not particularly limited but is selected from various view points such as dispersion stability, compatibility with other monomer component and the strength of film formed. Preferred examples thereof include methyl (meth)acrylate, n-butyl (meth)acrylate, tert-butyl (meth)acrylate, cyclohexyl (meth)acrylate and styrene.

The preferred dispersant of the present invention is not particularly limited in the form but is preferably a block copolymer or a random copolymer and in view of cost and easy synthesis, more preferably a random copolymer.

Specific examples of the dispersant preferably used in the present invention are set forth below, however, the dispersant for use in the present invention is not limited thereto. Unless otherwise indicated, these are a random copolymer.

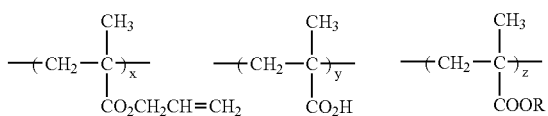

x/y/z is a molar ratio.

|  | x | y | z | R | Mw |
|---|---|---|---|---|---|
| P-(1) | 80 | 20 | 0 | — | 40,000 |
| P-(2) | 80 | 20 | 0 | — | 110,000 |
| P-(3) | 80 | 20 | 0 | — | 10,000 |
| P-(4) | 90 | 10 | 0 | — | 40,000 |

-continued

| | | | | | Mw |
|---|---|---|---|---|---|
| P-(5) | 50 | 50 | 0 | — | 40,000 |
| P-(6) | 30 | 20 | 50 | CH$_2$CH$_2$CH$_2$ | 30,000 |
| P-(7) | 20 | 30 | 50 | CH$_2$CH$_2$CH$_2$CH$_3$ | 50,000 |
| P-(8) | 70 | 20 | 10 | CH(CH$_3$)$_3$ | 60,000 |
| P-(9) | 70 | 20 | 10 | —CH$_2$CHCH$_2$CH$_2$CH$_3$ (with CH$_2$CH$_3$ branch) | 150,000 |
| P-(10) | 40 | 30 | 30 | —CH$_2$—C$_6$H$_5$ | 15,000 |

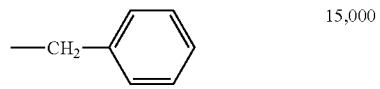

| | A | Mw |
|---|---|---|
| P-(11) | —CH$_2$—CH(COOH)— | 20,000 |
| P-(12) | —CH$_2$—CH(CO$_2$CH$_2$CH$_2$COOH)— | 30,000 |
| P-(13) | —CH$_2$—CH(C$_6$H$_4$SO$_3$Na)— | 100,000 |
| P-(14) | —CH$_2$—C(CH$_3$)(CO$_2$CH$_2$CH$_2$SO$_3$H)— | 20,000 |
| P-(15) | —CH$_2$—C(CH$_3$)(CO$_2$CH$_2$CH$_2$OP(O)(OH)$_2$)— | 50,000 |
| P-(16) | —CH$_2$—CH(CO$_2$CH$_2$CH$_2$O—(CH$_2$)$_5$—OP(O)(OH)$_2$)— | 15,000 |

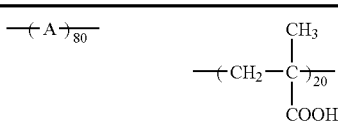

| | A | Mw |
|---|---|---|
| P-(17) | —CH$_2$—C(CH$_3$)(COOCH$_2$CH$_2$OCH=CH—C$_6$H$_5$)— | 20,000 |
| P-(18) | —CH$_2$—CH(COOCH$_2$CH$_2$OC(O)CH=CH$_2$)— | 25,000 |

-continued

| | Structure | Mw |
|---|---|---|
| P-(19) | —CH₂—C(CH₃)(COO—CH₂—C₆H₄—CH=CH₂)— | 18,000 |
| P-(20) | —CH₂—CH(—C₆H₄—OC(O)CH₂CH=CH₂)— | 20,000 |
| P-(21) | —CH₂—CH(—CONHCH₂CH₂OC(O)CH=CH₂)— | 35,000 |

$$-(CH_2-\underset{\underset{COOR^1}{|}}{\overset{\overset{CH_3}{|}}{C}})_x-\ -(CH_2-\underset{\underset{COOH}{|}}{\overset{\overset{CH_3}{|}}{C}})_y-\ -(CH_2-\underset{\underset{COOR^2}{|}}{\overset{\overset{CH_3}{|}}{C}})_z-$$

| | R¹ | R² | x | y | z | Mw |
|---|---|---|---|---|---|---|
| P-(22) | CH₂CH₂OC(O)CH=CH₂ | C₄H₉(n) | 10 | 10 | 80 | 25,000 |
| P-(23) | CH₂CH₂OC(O)CH=CH₂ | C₄H₉(t) | 10 | 10 | 80 | 25,000 |
| P-(24) | CH₂CH₂OC(O)C(CH₃)=CH₂ | C₄H₉(n) | 10 | 10 | 80 | 500,000 |
| P-(25) | 3-hydroxy-cyclohexyl-CH₂OC(O)CH=CH₂ | C₄H₉(n) | 10 | 10 | 80 | 23,000 |
| P-(26) | 3-hydroxy-cyclohexyl-CH₂OC(O)CH=CH₂ | C₄H₉(n) | 80 | 10 | 10 | 30,000 |
| P-(27) | 3-hydroxy-cyclohexyl-CH₂OC(O)CH=CH₂ | C₄H₉(n) | 50 | 20 | 30 | 30,000 |
| P-(28) | 3-hydroxy-cyclohexyl-CH₂OC(O)CH=CH₂ | C₄H₉(t) | 10 | 10 | 80 | 20,000 |

-continued
| | | | | | | |
|---|---|---|---|---|---|---|
| P-(29) | 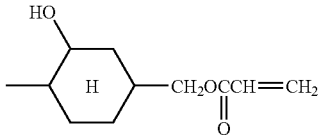 | CH₂CH₂OH | 50 | 10 | 40 | 20,000 |
| P-(30) | 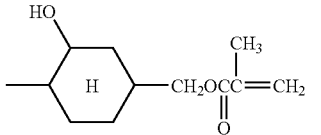 | C₄H₉(n) | 10 | 10 | 80 | 25,000 |
| P-(31) | 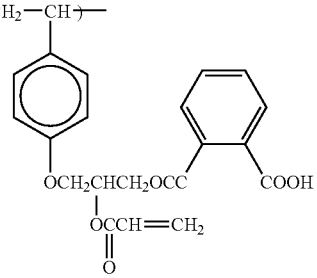 Mw = 50,000 | | | | | |
| P-(32) | 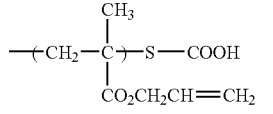 Mw = 10,000 | | | | | |
| P-(33) | 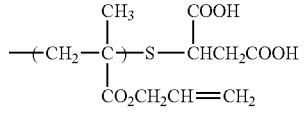 Mw = 20,000 | | | | | |
| P-(34) | 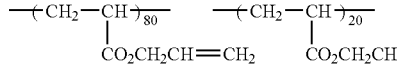 Mw = 30,000 (block copolymer) | | | | | |
| P-(35) | 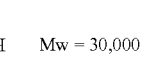 Mw = 15,000 (block copolymer) | | | | | |
| P-(36) | 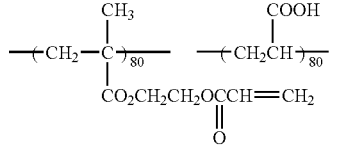 Mw = 8,000 | | | | | |
| P-(37) | 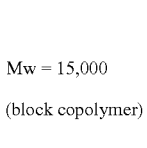 Mw = 5,000 | | | | | |
| P-(38) | 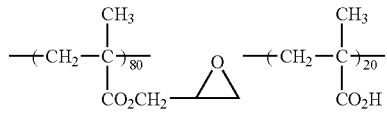 Mw = 10,000 | | | | | |

The amount of the dispersant used is preferably from 1 to 50 mass %, more preferably from 5 to 30 mass %, and most preferably from 5 to 20 mass %, based on the inorganic fine particle. Also, two or more dispersants may be used in combination.

[High Refractive Index Layer and Formation Method Thereof]

The inorganic fine particle mainly comprising titanium dioxide, for use in the high refractive index layer, is used in the dispersion state for the formation of high refractive index layer.

The inorganic fine particle is dispersed in a dispersion medium in the presence of a dispersant described above.

The dispersion medium is preferably a liquid having a boiling point of 60 to 170° C. Examples of the dispersion medium include water, alcohols (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofuran) and ether alcohols (e.g., 1-methoxy-2-propanol). Among these, preferred are toluene, xylene, methyl ethyl ketone, methyl isobutyl ketone, cyclohexanone and butanol, more preferred are methyl ethyl ketone, methyl isobutyl ketone and cyclohexanone.

The inorganic fine particle is dispersed by using a disperser. Examples of the disperser include a sand grinder mill (e.g., bead mill with pin), a high-speed impeller, a pebble mill, a roller mill, an attritor and a colloid mill. Among these, a sand grinder mill and a high-speed impeller are preferred. Also, a preliminary dispersion treatment may be performed. Examples of the disperse for use in the preliminary dispersion treatment include a ball mill, a three-roll mill, a kneader and an extruder.

The inorganic fine particle is preferably dispersed in the dispersion medium to have a particle size as small as possible. The mass average particle size is from 1 to 200 nm, preferably from 5 to 150 nm, more preferably from 10 to 100 nm, still more preferably from 10 to 80 nm.

By dispersing the inorganic fine particle to a small particle size of 200 nm or less, a high refractive index layer can be formed without impairing the transparency.

The high refractive index layer for use in the present invention is preferably formed as follows. A binder precursor (the same as those for the antiglare hard coat layer), a photopolymerization initiator and the like necessary for the matrix formation are preferably further added to the dispersion solution obtained above by dispersing the inorganic fine particle in a dispersion medium to prepare a coating composition for the formation of the high refractive index layer and the obtained coating composition for the formation of the high refractive index layer is coated on a transparent support and cured through the crosslinking reaction or polymerization reaction of an ionizing radiation-curable compound (for example, a polyfunctional monomer or a polyfunctional oligomer).

Simultaneously with or after the coating of the high refractive index layer, the binder of the layer is preferably crosslinked or polymerized with the dispersant.

The thus-produced binder of the high refractive index layer takes a form such that the anionic group of the dispersant is incorporated into the binder after the crosslinking or polymerization reaction between the above-described preferred dispersant and the ionizing radiation-curable polyfunctional monomer or oligomer. Furthermore, in the binder of the high refractive index layer, the anionic group has a function of maintaining the dispersed state of the inorganic fine particle and the crosslinked or polymerized structure imparts a film-forming ability to the binder, as a result, the high refractive index layer containing the inorganic fine particle is improved in the physical strength and the resistance against chemicals and weather.

For the polymerization reaction of the photopolymerizable polyfunctional monomer, a photopolymerization is preferably used. The photopolymerization initiator is preferably a photo-radical polymerization initiator or a photo-cationic polymerization initiator, more preferably a photo-radical polymerization initiator.

Examples of the photo-radical polymerization initiator which can be used include those described above for the antiglare hard coat layer.

In the high refractive index layer, the binder preferably further has a silanol group. By having a silanol group in the binder, the high refractive index layer is more improved in the physical strength and the resistance against chemicals and weather.

The silanol group can be introduced into the binder, for example, by adding the compound having a crosslinkable or polymerizable functional group, represented by formula 3, to the coating composition for the formation of the high refractive index layer, applying the coating composition to a transparent support, and crosslinking or polymerizing the above-described dispersant, the polyfunctional monomer or oligomer and the compound represented by formula 3.

In the high refractive index layer, the binder also preferably has an amino group or a quaternary ammonium group.

The binder having an amino group or a quaternary ammonium group of the high refractive index layer can be formed, for example, by adding a monomer having a crosslinkable or polymerizable functional group and an amino group or a quaternary ammonium group to the coating composition for the formation of the high refractive index layer, applying the coating composition to a transparent support, and crosslinking or polymerizing it with the above-described dispersant and the polyfunctional monomer or oligomer.

The monomer having an amino group or a quaternary ammonium group functions as a dispersion aid for the inorganic fine particle in the coating composition. Furthermore, after the coating, this monomer is crosslinked or polymerized with the dispersant and the polyfunctional monomer or oligomer to form a binder, whereby good dispersibility of the inorganic fine particle in the high refractive index layer can be maintained and a high refractive index layer excellent in the physical strength and the resistance against chemicals and weather can be produced.

Preferred examples of the monomer having an amino group or a quaternary ammonium group include N,N-dimethylaminoethyl (meth)acrylate, N,N-dimethylaminopropyl (meth)acrylate, hydroxypropyltrimethylammonium chloride (meth)acrylate and dimethylallylammonium chloride.

The amount used of the monomer having an amino group or a quaternary ammonium group is preferably from 1 to 40 mass %, more preferably from 3 to 30 mass %, still more preferably from 3 to 20 mass %, based on the dispersant. When the binder is formed by the crosslinking or polymerization reaction simultaneously with or after the coating of high refractive index layer, this monomer can effectively functions before the coating of high refractive index layer.

The binder formed after the crosslinking or polymerization has a structure that the polymer main chain is crosslinked or polymerized. Examples of the polymer main chain include a polyolefin (saturated hydrocarbon), a polyether, a polyurea, a polyurethane, a polyester, a polyamine, a polyamide and a melamine resin. Among these, preferred are a polyolefin main chain, a polyether main chain and a polyurea main chain, more preferred are a polyolefin main chain and a polyether main chain, and most preferred is a polyolefin main chain.

The polyolefin main chain comprises a saturated hydrocarbon. The polyolefin main chain is obtained, for example, by the addition polymerization of an unsaturated polymerizable group. In the polyether main chain, repeating units are bonded through an ether bond (—O—). The polyether main chain is obtained, for example, by the ring-opening polymerization reaction of an epoxy group. In the polyurea main chain, repeating units are bonded through a urea bond (—NH—CO—NH—). The polyurea main chain is obtained, for example, by the condensation polymerization reaction of an isocyanate group and an amino group. In the polyurethane main chain, repeating units are bonded through a urethane bond (—NH—CO—O—). The polyurethane main chain is obtained, for example, by the condensation polymerization reaction of an isocyanate group and a hydroxyl group (including an N-methylol group). In the polyester main chain, repeating units are bonded through an ester bond (—CO—O—). The polyester main chain is obtained, for example, by the condensation polymerization reaction of a carboxyl group (including an acid halide group) and a hydroxyl group (including an N-methylol group). In the polyamine main chain, repeating units are bonded through an imino group (—NH—). The polyamine main chain is obtained, for example, by the ring-opening polymerization reaction of an ethyleneimine group. In the polyamide main chain, repeating units are bonded through an amido bond (—NH—CO—). The polyamide main chain is obtained, for example, by the reaction of an isocyanate group and a carboxyl group (including an acid halide group). The melamine resin main chain is obtained, for example, by the condensation polymerization reaction of a triazine group (e.g., melamine) and an aldehyde (e.g., formaldehyde). Incidentally, in the melamine resin, the main chain itself has a crosslinked or polymerized structure.

The anionic group is preferably bonded as a side chain of the binder to the main chain through a linking group.

The linking group connecting the anionic group and the binder main chain is preferably a divalent group selected from —CO—, —O—, an alkylene group, an arylene group and a combination thereof. The crosslinked or polymerized structure forms chemical bonding (preferably covalent bonding) of two or more main chains, preferably forms covalent bonding of three or more main chains. The crosslinked or polymerized structure preferably comprises a divalent or greater valence group selected from —CO—, —O—, —S—, a nitrogen atom, a phosphorus atom, an aliphatic residue, an aromatic residue and a combination thereof.

The binder is preferably a copolymer comprising a repeating unit having an anionic group and a repeating unit having a crosslinked or polymerized structure. In the copolymer, the proportion of the repeating unit having an anionic group is preferably from 2 to 96 mol %, more preferably from 4 to 94 mol %, and most preferably from 6 to 92 mol %. The repeating unit may have two or more anionic groups. In the copolymer, the proportion of the repeating unit having a crosslinked or polymerized structure is preferably from 4 to 98 mol %, more preferably from 6 to 96 mol %, and most preferably from 8 to 94 mol %.

The repeating unit of the binder may have both an anionic group and a crosslinked or polymerized structure. Also, the binder may contain other repeating unit (a repeating unit having neither an anionic group nor a crosslinked or polymerized unit).

This other repeating unit is preferably a repeating unit having a silanol group, an amino group or a quaternary ammonium group.

In the repeating unit having a silanol group, the silanol group is bonded directly to the binder main chain or bonded to the main chain through a linking group. The silanol group is preferably bonded as a side chain to the main chain through a linking group. The linking group connecting the silanol group and the binder main chain is preferably a divalent group selected from —CO—, —O—, an alkylene group, an arylene group and a combination thereof. In the case where the binder contains a repeating unit having a silanol group, the proportion of the repeating unit is preferably from 2 to 98 mol %, more preferably from 4 to 96 mol %, and most preferably from 6 to 94 mol %.

In the repeating unit having an amino group or a quaternary ammonium group, the amino group or quaternary ammonium group is bonded directly to the binder main chain or bonded to the main chain through a linking group. The amino group or quaternary ammonium group is preferably bonded as a side chain to the main chain through a linking group. The amino group or quaternary ammonium group is preferably a secondary amino group, a tertiary amino group or a quaternary ammonium group, more preferably a tertiary amino group or a quaternary ammonium group. The group bonded to the nitrogen atom of the secondary or tertiary amino group or quaternary ammonium group is preferably an alkyl group, more preferably an alkyl group having from 1 to 12 carbon atoms, still more preferably an alkyl group having from 1 to 6 carbon atoms. The counter ion of the quaternary ammonium group is preferably a halide ion. The linking group connecting the amino group or quaternary ammonium group and the binder main chain is preferably a divalent group selected from —CO—, —NH—, —O—, an alkylene group, an arylene group and a combination thereof. In the case where the binder contains a repeating unit having an amino group or a quaternary ammonium group, the proportion of the repeating unit is preferably from 0.1 to 32 mol %, more preferably from 0.5 to 30 mol %, and most preferably from 1 to 28 mol %.

Incidentally, even when the silanol group, amino group or quaternary ammonium group is contained in the repeating unit having an anion group or in the repeating unit having a crosslinked or polymerized structure, the same effects can be obtained.

The crosslinked or polymerized binder is preferably formed by a crosslinking or polymerization reaction simultaneously with or after the coating of the composition for formation of the high refractive index layer.

The inorganic fine particle has an effect of controlling the refractive index of the high refractive index layer and also has a function of suppressing the curing shrinkage.

The inorganic fine particle is preferably dispersed in the high refractive index layer to have a particle size as small as possible. The mass average particle size is from 1 to 200 nm, preferably from 5 to 150 nm, more preferably from 10 to 100 nm, and most preferably from 10 to 80 nm.

By dispersing the inorganic fine particle to a small particle size of 200 nm or less, a high refractive index layer can be formed without impairing the transparency.

The content of the inorganic fine particle in the high refractive index layer is preferably from 10 to 90 mass %, more preferably from 15 to 80 mass %, still more preferably from 15 to 75 mass %, based on the mass of the high refractive index layer. In the high refractive index layer, two or more kinds of inorganic fine particles may used in combination.

In the case of having a low refractive index layer on the high refractive index layer, the refractive index of the high refractive index layer is preferably higher than the refractive index of the transparent support.

In the high refractive index layer, a binder obtained by a crosslinking or polymerization reaction of an ionizing radiation-curable compound containing an aromatic ring, an ionizing radiation-curable compound containing a halogen element (e.g., Br, I, Cl) except for fluorine, or an ionizing radiation-curable compound containing an atom such as S, N and P, is also preferably used.

For forming a low refractive index layer on the high refractive index layer to produce an antireflection film, the refractive index of the high refractive index layer is preferably from 1.55 to 2.40, more preferably from 1.60 to 2.20, still more preferably from 1.65 to 2.10, and most preferably from 1.80 to 2.00.

The high refractive index layer may contain, in addition to the above-described components (e.g., inorganic fine particle, polymerization initiator, photosensitizer), a resin, a surfactant, an antistatic agent, a coupling agent, a thickening agent, a coloration inhibitor, a colorant (e.g., pigment, dye), a defoaming agent, a leveling agent, a flame retardant, an ultraviolet absorbent, an infrared absorbent, a tackifier, a polymerization inhibitor, an antioxidant, a surface modifier, an electrically conducting metal fine particle and the like.

The film thickness of the high refractive index layer may be appropriately selected according to use end. When the high refractive index layer is used as an optical interference layer which is described later, the film thickness is preferably from 30 to 200 nm, more preferably from 50 to 170 nm, still more preferably from 60 to 150 nm.

In the formation of the high refractive index layer, the crosslinking or polymerization reaction of the ionizing radiation-curable compound is preferably performed in an atmosphere at an oxygen concentration of 10 vol % or less.

By forming the high refractive index layer in an atmosphere at an oxygen concentration of 10 vol % or less, the refractive index layer can be improved in the physical strength and resistance against chemicals and weather and furthermore, in the adhesion between the high refractive index layer and a layer adjacent to the high refractive index layer.

The high refractive index layer is preferably formed by performing the crosslinking or polymerization reaction of the ionizing radiation-curable compound in an atmosphere at an oxygen concentration of 6 vol % or less, more preferably 4 vol % or less, still more preferably 2 vol % or less, and most preferably 1 vol % or less.

The oxygen concentration is preferably adjusted to 10 vol % or less by displacing the air (nitrogen concentration: about 79 vol %, oxygen concentration: about 21 vol %) with a different gas, more preferably with nitrogen (nitrogen purging).

The strength of the high refractive index layer is, as determined by a pencil hardness test according to JIS K5400, preferably H or more, more preferably 2H or more, and most preferably 3H or more.

Furthermore, in the Taber test according to JIS K5400, the abrasion loss of specimen between before and after the test is preferably smaller.

In the case where the high refractive index layer does not contain a particle of imparting an antiglare function, the haze of the layer is preferably lower, specifically, 5% or less, more preferably 3% or less, still more preferably 1% or less.

The high refractive index layer is preferably formed on the transparent support directly or through another layer.

[Hard Coat Layer]

As the hard coat layer, a so-called smooth hard coat layer having no antiglare property is also preferably used to impart a physical strength to the antireflection film. The smooth hard coat layer is provided on the transparent support surface, preferably between the transparent support and the antiglare hard coat layer or between the transparent support and the high refractive index layer.

The hard coat layer is preferably formed by the crosslinking or polymerization reaction of an ionizing radiation-curable compound. For example, a coating composition containing an ionizing radiation-curable polyfunctional monomer or oligomer is coated on a transparent support and the polyfunctional monomer or oligomer is crosslinked or polymerized, whereby the hard coat layer can be formed.

The functional group of the ionizing radiation-curable polyfunctional monomer or oligomer is preferably a photopolymerizable functional group, an electron beam polymerizable functional group or a radiation polymerizable functional group, more preferably a photopolymerizable functional group.

Examples of the photopolymerizable functional group include unsaturated polymerizable functional groups such as (meth)acryloyl group, vinyl group, styryl group and allyl group. Among these, a (meth)acryloyl group is preferred.

Specific examples of the photopolymerizable polyfunctional monomer having a photopolymerizable functional group include those described above as examples for use in the high refractive index layer. The monomer is preferably polymerized by using a photopolymerization initiator or a photosensitizer. The photopolymerization reaction is preferably performed by ultraviolet irradiation after coating and drying the hard coat layer.

The hard coat layer preferably contains an inorganic fine particle having an average primary particle size of 200 nm or less. The average particle size as used herein is a mass average particle size. By setting the average primary particle size to 200 nm or less, the hard coat layer can be formed without impairing the transparency.

The inorganic fine particle has a function of elevating the hardness of the hard coat layer and at the same time, suppressing the curing shrinkage of the coated layer. The inorganic fine particle is added also for the purpose of controlling the refractive index of the hard coat layer.

Examples of the inorganic fine particle include, in addition to the inorganic fine particles described above as examples for use in the refractive index layer, fine particles of silicon dioxide, aluminum oxide, calcium carbonate, barium sulfate, talc, kaolin, calcium sulfate, titanium dioxide, zirconium oxide, tin oxide, ITO and zinc oxide. Among these, preferred are silicon dioxide, titanium dioxide, zirconium oxide, aluminum oxide, tin oxide, ITO and zinc oxide.

The average primary particle size of the inorganic fine particle is preferably from 5 to 200 nm, more preferably from 10 to 150 nm, still more preferably from 20 to 100 nm, particularly preferably from 20 to 50 nm.

The inorganic fine particle is preferably dispersed in the hard coat layer to have a particle size as small as possible.

The particle size of the inorganic fine particle in the hard coat layer is, in terms of the average particle size, preferably from 5 to 300 nm, more preferably from 10 to 200 nm, still more preferably from 20 to 150 nm, particularly preferably from 20 to 80 nm.

The content of the inorganic fine particle in the hard coat layer is preferably from 10 to 90 mass %, more preferably from 15 to 80 mass %, still more preferably from 15 to 75 mass %, based on the entire mass of the hard coat layer.

The film thickness of the hard coat layer may be appropriately selected according to use end. The film thickness of the hard coat layer is preferably from 0.2 to 10 μm, more preferably from 0.5 to 7 μm, still more preferably from 0.7 to 5 μm.

The strength of the hard coat layer is, as determined by a pencil hardness test according to JIS K5400, preferably H or more, more preferably 2H or more, and most preferably 3H or more.

Furthermore, in the Taber test according to JIS K5400, the abrasion loss of specimen between before and after the test is preferably smaller.

In the case where the hard coat layer is formed by the crosslinking or polymerization reaction of the ionizing radiation-curable compound, the crosslinking or polymerization reaction is preferably performed in an atmosphere at an oxygen concentration of 10 vol % or less. By forming the hard coat layer in an atmosphere at an oxygen concentration of 10 vol % or less, a hard coat layer excellent in the physical strength and chemical resistance can be formed.

The hard coat layer is preferably formed by performing the crosslinking or polymerization reaction of the ionizing radiation-curable compound in an atmosphere at an oxygen concentration of 6 vol % or less, more preferably 4 vol % or less, still more preferably 2 vol % or less, and most preferably 1 vol % or less.

The oxygen concentration is preferably adjusted to 10 vol % or less by displacing the air (nitrogen concentration: about 79 vol %, oxygen concentration: about 21 vol %) with a different gas, more preferably with nitrogen (nitrogen purging).

The hard coat layer is preferably formed by coating a coating composition for the formation of the hard coat layer on a transparent support.

As for the solvent composition of the coating solution used for forming the antiglare hard coat layer, high refractive index layer, hard coat layer and low refractive index layer according to the present invention, a ketone-base solvent is preferably used and either a sole solvent or a mixed solvent may be used. In the case of a mixed solvent, the content of the ketone-base solvent is preferably 10 mass % or more, more preferably 30 mass % or more, still more preferably 60 mass % or more, based on all solvents contained in the coating composition.

The coating solvent may contain a solvent other than the ketone-base solvent. Examples of the solvent having a boiling point of 100° C. or less include hydrocarbons such as hexane (boiling point: 68.7° C., hereinafter "° C." is omitted), heptane (98.4), cyclohexane (80.7) and benzene (80.1), halogenated hydrocarbons such as dichloromethane (39.8), chloroform (61.2), carbon tetrachloride (76.8), 1,2-dichloroethane (83.5) and trichloroethylene (87.2), ethers such as diethyl ether (34.6), diisopropyl ether (68.5), dipropyl ether (90.5) and tetrahydrofuran (66), esters such as ethyl formate (54.2), methyl acetate (57.8), ethyl acetate (77.1) and isopropyl acetate (89), ketones such as acetone (56.1) and 2-butanone (=methyl ethyl ketone, 79.6), alcohols such as methanol (64.5), ethanol (78.3), 2-propanol (82.4) and 1-propanol (97.2), cyano compounds such as acetonitrile (81.6) and propionitrile (97.4), and carbon disulfide (46.2). Among these, ketones and esters are preferred, and ketones are more preferred. Among ketones, 2-butanone is preferred.

Examples of the solvent having a boiling point of 100° C. or more include octane (125.7), toluene (110.6), xylene (138), tetrachloroethylene (121.2), chlorobenzene (131.7), dioxane (101.3), dibutyl ether (142.4), isobutyl acetate (118), cyclohexanone (155.7), 2-methyl-4-pentanone (=MIBK, 115.9), 1-butanol (117.7), N,N-dimethylformamide (153), N,N-dimethylacetamide (166) and dimethylsulfoxide (189). Among these, cyclohexanone and 2-methyl-4-pentanone are preferred.

The coating solution for the hard coat layer and the coating solution for the low refractive index layer each is prepared by diluting the components for the layer with a solvent having the above-described composition. The coating solution is preferably adjusted to an appropriate concentration by taking account of the viscosity of the coating solution and the specific gravity of the construction material, however, the concentration of the coating solution is preferably from 0.1 to 20 mass %, more preferably from 1 to 10 mass %.

The transparent support of the antireflection film of the present invention is preferably a plastic film. Examples of the polymer for forming the plastic film include cellulose esters (e.g., triacetyl cellulose, diacetyl cellulose; representative examples thereof include TAC-TD80U and TD80UF produced by Fuji Photo Film Co., Ltd.), polyamide, polycarbonate, polyesters (e.g., polyethylene terephthalate, polyethylene naphthalate), polystyrene, polyolefin, norbornene-base resin (ARTON, trade name, produced by JSR) and amorphous polyolefin (ZEONEX, trade name, produced by Nippon Zeon). Among these, preferred are triacetyl cellulose, polyethylene terephthalate and polyethylene naphthalate, and more preferred is triacetyl cellulose.

The triacetyl cellulose comprises a single layer or a plurality of layers. The single layer triacetyl cellulose is prepared by drum casting disclosed in JP-A-7-11055 or band casting and the triacetyl cellulose comprising a plurality of layers is prepared by a so-called co-casting method disclosed in JP-A-61-94725 and JP-B-62-43846 (the term "JP-B" as used herein means an "examined Japanese patent publication"). More specifically, a raw material flake is dissolved using a solvent such as halogenated hydrocarbons (e.g., dichloromethane), alcohols (e.g., methanol, ethanol, butanol), esters (e.g., methyl formate, methyl acetate) and ethers (e.g., dioxane, dioxolane, diethyl ether). If desired, various additives such as plasticizer, ultraviolet absorbent, deterioration inhibitor, lubricant and peel accelerator are added thereto. The obtained solution (called "dope") is cast on a support comprising a horizontal endless metal belt or a rotating drum by dope-supplying means (called "die"). At this time, in the case of a single layer, a single dope is solely cast and in the case of a plurality of layers, a high-concentration cellulose ester dope and low-concentration dopes in both sides thereof are co-cast. The dope is dried on the support to some extent, the film thus imparted with rigidity is peeled from the support, and the film is passed through a drying zone by various transportation means to remove the solvent.

A representative example of the solvent for dissolving the triacetyl cellulose is dichloromethane. However, in view of the global environment or working environment, the solvent preferably contains substantially no halogenated hydrocarbon such as dichloromethane. The term "contain substantially no halogenated hydrocarbon" as used herein means that the percentage of halogenated hydrocarbon in the organic solvent is less than 5 mass % (preferably less than 2 mass %). In the case of preparing a triacetyl cellulose dope using a solvent containing substantially no dichloromethane or the like, a special dissolution method described below is necessary.

A first dissolution method called a cooling dissolution method is described below. In a solvent, triacetyl cellulose is gradually added while stirring at a temperature in the vicinity of room temperature (−10 to 40° C.). Thereafter, the mixture is cooled to −100 to −10° C. (preferably from −80 to −10° C., more preferably from −50 to −20° C., most preferably from −50 to −30° C.). The cooling may be performed in a dry ice methanol bath (−75° C.) or in a cooled diethylene glycol solution (−30 to −20° C.). As a result of cooling, the mixture of triacetyl cellulose and solvent is solidified. This is then heated to 0 to 200° C. (preferably from 0 to 150° C., more preferably from 0 to 120° C., most preferably from 0 to 50° C.) to provide a solution where triacetyl cellulose flows in the solvent. The temperature may be elevated by allowing the solidified mixture to stand at room temperature or may be elevated in a warm bath.

A second method called high-temperature dissolution method is described below. In a solvent, triacetyl cellulose is gradually added while stirring at a temperature in the vicinity of room temperature (−10 to 40° C.). The triacetyl cellulose solution for use in the present invention is preferably swelled in advance by adding triacetyl cellulose to a mixed solvent containing various solvents. In this method, the triacetyl cellulose is preferably dissolved to a concentration of 30 mass % or less, however, in view of the drying efficiency at the film formation, the concentration is preferably higher. Thereafter, the mixed solution of organic solvents is heated to 70 to 240° C. (preferably from 80 to 220° C., more preferably from 100 to 200° C., most preferably from 100 to 190° C.) under a pressure of 0.2 to 30 MPa. This heated solution cannot be coated as it is and must be cooled to a temperature lower than the lowest boiling point of the solvents used. In this case, the solution is generally cooled to −10 to 50° C. and returned to an atmospheric pressure. The cooling may be performed only by allowing the high-pressure high-temperature container or line housing the triacetyl cellulose solution to stand at room temperature or preferably, the apparatus may be cooled using a cooling medium such as cooling water. The cellulose acetate film containing substantially no halogenated hydrocarbon such as dichloromethane and the production method thereof are described in *JIII Journal of Technical Disclosure* (No. 2001-1745, issued on Mar. 15, 2001, hereinafter simply referred to as "Kokai Giho 2001-1745").

In the case of using the antireflection film of the present invention for a liquid display device, the antireflection film is disposed on the outermost surface of a display, for example, by providing an adhesive layer on one surface. When the transparent support is triacetyl cellulose, since triacetyl cellulose is used as a protective film for protecting the polarizing layer of a polarizing plate, it is preferred in view of the cost to use the antireflection film of the present invention as it is for the protective film.

In the case where the antireflection film of the present invention is disposed on the outermost surface of a display by providing an adhesive layer on one surface or used as it is for the protective film of a polarizing plate, the outermost layer mainly comprising a fluorine-containing polymer, which is formed on a transparent support, is preferably subjected to a saponification treatment so as to ensure satisfactory adhesion. The saponification treatment is performed by a known method, for example, by dipping the film in an alkali solution for an appropriate time. After the dipping in an alkali solution, the film is preferably washed thoroughly with water or dipped in a dilute acid to neutralize the alkali component so as to prevent the alkali component from remaining in the film.

By the saponification treatment, the surface of the transparent support in the side opposite the surface having the outermost layer is hydrophilized.

The hydrophilized surface is effective particularly for improving the adhesive property to a deflecting film mainly comprising polyvinyl alcohol. Furthermore, the hydrophilized surface is hardly attached with dusts in air and on bonding with a deflecting film, dusts scarcely intrude into the space between the deflecting film and the antireflection film, so that dot defects due to dusts can be effectively prevented.

The saponification treatment is preferably performed such that the surface of the transparent support in the side opposite the surface having the outermost layer has a contact angle to water of 40° or less, preferably 300 or less, more preferably 20° or less.

The method for the alkali saponification treatment can be specifically selected from the following two methods (1) and (2). The method (1) is advantageous in that the treatment can be performed by the same step as that for the general-purpose triacetyl cellulose film, however, since the antireflection film surface is also saponified, the surface may be alkali hydrolyzed to deteriorate the film or if the solution for the saponification treatment remains, this causes a problem of staining. If the case is so, the method (2) is advantageous, though a specific step for the treatment is necessary.

(1) After the formation of an antireflection layer on a transparent support, the film is dipped at least once in an alkali solution, whereby the back surface of the film is saponified.

(2) Before or after the formation of an antireflective layer on a transparent support, an alkali solution is coated on the surface in the side opposite the surface where the antireflection film is formed, and then the film is heated and washed with water and/or neutralized, whereby only the back surface of the film is saponified.

The antireflection film of the present invention can be formed by the following method, however, the present invention is not limited to this method.

Coating solutions containing components for forming respective layers are prepared. The coating solution for forming a hard coat layer is coated on a transparent support by a dip coating method, an air knife coating method, a curtain coating method, a roller coating method, a wire bar coating method, a gravure coating method or an extrusion coating method (see, U.S. Pat. No. 2,681,294), and then heated and dried. Among these coating methods, a micro-gravure coating method is preferred. The formed coating is irradiated with light or heated to polymerize the monomer for forming an antiglare hard coat layer and cure the polymer, whereby a hard coat layer is formed.

If desired, the hard coat layer may be composed of a plurality of layers and in this case, a smooth hard coat layer may be coated and cured in the same manner before the coating of the antiglare hard coat layer.

Thereafter, the coating solution for forming a low refractive index layer is coated on the hard coat layer in the same manner and irradiated with light or heated to form a low refractive index layer. In this way, the antireflection film of the present invention is obtained.

The microgravure coating method for use in the present invention is a coating method characterized in that a gravure roll having a diameter of about 10 to 100 mm, preferably from about 20 to 50 mm, and having a gravure pattern stamped on the entire circumference is rotated below the support in the direction reverse to the transportation direction of the support and at the same time, an extra coating solution is scraped off from the surface of the gravure roll by a doctor blade, whereby a constant amount of the coating solution is transferred to and coated on the downside surface of the support while leaving the upside surface of the support in a free state. A roll-form transparent support is continuously unrolled and on one surface of the unrolled support, at least one layer of the hard coat layer and the low refractive index layer containing a fluorine-containing polymer can be coated by the microgravure coating method.

With respect to the conditions for the coating by the microgravure coating method, the number of lines in the gravure pattern stamped on the gravure roll is preferably from 50 to 800 lines/inch, more preferably from 100 to 300 lines/inch, the depth of the gravure pattern is preferably from 1 to 600 µm, more preferably from 5 to 200 µm, the rotation number of the gravure roll is preferably from 3 to 800 rpm, more preferably from 5 to 200 rpm, and the support transportation speed is preferably from 0.5 to 100 m/min, more preferably from 1 to 50 m/min.

The haze value of the thus-formed antireflection film of the present invention is from 3 to 70%, preferably from 4 to 60%, and the average reflectance at 450 to 650 nm is 3.0% or less, preferably 2.5% or less.

The antireflection film of the present invention has a haze value and an average reflectance each in the above-described range, whereby good antiglare and antireflection property can be obtained without incurring deterioration of the transmitted image.

The polarizing plate is mainly constituted by a polarizing film and two protective films sandwiching the polarizing film from both sides. The antireflection film of the present invention is preferably used for at least one sheet of those two protective films sandwiching the polarizing film from both sides. When the antireflection film of the present invention serves concurrently as a protective film, the production cost of the polarizing plate can be reduced. Also, when the antireflection film of the present invention is used as the outermost layer, a polarizing plate prevented from reflection of external light or the like and excellent in the scratch resistance, antifouling property and the like can be produced.

As the polarizing film, a known polarizing film or a polarizing film cut out from a lengthy polarizing film with the absorption axis of the polarizing film being neither parallel nor perpendicular to the longitudinal direction may be used. The lengthy polarizing film with the absorption axis of the polarizing film being neither parallel nor perpendicular to the longitudinal direction is produced by the following method.

That is, the polarizing film is obtained by stretching a continuously fed polymer film under application of a tension while holding both edges of the film with holding means and this film can be produced by a stretching method where the stretching at least in the film cross direction is from 1.1 to 20.0 times, the difference in the travelling speed of the holding device in the longitudinal direction between both edges of the film is 3% or less and in the state of both edges of the film being held, the film travelling direction is bent such that the angle made by the film travelling direction at the outlet in the step of holding both edges of the film and the substantial stretching direction of the film is tilted at 20 to 70°. In particular, a stretching method of giving a tilt angle of 45° is preferred in view of the productivity.

The stretching method of the polymer film is described in detail in JP-A-2002-86554, paragraphs 0020 to 0030.

The antireflection film of the present invention can be applied to image display devices such as liquid crystal display device (LCD), plasma display panel (PDP), electroluminescence display (ELD) and cathode ray tube display device (CRT). Since the antireflection film of the present invention has a transparent support, this film is used by adhering the transparent support side to the image display surface of an image display device.

In the case of using the antireflection film of the present invention as one surface protective film of a polarizing film, the antireflection film can be preferably used for a transmissive, reflective or transflective liquid crystal display device in a mode such as twisted nematic (TN) mode, super twisted nematic (STN) mode, vertical alignment (VA) mode, in-plane switching (IPS) mode or optically compensated bend cell (OCB) mode.

The VA-mode liquid crystal cell includes (1) a VA-mode liquid crystal cell in the narrow sense where bar-like liquid crystalline molecules are substantially vertically oriented when no voltage is applied but the molecules are substantially horizontally oriented when a voltage is applied (see, JP-A-2-176625), (2) a multi-domain VA-mode (MVA-mode) liquid crystal cell for the enlargement of view angle (see, *SID*97, *Digest of Tech. Papers* (preliminary), 28, 845 (1997)), (3) a liquid crystal cell in a mode (n-ASM mode) where bar-like liquid crystalline molecules are substantially vertically oriented when no voltage is applied but the molecules are oriented in a twisted multi-domain manner when a voltage is applied (see, *Nippon Ekisho Toron Kai (Japan Liquid Crystal Workshop)* (preliminary), 58-59 (1998)) and (4) a SURVIVAL-mode liquid crystal cell (announced in LCD International '98).

The OCB-mode liquid crystal cell is a liquid crystal display device using a liquid crystal cell in a bend orientation mode where bar-like liquid crystalline molecules are oriented substantially in the reverse directions (symmetrically) between the upper and lower parts of the liquid crystal cell. This is disclosed in U.S. Pat. Nos. 4,583,825 and 5,410,422. Since bar-like liquid crystalline molecules are symmetrically oriented in the upper and lower parts of the liquid crystal cell, this bend orientation-mode liquid crystal cell has a function of self-optical compensation. Therefore, this liquid crystal mode is also called an OCB (optically compensatory bend) liquid crystal mode. The bend orientation-mode liquid crystal display device is advantageous in that the response speed is fast.

In the ECB-mode liquid crystal cell, bar-like liquid crystalline molecules are substantially horizontally oriented when no voltage is applied. This is most often used as a color TFT liquid crystal display device and is described in a large number of publications such as *EL, PDP, LCD Display*, Toray Research Center (2001).

Particularly, in the case of a TN-mode or IPS-mode liquid crystal display device, when an optical compensation film having an effect of enlarging the view angle is used, out of front and back two protective films of a polarizer, for the protective film on the surface opposite the antireflection film of the present invention as described in JP-A-2001-100043, a polarizing plate having an antireflection effect and a view angle enlarging effect with a thickness of one polarizing plate can be obtained and this is preferred.

EXAMPLES

The present invention is described in greater detail below by referring to Examples, however, the present invention should not be construed as being limited thereto. Unless otherwise indicated, the "parts" and "%" are on the mass basis.

(Synthesis of Perfluoroolefin Copolymer (1))

Perfluoroolefin Copolymer (1)

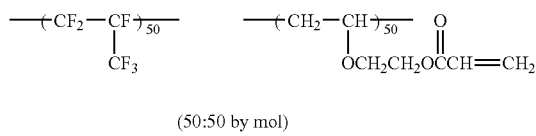

(50:50 by mol)

Into a stainless steel-made autoclave having an inner volume of 100 ml and equipped with a stirrer, 40 ml of ethyl acetate, 14.7 g of hydroxyethyl vinyl ether and 0.55 g of dilauroyl peroxide were charged. The inside of the system was degassed and purged with a nitrogen gas. Thereafter, 25 g of hexafluoropropylene (HFP) was further introduced into the autoclave and the temperature was elevated to 65° C. The pressure when the temperature inside the autoclave reached 65° C. was 5.4 kg/cm². The reaction was continued for 8 hours while keeping that temperature and when the pressure reached 3.2 kg/cm², the heating was stopped and the system was allowed to cool. When the inner temperature was lowered to room temperature, unreacted monomer was expelled and after opening the autoclave, the reaction solution was taken out. The obtained reaction solution was charged into highly excess hexane, the solvent was removed by decantation and the polymer precipitated was taken out. This polymer was dissolved in a slight amount of ethyl acetate and by performing reprecipitation twice from hexane, the residual monomer was completely removed. After the drying, 28 g of polymer was obtained. Thereafter, 20 g of the obtained polymer was dissolved in 100 ml of N,N-dimethylacetamide and after 11.4 g of chloride acrylate was added dropwise under ice cooling, the resulting solution was stirred at room temperature for 10 hours. After adding ethyl acetate, the reaction solution was washed with water and the organic layer was extracted and then concentrated. The obtained polymer was reprecipitated with hexane to obtain 19 g of Perfluoroolefin Copolymer (1). The refractive index of the obtained polymer was 1.421.

(Preparation of Sol Solution a)

In a reactor equipped with a stirrer and a reflux condenser, 120 parts of methyl ethyl ketone, 100 parts of acryloyloxypropyltrimethoxysilane (KBM5103 (trade name), produced by Shin-Etsu Chemical Co., Ltd.) and 3 parts of diisopropoxyaluminum ethylacetate were added and mixed. Thereto, 30 parts of ion exchanged water was added and the resulting mixture was reacted at 60° C. for 4 hours and then cooled to room temperature to obtain Sol Solution a. The mass average molecular weight was 1,600 and a component having a molecular weight of 1,000 to 20,000 occupied 100% in the oligomer components. Also, the analysis by gas chromatography revealed that the raw material acryloyloxypropyltrimethoxysilane did not remain at all.

(Preparation of Sol Solution b)

Sol Solution b was obtained in the same manner as Sol Composition a except that 6 parts of acetylacetone was added after the reaction and cooling to room temperature.

(Preparation of Coating Solution A for Antiglare Hard Coat Layer)

A dipentaerythritol pentaacrylate and dipentaerythritol hexaacrylate mixture (DPHA, produced by Nippon Kayaku Co., Ltd.) (15 g) and 24 g of trimethylolpropane EO-added triacrylate (M-309, produced by Osaka Yuki Kagaku) were mixed and the resulting mixture was diluted with 0.10 g of methyl isobutyl ketone and 6 g of methyl ethyl ketone. Thereto, 2 g of a polymerization initiator Irgacure 184 (produced by Ciba Fine Chemicals) was added and mixed with stirring. The resulting solution was coated and UV-cured and the obtained coating film had a refractive index of 1.53.

To this solution, 10 g of a dispersion solution obtained by dispersing a 30% methyl isobutyl ketone dispersion solution of reinforced and crosslinked polystyrene particles classified to an average particle size of 3.5 μm (SXS-350H, trade name, produced by Soken Kagaku K.K.) in a polytron disperser at 10,000 rpm for 20 minutes was added. Subsequently, 13 g of a dispersion solution obtained by dispersing a 30% methyl isobutyl ketone dispersion solution of reinforced and crosslinked polystyrene particles classified to an average particle size of 5 μm (SXS-500H, trade name, produced by Soken Kagaku K.K.) in a polytron disperser at 10,000 rpm for 30 minutes was added. Finally, 1.2 g of Sol Composition a of organosilane was added, thereby completing the solution.

The resulting mixed solution was filtered through a polypropylene-made filter having a pore size of 30 μm to prepare Coating Solution A for Antiglare Hard Coat Layer.

(Preparation of Coating Solution B for Antiglare Hard Coat Layer)

A commercially available zirconia-containing UV-curable hard coat solution (DESOLITE Z7404, produced by JSR, solid concentration: about 61%, ZrO₂ content in solid contents: about 70%, containing a polymerizable monomer and a polymerization initiator) (285 g) and 85 g of a dipentaerythritol pentaacrylate and dipentaerythritol hexaacrylate mixture (DPHA, produced by Nippon Kayaku Co., Ltd.) were mixed and the resulting mixture was diluted with 60 g of methyl isobutyl ketone and 17 g of methyl ethyl ketone. Thereto, 28 g of a silane coupling agent KBM-5103 (produced by Shin-Etsu Chemical Co., Ltd.) was added and mixed with stirring. The resulting solution was coated and UV-cured and the obtained coating film had a refractive index of 1.61.

To this solution, 35 g of a dispersion solution obtained by dispersing a 30% methyl isobutyl ketone dispersion solution of reinforced and crosslinked PMMA particles classified to an average particle size of 3.0 μm (MXS-300, trade name, produced by Soken Kagaku K.K.) in a polytron disperser at 10,000 rpm for 20 minutes was added. Subsequently, 90 g of a dispersion solution obtained by dispersing a 30% methyl ethyl ketone dispersion solution of silica particles having an average particle size of 1.5 μm (SEAHOSTA KE-P150, trade name, produced by Nippon Shokubai Co., Ltd.) in a polytron disperser at 10,000 rpm for 30 minutes was added and mixed with stirring, thereby completing the solution.

The resulting mixed solution was filtered through a polypropylene-made filter having a pore size of 30 μm to prepare Coating Solution B for Antiglare Hard Coat Layer.

(Preparation of Coating Solution C for Antiglare Hard Coat Layer)

Coating Solution C for Antiglare Hard Coat Layer was prepared in the same manner as Coating Solution B including amounts added except that 130 g of a 30% methyl ethyl ketone dispersion solution of reinforced and highly crosslinked PMMA particles (MXS-150H, trade name, crosslinking agent: ethylene glycol dimethacrylate, amount of crosslinking agent: 30%, produced by Soken Kagaku K.K.) classified to an average particle size of 1.5 µm was used in place of the silica particles having an average particle size of 1.5 µm in the preparation of Coating Solution B for Antiglare Hard Coat Layer.

(Preparation of Coating Solution D for Antiglare Hard Coat Layer)

Coating Solution D for Antiglare Hard Coat Layer was prepared in the same manner as Coating Solution B including amounts added except that 0.1 g of Fluorine-Base Polymer R-1 was added in the preparation of Coating Solution B for Antiglare Hard Coat Layer.

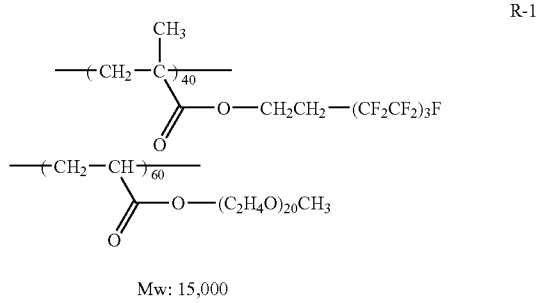

R-1

Mw: 15,000

(Preparation of Coating Solution A for Low Refractive Index Layer)

To 18 g of a heat-crosslinkable fluorine-containing polymer having a refractive index of 1.42 (JN-7228, solid concentration: 6%, produced by JSR), 0.4 g of Sol Solution a, 2 g of methyl ethyl ketone and 0.6 g of cyclohexanone were added and stirred. The resulting solution was filtered through a polypropylene-made filter having a pore size of 1 µm to prepare Coating Solution A for Low Refractive Index Layer.

(Preparation of Coating Solution B for Low Refractive Index Layer)

A heat-crosslinkable fluorine-containing polymer (15 g) having a refractive index of 1.42 (JN-7228, solid concentration: 6%, produced by JSR), 1.4 g of silica sol (silica, MEK-ST, average particle size: 15 nm, solid concentration: 30%, produced by Nissan Chemicals Industries, Ltd.), 0.4 g of Sol Solution a, 3 g of methyl ethyl ketone and 0.6 g of cyclohexanone were added and stirred. The resulting solution was filtered through a polypropylene-made filter having a pore size of 1 µm to prepare Coating Solution B for Low Refractive Index Layer.

(Preparation of Coating Solution C for Low Refractive Index Layer)

A heat-crosslinkable fluorine-containing polymer (15 g) having a refractive index of 1.42 (JN-7228, solid concentration: 6%, produced by JSR), 1.4 g of silica sol (silica, MEK-ST differing in the particle size, average particle size: 45 nm, solid concentration: 30%, produced by Nissan Chemicals Industries, Ltd.), 0.4 g of Sol Composition a of organosilane, 3 g of methyl ethyl ketone and 0.6 g of cyclohexanone were added and stirred. The resulting solution was filtered through a polypropylene-made filter having a pore size of 1 µm to prepare Coating Solution C for Low Refractive Index Layer.

(Preparation of Coating Solution D for Low Refractive Index Layer)

Perfluoroolefin Copolymer (1) (15.2 g), 1.4 g of silica sol (silica, MEK-ST differing in the particle size, average particle size: 45 nm, solid concentration: 30%, produced by Nissan Chemicals Industries, Ltd.), 0.3 g of a reactive silicone X-22-164B (trade name, produced by Shin-Etsu Chemical Co., Ltd.), 7.3 g of Sol Solution a, 0.76 g of a photopolymerization initiator (Irgacure 907 (trade name), produced by Ciba Geigy), 301 g of methyl ethyl ketone and 9.0 g of cyclohexanone were added and stirred. The resulting solution was filtered through a polypropylene-made filter having a pore size of 5 µm to prepare Coating Solution D for Low Refractive Index Layer.

Example 1

(1) Formation of Antiglare Hard Coat Layer

A 80 µm-thick triacetyl cellulose film (TAC-TD80UL, produced by Fuji Photo Film Co., Ltd.) in a roll form was unrolled and thereon, Coating Solution A for antiglare hard coat layer prepared above was coated using a doctor blade and a microgravure roll having a diameter of 50 mm and having a gravure pattern with a line number of 180 lines/inch and a depth of 40 µm, at a gravure roll rotation number of 30 rpm and a transportation speed of 10 m/min. Thereafter, the coating solution was dried at 60° C. for 150 seconds and then an ultraviolet ray was irradiated thereon at an illuminance of 400 mW/cm$^2$ and a dose of 250 mJ/cm$^2$ using an air cooled metal halide lamp of 160 W/cm (manufactured by I-Graphics K.K.) under nitrogen purging to cure the coating layer and thereby form an antiglare hard coat layer having a thickness of 4.3 µm. Then, the film was taken up.

(2) Formation of Low Refractive Index Layer

The triacetyl cellulose film having coated thereon the antiglare hard coat layer was again unrolled and Coating Solution C for low refractive index layer prepared above was coated thereon using a doctor blade and a microgravure roll having a diameter of 50 mm and having a gravure pattern with a line number of 180 lines/inch and a depth of 40 µm, at a gravure roll rotation number of 30 rpm and a transportation speed of 15 m/min. Thereafter, the coating solution was dried at 140° C. for 8 minutes and then an ultraviolet ray was irradiated thereon at an illuminance of 400 mW/cm$^2$ and a dose of 900 mJ/cm$^2$ using an air cooled metal halide lamp of 240 W/cm (manufactured by I-Graphics K.K.) under nitrogen purging to form a low refractive index layer having a thickness of 100 nm. Then, the film was taken up.

(Saponification Treatment of Antireflection Film)

After the film formation, Sample 1 above was subjected to the following treatment.

An aqueous 1.5 N sodium hydroxide solution was prepared and kept at 55° C. Furthermore, an aqueous 0.01 N dilute sulfuric acid solution was prepared. The obtained antireflection film was dipped in the aqueous sodium hydroxide solution prepared above for 2 minutes and then dipped in water to thoroughly wash out the aqueous sodium hydroxide solution. Subsequently, the film was dipped in the aqueous dilute sulfuric acid solution prepared above for 1 minute and then dipped in water to thoroughly wash out the aqueous dilute sulfuric acid solution. Finally, the sample was thoroughly dried at 120° C.

In this way, a saponified antireflection film was produced. This film is designated as Example Sample 1.

(Evaluation of Antireflection Film)

The film obtained was evaluated on the following items. The results are shown in Table 1.

(1) Average Reflectance

The spectral reflectance at an incident angle of 5° in the wavelength region of 380 to 780 nm was measured using a spectrophotometer (manufactured by JASCO Corporation). The integrating sphere average reflectance at 450 to 650 nm was used for the result.

(2) Evaluation of Scratch Resistance against Steel Wool

A rubbing test was performed using a rubbing tester under the following conditions.
Evaluation environment conditions: 25° C., 60% RH
Rubbing material:
  A steel wool (grade No. 0000, produced by Nippon Steel Wool K.K.) was wound around the rubbing tip (1 cm×1 cm) of the tester, which comes into contact with the sample, and fixed with a band to hold it there.
Moving distance (one way): 13 cm
Rubbing speed: 13 cm/sec
Load: 500 g/cm$^2$
Tip contact area: 1 cm×1 cm
Rubbing number: 10 reciprocations
  An oily black ink was coated on the back side of the rubbed sample and the reflected light was observed with an eye. The scratch in the rubbed portion was evaluated according to the following criteria:
  ⊚: Scratch was not found at all even when very carefully observed.
  ○: Faint scratch was slightly found when very carefully observed.
  ○Δ: Faint scratch was found.
  Δ: Scratch in the medium degree was found.
  ΔX-X: Scratch was found at a glance.

(3) Evaluation of Scratch Resistance Against Bencott

A rubbing test was performed using a rubbing tester under the following conditions:
Evaluation environment conditions: 25° C., 60% RH
Rubbing material:
  Bencott (produced by Ozu Sangyo K.K.) was wound around the rubbing tip (1 cm×1 cm) of the tester, which comes into contact with the sample, and fixed with a band to hold it there.
Moving distance (one way): 13 cm
Rubbing speed: 13 cm/sec
Load: 200 g/cm$^2$
Tip contact area: 1 cm×1 cm
Rubbing number: 10 reciprocations
  An oily black ink was coated on the back side of the rubbed sample and the reflected light was observed with an eye. The scratch in the rubbed portion was evaluated according to the following criteria:
  ⊚: Scratch was not found at all even when very carefully observed.
  ○: Faint scratch was slightly found when very carefully observed.
  ○Δ: Faint scratch was found.
  Δ: Scratch in the medium degree was found.
  ΔX-X: Scratch was found at a glance.

(4) Effect of Scattered Light Profile

Using an autogoniophotometer Model GP-5 manufactured by Murakami Color Research Laboratory, the film was disposed perpendicularly with respect to the incident light and the scattered profile was measured over all azimuths. From the profiles obtained, the scattered light intensity at 30° was determined based on the light intensity at an exit angle of 0°.

[Samples 2 to 90 of Example 1 and Samples 1 to 19 of Comparative Example 1]

These samples were produced and evaluated in the same manner as Example Sample 1 except that in Sample 1 of Example 1, the coating solution (B, C, D) for antiglare hard coat layer or the coating solution (A, B, D to Z, α to μ) for low refractive index layer was changed as shown in Tables 1 to 4. The results are shown in Tables 1 to 4.

Here, Coating Solutions F to Z and α to μ for Low Refractive Index Layer each was coated in the same manner as Coating Solution C or D for Low Refractive Index Layer except that the thickness, the average particle size of silica fine particle and the coated amount thereof were changed as shown in Tables below.

The thickness of the antiglare hard coat layer after drying was 4.3 μm in the case of Coating Solution A and 3.4 μm in the case of Coating Solutions B, C and D.

TABLE 1

| | Antiglare Hard Coat Layer, Coating Solution | Low Refractive Index Layer | | | Evaluation of Performance | | |
|---|---|---|---|---|---|---|---|
| Sample No. | | Coating Solution | Thickness (nm) | Silica Particle Size (nm) | Amount of Silica Coated (mg/m$^2$) | Scratch Resistance against Steel Wool | Scratch Resistance against Bencott | Integrated Reflectance (%) |
| Sample 1 of Example 1 | A | C | 100 | 45 | 50 | ⊚ | ⊚ | 2.2 |
| Sample 2 of Example 1 | A | D | 100 | 45 | 50 | ⊚ | ⊚ | 2.3 |
| Sample 1 of Comparative Example 1 | A | B | 100 | 15 | 50 | X | X | 2.1 |
| Sample 2 of Comparative Example 1 | A | A | 100 | none | — | X | X | 1.9 |
| Sample 3 of Example 1 | A | F | 100 | 45 | 2 | Δ | Δ | 2 |

TABLE 1-continued

| Sample No. | Antiglare Hard Coat Layer, Coating Solution | Low Refractive Index Layer | | | | Evaluation of Performance | | |
|---|---|---|---|---|---|---|---|---|
| | | Coating Solution | Thickness (nm) | Silica Particle Size (nm) | Amount of Silica Coated (mg/m$^2$) | Scratch Resistance against Steel Wool | Scratch Resistance against Bencott | Integrated Reflectance (%) |
| Sample 4 of Example 1 | A | G | 100 | 45 | 5 | ○△ | ○△ | 2 |
| Sample 5 of Example 1 | A | H | 100 | 45 | 10 | ○ | ○ | 2 |
| Sample 6 of Example 1 | A | I | 100 | 45 | 30 | ○ | ○ | 2.1 |
| Sample 7 of Example 1 | A | J | 100 | 45 | 60 | ◎ | ◎ | 2.2 |
| Sample 8 of Example 1 | A | K | 100 | 45 | 80 | ◎ | ◎ | 2.3 |
| Sample 9 of Example 1 | A | L | 100 | 45 | 90 | ◎ | ◎ | 2.4 |
| Sample 10 of Example 1 | A | M | 100 | 45 | 100 | ◎ | ◎ | 2.4 |
| Sample 11 of Example 1 | A | N | 100 | 45 | 120 | ◎ | ◎ | 3.2(NG) |
| Sample 12 of Example 1 | A | O | 100 | 45 | 150 | ◎ | ◎ | 3.5(NG) |
| Sample 3 of Comparative Example | A | P | 100 | 25 | 50 | △X | △X | 2.1 |
| Sample 13 of Example 1 | A | Q | 100 | 30 | 50 | ○△ | ○△ | 2.1 |
| Sample 14 of Example 1 | A | R | 100 | 35 | 50 | ○ | ○ | 2.1 |
| Sample 15 of Example 1 | A | S | 100 | 40 | 50 | ◎ | ◎ | 2.2 |
| Sample 16 of Example 1 | A | T | 100 | 50 | 50 | ◎ | ◎ | 2.2 |
| Sample 17 of Example 1 | A | U | 100 | 60 | 50 | ◎ | ◎ | 2.2 |
| Sample 18 of Example 1 | A | V | 100 | 70 | 50 | ◎ | ◎ | 2.3 |
| Sample 19 of Example 1 | A | W | 100 | 80 | 50 | ◎ | ◎ | 2.3 |
| Sample 20 of Example 1 | A | X | 100 | 90 | 50 | ◎ | ◎ | 2.4 |
| Sample 21 of Example 1 | A | Y | 100 | 100 | 50 | ◎ | ◎ | 2.4 |
| Sample 4 of Comparative Example 1 | A | Z | 100 | 120 | 50 | ◎ | ◎ | 3.5(NG) |
| Sample 5 of Comparative Example 1 | A | α | 100 | 150 | 50 | ◎ | ◎ | 3.8(NG) |
| Sample 6 of Comparative Example 1 | A | β | 110 | 30 | 50 | △X | △X | 2.1 |
| Sample 22 of Example 1 | A | γ | 110 | 35 | 50 | ○△ | ○△ | 2.1 |
| Sample 23 of Example 1 | A | δ | 110 | 45 | 50 | ◎ | ◎ | 2.2 |
| Sample 24 of Example 1 | A | ε | 100 | 45 15 | 30 20 | ◎ | ◎ | 2.2 |

TABLE 2

| Sample No. | Antiglare Hard Coat Layer, Coating Solution | Low Refractive Index Layer | | | | Evaluation of Performance | | |
|---|---|---|---|---|---|---|---|---|
| | | Coating Solution | Thickness (nm) | Silica Particle Size (nm) | Amount of Silica Coated (mg/m$^2$) | Scratch Resistance against Steel Wool | Scratch Resistance against Bencott | Integrated Reflectance (%) |
| Sample 25 of Example 1 | B | C | 100 | 45 | 50 | ◎ | ◎ | 2 |
| Sample 26 of Example 1 | B | D | 100 | 45 | 50 | ◎ | ◎ | 2.1 |

TABLE 2-continued

|  | Antiglare Hard | Low Refractive Index Layer | | | | Evaluation of Performance | | |
| --- | --- | --- | --- | --- | --- | --- | --- | --- |
| Sample No. | Coat Layer, Coating Solution | Coating Solution | Thickness (nm) | Silica Particle Size (nm) | Amount of Silica Coated (mg/m$^2$) | Scratch Resistance against Steel Wool | Scratch Resistance against Bencott | Integrated Reflectance (%) |
| Sample 7 of Comparative Example 1 | B | B | 100 | 15 | 50 | X | X | 1.9 |
| Sample 8 of Comparative Example 1 | B | A | 100 | none | — | X | X | 1.7 |
| Sample 27 of Example 1 | B | F | 100 | 45 | 2 | Δ | Δ | 1.8 |
| Sample 28 of Example 1 | B | G | 100 | 45 | 5 | ○Δ | ○Δ | 1.8 |
| Sample 29 of Example 1 | B | H | 100 | 45 | 10 | ○ | ○ | 1.8 |
| Sample 30 of Example 1 | B | I | 100 | 45 | 30 | ○ | ○ | 1.9 |
| Sample 31 of Example 1 | B | J | 100 | 45 | 60 | ⊚ | ⊚ | 2 |
| Sample 32 of Example 1 | B | K | 100 | 45 | 80 | ⊚ | ⊚ | 2.1 |
| Sample 33 of Example 1 | B | L | 100 | 45 | 90 | ⊚ | ⊚ | 2.2 |
| Sample 34 of Example 1 | B | M | 100 | 45 | 100 | ⊚ | ⊚ | 2.2 |
| Sample 35 of Example 1 | B | N | 100 | 45 | 120 | ⊚ | ⊚ | 3.0(NG) |
| Sample 36 of Example 1 | B | O | 100 | 45 | 150 | ⊚ | ⊚ | 3.3(NG) |
| Sample 9 of Comparative Example 1 | B | P | 100 | 25 | 50 | ΔX | ΔX | 1.9 |
| Sample 37 of Example 1 | B | Q | 100 | 30 | 50 | ○Δ | ○Δ | 1.9 |
| Sample 38 of Example 1 | B | R | 100 | 35 | 50 | ○ | ○ | 1.9 |
| Sample 39 of Example 1 | B | S | 100 | 40 | 50 | ⊚ | ⊚ | 2 |
| Sample 40 of Example 1 | B | T | 100 | 50 | 50 | ⊚ | ⊚ | 2 |
| Sample 41 of Example 1 | B | U | 100 | 60 | 50 | ⊚ | ⊚ | 2 |
| Sample 42 of Example 1 | B | V | 100 | 70 | 50 | ⊚ | ⊚ | 2.1 |
| Sample 43 of Example 1 | B | W | 100 | 80 | 50 | ⊚ | ⊚ | 2.1 |
| Sample 44 of Example 1 | B | X | 100 | 90 | 50 | ⊚ | ⊚ | 2.2 |
| Sample 45 of Example 1 | B | Y | 100 | 100 | 50 | ⊚ | ⊚ | 2.2 |
| Sample 10 of Comparative Example 1 | B | Z | 100 | 120 | 50 | ⊚ | ⊚ | 3.3(NG) |
| Sample 11 of Comparative Example 1 | B | α | 100 | 150 | 50 | ⊚ | ⊚ | 3.6(NG) |
| Sample 12 of Comparative Example 1 | B | β | 110 | 30 | 50 | ΔX | ΔX | 1.9 |
| Sample 46 of Example 1 | B | γ | 110 | 35 | 50 | ○Δ | ○Δ | 1.9 |
| Sample 47 of Example 1 | B | δ | 110 | 45 | 50 | ⊚ | ⊚ | 2 |
| Sample 48 of Example 1 | B | ε | 100 | 45 15 | 30 20 | ⊚ | ⊚ | 2 |

TABLE 3

| Sample No. | Antiglare Hard Coat Layer, Coating Solution | Low Refractive Index Layer | | | | Evaluation of Performance | | |
|---|---|---|---|---|---|---|---|---|
| | | Coating Solution | Thickness (nm) | Silica Particle Size (nm) | Amount of Silica Coated (mg/m$^2$) | Scratch Resistance against Steel Wool | Scratch Resistance against Bencott | Integrated Reflectance (%) |
| Sample 49 of Example 1 | C | C | 100 | 45 | 50 | ◉ | ◉ | 2.1 |
| Sample 50 of Example 1 | C | D | 100 | 45 | 50 | ◉ | ◉ | 2.2 |
| Sample 13 of Comparative Example 1 | C | B | 100 | 15 | 50 | X | X | 2 |
| Sample 14 of Comparative Example 1 | C | A | 100 | none | — | X | X | 1.8 |
| Sample 51 of Example 1 | C | F | 100 | 45 | 2 | Δ | Δ | 1.9 |
| Sample 52 of Example 1 | C | G | 100 | 45 | 5 | ○Δ | ○Δ | 1.9 |
| Sample 53 of Example 1 | C | H | 100 | 45 | 10 | ○ | ○ | 1.9 |
| Sample 54 of Example 1 | C | I | 100 | 45 | 30 | ○ | ○ | 2 |
| Sample 55 of Example 1 | C | J | 100 | 45 | 60 | ◉ | ◉ | 2.1 |
| Sample 56 of Example 1 | C | K | 100 | 45 | 80 | ◉ | ◉ | 2.2 |
| Sample 57 of Example 1 | C | L | 100 | 45 | 90 | ◉ | ◉ | 2.3 |
| Sample 58 of Example 1 | C | M | 100 | 45 | 100 | ◉ | ◉ | 2.3 |
| Sample 59 of Example 1 | C | N | 100 | 45 | 120 | ◉ | ◉ | 3.1(NG) |
| Sample 60 of Example 1 | C | O | 100 | 45 | 150 | ◉ | ◉ | 3.4(NG) |
| Sample 15 of Comparative Example 1 | C | P | 100 | 25 | 50 | ΔX | ΔX | 2 |
| Sample 61 of Example 1 | C | Q | 100 | 30 | 50 | ○Δ | ○Δ | 2 |
| Sample 62 of Example 1 | C | R | 100 | 35 | 50 | ○ | ○ | 2 |
| Sample 63 of Example 1 | C | S | 100 | 40 | 50 | ◉ | ◉ | 2.1 |
| Sample 64 of Example 1 | C | T | 100 | 50 | 50 | ◉ | ◉ | 2.1 |
| Sample 65 of Example 1 | C | U | 100 | 60 | 50 | ◉ | ◉ | 2.1 |
| Sample 66 of Example 1 | C | V | 100 | 70 | 50 | ◉ | ◉ | 2.2 |
| Sample 67 of Example 1 | C | W | 100 | 80 | 50 | ◉ | ◉ | 2.2 |
| Sample 68 of Example 1 | C | X | 100 | 90 | 50 | ◉ | ◉ | 2.3 |
| Sample 69 of Example 1 | C | Y | 100 | 100 | 50 | ◉ | ◉ | 2.3 |
| Sample 16 of Comparative Example 1 | C | Z | 100 | 120 | 50 | ◉ | ◉ | 3.4(NG) |
| Sample 17 of Comparative Example 1 | C | α | 100 | 150 | 50 | ◉ | ◉ | 3.7(NG) |
| Sample 18 of Comparative Example 1 | C | β | 110 | 30 | 50 | ΔX | ΔX | 2 |
| Sample 70 of Example 1 | C | γ | 110 | 35 | 50 | ○Δ | ○Δ | 2 |
| Sample 71 of Example 1 | C | δ | 110 | 45 | 50 | ◉ | ◉ | 2.1 |
| Sample 72 of Example 1 | C | ε | 100 | 45 / 15 | 30 / 20 | ◉ | ◉ | 2.1 |

TABLE 4

| Sample No. | Antiglare Hard Coat Layer, Coating Solution | Low Refractive Index Layer Coating Solution | Thickness (nm) | Silica Particle Size (nm) | Amount of Silica Coated (mg/m²) | Porosity (%) | Refractive Index of Particle | Scratch Resistance against Steel Wool | Scratch Resistance against Bencott | Integrated Reflectance (%) |
|---|---|---|---|---|---|---|---|---|---|---|
| Sample 73 of Example 1 | A | ζ | 100 | 45 (hollow) | 50 | 10 | 1.4 | ⊚ | ⊚ | 1.9 |
| Sample 74 of Example 1 | A | η | 100 | 45 (hollow) | 50 | 36 | 1.3 | ⊚ | ⊚ | 1.8 |
| Sample 75 of Example 1 | A | θ | 100 | 45 (hollow) | 50 | 56 | 1.2 | ○ | ○ | 1.7 |
| Sample a of Example | A | ι | 100 | 45 (hollow) | 50 | 65 | 1.15 | Δ | Δ | 1.6 |
| Sample 76 of Example 1 | A | κ | 100 | 45 (hollow) | 30 | 10 | 1.4 | ⊚ | ⊚ | 1.8 |
|  |  |  |  | 15 (hollow) | 20 | — | 1.4 |  |  |  |
| Sample 77 of Example 1 | A | λ | 100 | 45 (hollow) | 30 | 36 | 1.3 | ⊚ | ⊚ | 1.7 |
|  |  |  |  | 15 (hollow) | 20 | — | 1.3 |  |  |  |
| Sample 78 of Example 1 | A | μ | 100 | 45 (hollow) | 30 | 56 | 1.2 | ○ | ○ | 1.6 |
|  |  |  |  | 15 (hollow) | 20 | — | 1.2 |  |  |  |
| Sample 79 of Example 1 | B | ζ | 100 | 45 (hollow) | 50 | 10 | 1.4 | ⊚ | ⊚ | 1.8 |
| Sample 80 of Example 1 | B | η | 100 | 45 (hollow) | 50 | 36 | 1.3 | ⊚ | ⊚ | 1.7 |
| Sample 81 of Example 1 | B | θ | 100 | 45 (hollow) | 50 | 56 | 1.2 | ○ | ○ | 1.6 |
| Sample b of Example | B | ι | 100 | 45 (hollow) | 50 | 65 | 1.15 | Δ | Δ | 1.5 |
| Sample 82 of Example 1 | B | κ | 100 | 45 (hollow) | 30 | 10 | 1.4 | ⊚ | ⊚ | 1.7 |
|  |  |  |  | 15 (hollow) | 20 | — | 1.4 |  |  |  |
| Sample 83 of Example 1 | B | λ | 100 | 45 (hollow) | 30 | 36 | 1.3 | ⊚ | ⊚ | 1.6 |
|  |  |  |  | 15 (hollow) | 20 | — | 1.3 |  |  |  |
| Sample 84 of Example 1 | B | μ | 100 | 45 (hollow) | 30 | 56 | 1.2 | ○ | ○ | 1.5 |
|  |  |  |  | 15 (hollow) | 20 | — | 1.2 |  |  |  |
| Sample 85 of Example 1 | C | ζ | 100 | 45 (hollow) | 50 | 10 | 1.4 | ⊚ | ⊚ | 1.9 |
| Sample 86 of Example 1 | C | η | 100 | 45 (hollow) | 50 | 36 | 1.3 | ⊚ | ⊚ | 1.8 |
| Sample 87 of Example 1 | C | θ | 100 | 45 (hollow) | 50 | 56 | 1.2 | ○ | ○ | 1.7 |
| Sample 19 of Comparative Example | C | ι | 100 | 45 (hollow) | 50 | 65 | 1.15 | ΔX | ΔX | 1.6 |
| Sample 88 of Example 1 | C | κ | 100 | 45 (hollow) | 30 | 10 | 1.4 | ⊚ | ⊚ | 1.8 |
|  |  |  |  | 15 (hollow) | 20 | — | 1.4 |  |  |  |
| Sample 89 of Example 1 | C | λ | 100 | 45 (hollow) | 30 | 36 | 1.3 | ⊚ | ⊚ | 1.7 |
|  |  |  |  | 15 (hollow) | 20 | — | 1.3 |  |  |  |
| Sample 90 of Example 1 | C | μ | 100 | 45 (hollow) | 30 | 56 | 1.2 | ○ | ○ | 1.6 |
|  |  |  |  | 15 (hollow) | 20 | — | 1.2 |  |  |  |

The results shown in Tables 1 to 4 reveal the followings.

When a silica fine particle having an average particle size specified in the present invention is contained in the low refractive index layer, excellent scratch resistance can be obtained despite a low refractive index layer comprising a fluorine-containing polymer and an antireflection film with low reflectance can be obtained.

When a silica fine particle having a small particle size is used in combination, the scratch resistance is more improved.

Furthermore, when the silica fine particle is replaced by a hollow silica fine particle, the refractive index of the silica fine particle itself decreases, so that the reflectance can be more decreased and an excellent antireflection film can be obtained.

When in Samples 25 to 48 and 79 to 84 of Example 1, Coating Solution D was used in place of Coating Solution B for Antiglare Hard Coat Layer and high-speed coated on a support at a conveyance rate of 20 m/min, good coated surface state was obtained and the performance was also good.

When Sol Solution b of organosilane was used in place of Sold Solution a used in the coating solution for low-refractive index layer, the coating solution was improved in the aging stability and elevated in the aptitude for continuous coating.

Furthermore, when 10 g of a dipentaerythritol pentaacrylate and dipentaerythritol hexaacrylate mixture (DPHA, produced by Nippon Kayaku Co., Ltd.) was added to Coating Solution D for Low Refractive Index Layer and the coating solution was coated in the same manner, the scratch resistance was remarkably enhanced.

Example 2

(Preparation of Coating Solution for Hard Coat Layer)

To 315.0 g of a dipentaerythritol pentaacrylate and dipentaerythritol hexaacrylate mixture (DPHA, produced by Nippon Kayaku Co., Ltd.), 450.0 g of a methyl ethyl ketone dispersion solution of silica fine particle (MEK-ST, solid concentration: 30 mass %, produced by Nissan Chemicals Industries, Ltd.), 15.0 g of methyl ethyl ketone, 220.0 g of cyclohexanone and 16.0 g of a photopolymerization initiator (Irgacure 907, produced by Nippon Ciba Geigy) were added and stirred. The resulting solution was filtered through a polypropylene-made filter having a pore size of 0.4 µm to prepare a coating solution for hard coat layer.

(Preparation of Titanium Dioxide Fine Particle Dispersion Solution)

The titanium dioxide fine particle used was a titanium dioxide fine particle (MPT-129, produced by Ishihara Sangyo Kaisha, Ltd.) containing cobalt and surface-treated by using aluminum hydroxide and zirconium hydroxide.

To 257.1 g of this particle, 38.6 g of a dispersant shown below and 704.3 g of cyclohexanone were added and dispersed by a Dyno-mill to prepare a titanium dioxide dispersion solution having a mass average size of 70 nm.

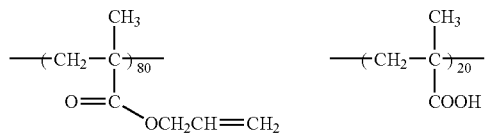

Mw = 40,000

(Preparation of Coating Solution for Medium Refractive Index Layer)

To 88.9 g of the titanium dioxide dispersion solution prepared above, 58.4 g of a dipentaerythritol pentaacrylate and dipentaerythritol hexaacrylate mixture (DPHA), 3.1 g of a photopolymerization initiator (Irgacure 907), 1.1 g of a photosensitizer (KAYACURE DETX, produced by Nippon Kayaku Co., Ltd.), 482.4 g of methyl ethyl ketone and 1,869.8 g of cyclohexanone were added and stirred. After thorough stirring, the resulting solution was filtered through a polypropylene-made filter having a pore size of 0.4 µm to prepare a coating solution for medium refractive index layer.

(Preparation of Coating Solution for High Refractive Index Layer)

To 586.8 g of the titanium dioxide dispersion solution prepared above, 47.9 g of a dipentaerythritol pentaacrylate and dipentaerythritol hexaacrylate mixture (DPHA, produced by Nippon Kayaku Co., Ltd.), 4.0 g of a photopolymerization initiator (Irgacure 907, produced by Nippon Ciba Geigy), 1.3 g of a photosensitizer (KAYACURE DETX, produced by Nippon Kayaku Co., Ltd.), 455.8 g of methyl ethyl ketone and 1,427.8 g of cyclohexanone were added and stirred. The resulting solution was filtered through a polypropylene-made filter having a pore size of 0.4 µm to prepare a coating solution for high refractive index layer.

(Preparation of Coating Solution i for Low Refractive Index Layer)

To 10.8 g of a heat-crosslinkable fluorine-containing polymer having a refractive index of 1.42 (the product that is different in a solvent from JN-7228, solid concentration: 10%, produced by JSR), 0.4 g of Sol Solution a, 2 g of methyl ethyl ketone and 0.6 g of cyclohexanone were added and stirred. The resulting solution was filtered through a polypropylene-made filter having a pore size of 1 µm to prepare Coating Solution i for Low Refractive Index Layer.

(Preparation of Coating Solution ii for Low Refractive Index Layer)

To 9 g of a heat-crosslinkable fluorine-containing polymer having a refractive index of 1.42 (the product that is different in a solvent from JN-7228, solid concentration: 10%, produced by JSR), 1.4 g of silica sol (silica, MEK-ST, average particle size: 15 nm, solid concentration: 30%, produced by Nissan Chemicals Industries, Ltd.), 0.4 g of Sol Solution a, 3 g of methyl isobutyl ketone and 0.6 g of cyclohexanone were added and stirred. The resulting solution was filtered through a polypropylene-made filter having a pore size of 1 µm to prepare Coating Solution ii for Low Refractive Index Layer.

(Preparation of Coating Solution iii for Low Refractive Index Layer)

To 9 g of a heat-crosslinkable fluorine-containing polymer having a refractive index of 1.42 (the product that is different in a solvent from JN-7228, solid concentration: 10%, produced by JSR), 1.4 g of silica sol (silica, MEK-ST differing in the particle size, average particle size: 45 nm, solid concentration: 30%, produced by Nissan Chemicals Industries, Ltd.), 0.4 g of Sol Solution a of organosilane, 3 g of methyl isobutyl ketone and 0.6 g of cyclohexanone were added and stirred. The resulting solution was filtered through a polypropylene-made filter having a pore size of 1 µm to prepare Coating Solution iii for Low Refractive Index Layer.

(Preparation of Coating Solution iv for Low Refractive Index Layer)

Perfluoroolefin Copolymer (1) (15.2 g), 1.4 g of silica sol (silica, MEK-ST differing in the particle size, average particle size: 45 nm, solid concentration: 30%, produced by Nissan Chemicals Industries, Ltd.), 0.3 g of a reactive silicone X-22-164B (trade name, produced by Shin-Etsu Chemical Co., Ltd.), 7.3 g of Sol Solution a, 0.76 g of a photopolymerization initiator (Irgacure 907 (trade name), produced by Ciba Geigy), 301 g of methyl isobutyl ketone and 9.0 g of cyclohexanone were added and stirred. The resulting solution was filtered through a polypropylene-made filter having a pore size of 5 μm to prepare Coating Solution iv for Low Refractive Index Layer.

(Production of Antireflection Film)

A coating solution for hard coat layer was coated on a 80 μm-thick triacetyl cellulose film (TD-80UF, produced by Fuji Photo Film Co., Ltd.) by a gravure coater and dried at 100° C. Thereafter, an ultraviolet ray was irradiated thereon at an illuminance of 400 mW/cm$^2$ and a dose of 300 mJ/cm$^2$ by using an air cooled metal halide lamp of 160 W/cm (manufactured by I-Graphics K.K.) under nitrogen purging of giving an atmosphere reduced in the oxygen concentration to 1.0 vol % or less and thereby the coating layer was cured to form a hard coat layer having a thickness of 3.5 μm.

On this hard coat layer, a coating solution for medium refractive index layer was coated by a gravure coater and dried at 100° C. Thereafter, an ultraviolet ray was irradiated thereon at an illuminance of 550 mW/cm$^2$ and a dose of 600 mJ/cm$^2$ by using an air cooled metal halide lamp of 240 W/cm (manufactured by I-Graphics K.K.) under nitrogen purging of giving an atmosphere reduced in the oxygen concentration to 1.0 vol % or less and thereby the coating layer was cured to form a medium refractive index layer (refractive index: 1.65, film thickness: 67 nm).

On the medium refractive index layer, a coating solution for high refractive index layer was coated by a gravure coater and dried at 100° C. Thereafter, an ultraviolet ray was irradiated thereon at an illuminance of 550 mW/cm$^2$ and a dose of 600 mJ/cm$^2$ by using an air cooled metal halide lamp of 240 W/cm (manufactured by I-Graphics K.K.) under nitrogen purging of giving an atmosphere reduced in the oxygen concentration to 1.0 vol % or less and thereby the coating layer was cured to form a high refractive index layer (refractive index: 1.93, film thickness: 107 nm).

On the high refractive index layer, Coating Solution iv for High Refractive Index Layer was coated by a gravure coater and dried at 80° C. Thereafter, an ultraviolet ray was irradiated thereon at an illuminance of 550 mW/cm$^2$ and a dose of 600 mJ/cm$^2$ by using an air cooled metal halide lamp of 160 W/cm (manufactured by I-Graphics K.K.) under nitrogen purging of giving an atmosphere reduced in the oxygen concentration to 1.0 vol % or less and thereby a low refractive index layer (refractive index: 1.43, film thickness: 86 nm) was formed. In this way, Antireflection Film Sample 1 of Example 2 of the present invention was produced.

(Evaluation of Antireflection Film)

The obtained film was evaluated on the items described above. The results are shown in Table 5.

[Samples 2 to 30 of Example 2 and Samples 1 to 7 of Comparative Example 2]

These samples were produced and evaluated in the same manner as Sample 1 of Example 2 except for changing the coating solution (i to iii, v to xxxvii) for low refractive index layer in Sample 1 of Example 2 as shown in Table 5. The results are shown in Tables 5 and 6.

Coating Solutions v to xxxvii for Low Refractive Index Layer are the same except for changing the thickness, the average particle size of silica fine particle and the amount of silica fine particle coated as shown in Tables below.

TABLE 5

| Sample No. | Low Refractive Index Layer | | | | Evaluation of Performance | | |
|---|---|---|---|---|---|---|---|
| | Coating Solution | Thickness (nm) | Silica Particle Size (nm) | Amount of Silica Coated (mg/m$^2$) | Scratch Resistance against Steel Wool | Scratch Resistance against Bencott | Integrated Reflectance (%) |
| Sample 1 of Example 2 | iv | 86 | 45 | 50 | ⊙ | ⊙ | 0.3 |
| Sample 2 of Example 2 | iii | 86 | 45 | 50 | ⊙ | ⊙ | 0.35 |
| Sample 1 of Comparative Example 2 | ii | 86 | 15 | 50 | X | X | 0.25 |
| Sample 2 of Comparative Example 2 | i | 86 | none | — | X | X | 0.2 |
| Sample 3 of Example 2 | v | 86 | 45 | 2 | Δ | Δ | 0.25 |
| Sample 4 of Example 2 | vi | 86 | 45 | 5 | ○Δ | ○Δ | 0.25 |
| Sample 5 of Example 2 | vii | 86 | 45 | 10 | ○ | ○ | 0.25 |
| Sample 6 of Example 2 | viii | 86 | 45 | 30 | ○ | ○ | 0.3 |
| Sample 7 of Example 2 | ix | 86 | 45 | 60 | ⊙ | ⊙ | 0.35 |
| Sample 8 of Example 2 | x | 86 | 45 | 80 | ⊙ | ⊙ | 0.4 |
| Sample 9 of Example 2 | xi | 86 | 45 | 90 | ⊙ | ⊙ | 0.45 |
| Sample 10 of Example 2 | xii | 86 | 45 | 100 | ⊙ | ⊙ | 0.45 |
| Sample 11 of Example 2 | xiii | 86 | 45 | 120 | ⊙ | ⊙ | 0.9(NG) |
| Sample 12 of Example 2 | xiv | 86 | 45 | 150 | ⊙ | ⊙ | 1.2(NG) |

TABLE 5-continued

| Sample No. | Coating Solution | Thickness (nm) | Silica Particle Size (nm) | Amount of Silica Coated (mg/m$^2$) | Scratch Resistance against Steel Wool | Scratch Resistance against Bencott | Integrated Reflectance (%) |
|---|---|---|---|---|---|---|---|
| Sample 3 of Comparative Example 2 | xv | 86 | 25 | 50 | ΔX | ΔX | 0.25 |
| Sample 13 of Example 2 | xvi | 86 | 30 | 50 | ○Δ | ○Δ | 0.25 |
| Sample 14 of Example 2 | xvii | 86 | 35 | 50 | ○ | ○ | 0.25 |
| Sample 15 of Example 2 | xviii | 86 | 40 | 50 | ⊙ | ⊙ | 0.3 |
| Sample 16 of Example 2 | xix | 86 | 50 | 50 | ⊙ | ⊙ | 0.3 |
| Sample 17 of Example 2 | xx | 86 | 60 | 50 | ⊙ | ⊙ | 0.3 |
| Sample 18 of Example 2 | xxi | 86 | 70 | 50 | ⊙ | ⊙ | 0.35 |
| Sample 19 of Example 2 | xxii | 86 | 80 | 50 | ⊙ | ⊙ | 0.35 |
| Sample 20 of Example 2 | xxiii | 86 | 90 | 50 | ⊙ | ⊙ | 0.4 |
| Sample 21 of Example 2 | xxiv | 86 | 100 | 50 | ⊙ | ⊙ | 0.4 |
| Sample 4 of Comparative Example 2 | xxv | 86 | 120 | 50 | ⊙ | ⊙ | 1.2(NG) |
| Sample 5 of Comparative Example 2 | xxvi | 86 | 150 | 50 | ⊙ | ⊙ | 1.5(NG) |
| Sample 6 of Comparative Example 2 | xxvii | 91 | 30 | 50 | ΔX | ΔX | 0.25 |
| Sample 22 of Example 2 | xxviii | 91 | 35 | 50 | ○Δ | ○Δ | 0.25 |
| Sample 23 of Example 2 | xxix | 91 | 45 | 50 | ⊙ | ⊙ | 0.3 |
| Sample 24 of Example 2 | xxx | 86 | 45 / 15 | 30 / 20 | ⊙ | ⊙ | 0.3 |

TABLE 6

| Sample No. | Coating Solution | Thickness (nm) | Silica Particle Size (nm) | Amount of Silica Coated (mg/m$^2$) | Porosity (%) | Refractive Index of Particle | Scratch Resistance against Steel Wool | Scratch Resistance against Bencott | Integrated Reflectance (%) |
|---|---|---|---|---|---|---|---|---|---|
| Sample 25 of Example 2 | xxxi | 86 | 45 (hollow) | 50 | 10 | 1.450 | ⊙ | ⊙ | 0.3 |
| Sample 26 of Example 6 | xxxii | 86 | 45 (hollow) | 50 | 36 | 1.3 | ⊙ | ⊙ | 0.25 |
| Sample 27 of Example 2 | xxxiii | 86 | 45 (hollow) | 50 | 56 | 1.2 | ○ | ○ | 0.2 |
| Sample 7 of Comparative Example 2 | xxxiv | 86 | 45 (hollow) | 50 | 65 | 1.1555 | ΔX | ΔX | 0.15 |
| Sample 28 of Example 2 | xxxv | 86 | 45 (hollow) / 15 (hollow) | 30 / 20 | 10 / — | 1.4 / 1.4 | ⊙ | ⊙ | 0.25 |
| Sample 29 of Example 2 | xxxvi | 86 | 45 (hollow) / 15 (hollow) | 30 / 20 | 36 / — | 1.360 / 1.3 | ⊙ | ⊙ | 0.2 |
| Sample 30 of Example 2 | xxxvii | 86 | 45 (hollow) / 15 (hollow) | 30 / 20 | 56 / — | 1.2 / 1.265 | ○ | ○ | 0.15 |

The results shown in Tables 5 and 6 reveal the followings.

When a silica fine particle having an average particle size specified in the present invention is contained in the low refractive index layer, excellent scratch resistance can be obtained despite a low refractive index layer comprising a fluorine-containing polymer and an antireflection film with excellent antireflection performance can be obtained.

When a silica fine particle having a small particle size is used in combination, the scratch resistance is more improved.

Furthermore, when the silica fine particle is replaced by a hollow silica fine particle, the refractive index of the silica fine particle itself decreases, so that the reflectance can be more decreased and an antireflection film more enhanced in the antireflection performance can be obtained.

Example 3

A PVA film was dipped in an aqueous solution containing 2.0 g/liter of iodine and 4.0 g/liter of potassium iodide at 25° C. for 240 seconds and further dipped in an aqueous solution containing 10 g/liter of boric acid at 25° C. for 60 seconds. Subsequently, the film was introduced into a tenter stretching machine in the form shown in FIG. 2 of JP-A-2002-86554 and stretched to 5.3 times. Then, the tenter was bent as shown in FIG. 2 with respect to the stretching direction and thereafter, the width was kept constant. The film was dried in an atmosphere at 80° C. and removed from the tenter. The difference in the conveyance speed between right and left tenter clips was less than 0.05% and the angle made by the center line of film introduced and the center line of film delivered to the next step was 46°. Here, |L1-L2| was 0.7 m, W was 0.7 m and a relationship of |L1-L2|=W was established. The substantial stretching direction Ax-Cx at the tenter outlet was inclined at 45° with respect to the center line 22 of film delivered to the next step. At the outlet of the tenter, wrinkling and deformation of film were not observed.

The film was attached with saponified Fujitac (cellulose triacetate, retardation value: 3.0 nm) produced by Fuji Photo Film Co., Ltd. using a 3% aqueous solution of PVA (PVA-117H produced by Kuraray Co., Ltd.) as the adhesive and the combined films were heated at 80° C. to obtain a polarizing film having an effective width of 650 mm. The absorption axis direction of the obtained polarizing plate was inclined at 45° with respect to the longitudinal direction. The transmittance of this polarizing plate at 550 nm was 43.7% and the polarization degree was 99.97%. Furthermore, the polarizing plate was cut into a size of 310×233 mm as in FIG. 2, as a result, a polarizing plate having an absorption axis inclined at 45° with respect to the side could be obtained with an area efficiency of 91.5%.

Subsequently, Example Samples 1 and 2 (saponified) were attached with this polarizing plate to produce a polarizing plate with an antiglare and antireflection film. Using this polarizing plate, a liquid crystal display device where the antiglare and antireflection layer was disposed as the outermost layer was produced. As a result, reflection of external light did not occur and excellent contrast was obtained. Also, the reflected image was effaced due to the antiglare property and thereby high visibility was ensured.

Example 4

Both surfaces of a polarizer produced by adsorbing iodine to polyvinyl alcohol and stretching the film were attached and protected with a 80 μm-thick triacetyl cellulose film (TAC-TD80U, produced by Fuji Photo Film Co., Ltd.) which was dipped in a 1.5 N aqueous NaOH solution at 55° C. for 2 minutes, then neutralized and washed with water, and the triacetyl cellulose film of Example Sample 1 of which back surface was saponified, to produce a polarizing plate. The obtained polarizing plate was exchanged with the polarizing plate in the viewing side of the liquid crystal display device (having D-BEF produced by Sumitomo 3M, which is a polarizing separation film having a polarizing selection layer, between the backlight and the liquid crystal cell) of a note-type personal computer with a transmissive TN liquid crystal display device, such that the antireflection film side came to the outermost surface. As a result, the reflection of background was extremely reduced and a display device having very high display quality was obtained.

Example 5

A view angle enlarging film (Wide View Film SA-12B, produced by Fuji Photo Film Co., Ltd.) having an optical compensation layer where the disc plane of the discotic structural unit is inclined with respect to the transparent support plane and the angle made by the disc plane of the discotic structural unit and the transparent support plane is changed in the depth direction of the optically anisotropic layer, was used for the protective film in the liquid crystal cell side of a polarizing plate which was attached with Example Samples 1 and 2, and disposed in the viewing side of a transmissive TN liquid crystal cell, and also for the protective film in the liquid crystal cell side of a polarizing plate disposed in the backlight side. As a result, the contrast in a bright room was high, the view angle in the vertical and horizontal directions was very wide and the visibility was remarkably excellent. Thus, a liquid crystal display device having high display quality was obtained. Samples 25 to 72 and 79 to 90 in Example 1 (using Antiglare Hard Coat Solutions B and C) have a scattered light intensity at 30° of 0.06% based on the light intensity at an exit angle of 0° and when these samples were used, by virtue of their light scattering property, the view angle in the downward direction and the yellow tinting in the horizontal direction were particularly improved and a very excellent liquid crystal display device was obtained. In the case of a film for comparison produced in the same manner as Samples 25 to 48 and 79 to 84 in Example 1 except for eliminating the crosslinked PMMA particle and silica particle from Antiglare Hard Coat Solution B, the scattered light intensity at 30° based on the light intensity at an exit angle of 0° is substantially 0% and the effect of increasing the view angle in the downward direction and improving the yellow tinting was not obtained at all.

Example 6

Example Samples 1 and 2 were attached to a glass plate on the surface of an organic EL display device through a pressure-sensitive adhesive, as a result, the reflection on the glass surface was suppressed and a display device having high visibility was obtained.

Example 7

Using Example Samples 1 and 2, a polarizing plate having an antireflection film on one surface was produced and a λ/4 plate was attached to the surface opposite the surface having the antireflection film of the polarizing plate. This polarizing plate was attached to a glass plate on the surface of an organic EL display device, as a result, the surface reflection and the reflection from the inside of the surface glass were cut and a display device having very high visibility was obtained.

INDUSTRIAL APPLICABILITY

The antireflection film of the present invention has a sufficiently high antireflection property and at the same time, ensures excellent scratch resistance. The display device equipped with the antireflection film of the present invention and the display device equipped with a polarizing plate using the antireflection film of the present invention are reduced in the reflection of external light or reflection of background and favored by very high visibility.

The invention claimed is:

1. An antireflection film comprising: a transparent support; and as an outermost layer, a low refractive index layer containing a fluorine-containing polymer,
wherein the low refractive index layer comprises at least one inorganic fine particle having an average particle size of 30 to 100% of the thickness of the low refractive index layer, and wherein the low refractive index layer further comprises at least one silica fine particle having a particle size of less than 25% of the thickness of the low refractive index layer.

2. The antireflection film as described in claim 1, which has at least one hard coat layer between the transparent support and the low refractive index layer.

3. The antireflection film as described in claim 2, wherein the at least one hard coat layer is a light-diffusing layer, and the light-diffusing layer has a scattered light intensity at 30° of 0.01 to 0.2% based on the light intensity at an exit angle of 0° in a scattered light profile by a goniophotometer.

4. The antireflection film as described in claim 1, wherein the inorganic particle is a silica fine particle.

5. The antireflection film as described in claim 4, wherein at least one of the silica fine particles in the low refractive index layer is a hollow silica fine particle having a refractive index of from 1.17 to 1.40.

6. The antireflection film as described in claim 1, wherein the average particle size of the at least one silica fine particle having a particle size of less than 25% of the thickness of the low refractive index layer is from 1 to 20 nm.

7. The antireflection film as described in claim 1, wherein the fluorine-containing polymer is a copolymer (P) having a main chain consisting of only a carbon atom, and the copolymer comprises: a fluorine-containing vinyl monomer polymerization unit; and a polymerization unit having a (meth)acryloyl group on the side chain.

8. The antireflection film as claimed in claim 7, wherein the copolymer (P) is represented by the following formula 1:

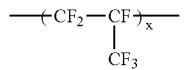

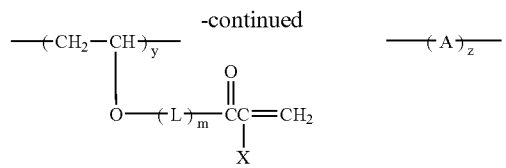

wherein L represents a linking group having a carbon number of 1 to 10, m represents 0 or 1, X represents a hydrogen atom or a methyl group, A represents an arbitrary vinyl monomer polymerization unit and may comprise a single component or a plurality of components, and x, y and z represent mol % of respective constituent components and represent values satisfying $30 \leq x \leq 60$, $5 \leq y \leq 70$ and $0 \leq z \leq 65$.

9. The antireflection film as described in claim 1, which comprises at least one high refractive index layer between the transparent support and the low refractive index layer, wherein the high refractive index layer is a layer having a refractive index of 1.55 to 2.40 and mainly comprising: titanium dioxide; and an inorganic fine particle containing at least one element selected from cobalt, aluminum and zirconium.

10. The antireflection film as described in claim 1, wherein the low refractive index layer has a refractive index of 1.20 to 1.49.

11. A polarizing plate comprising a polarizer and two protective films of the polarizer, wherein one of the two protective films of a polarizer is the antireflection film described in claim 1.

12. The polarizing plate as described in claim 11, wherein the film other than the antireflection film of the two protective films of a polarizer is an optical compensation film having an optical compensation layer comprising an optically anisotropic layer,
wherein the optically anisotropic layer is a layer having a negative birefringence and comprising a compound having a discotic structural unit, the disc plane of the discotic structural unit is inclined with respect to the surface protective film plane, and the angle made by the disc plane of the discotic structural unit and the surface protective film plane is changed in the depth direction of the optically anisotropic layer.

13. An image display device comprising the anti-reflection film described in claim 1 or the polarizing plate described in claim 11, as the outermost surface of the display.

14. A liquid crystal display device of a TN-, STN-, VA-, IPS- or OCB-mode transmissive, reflective or transflective type, which comprises at least one polarizing plate described in claim 11.

15. The antireflection film as described in claim 1, wherein the thickness of the low refractive index layer is about 100 nm.

16. The antireflection film as described in claim 1, wherein the at least one inorganic fine particle having an average particle size of 30 to 100% of the thickness of the low refractive index layer, is a hollow silica fine particle.

* * * * *